United States Patent [19]

Marum et al.

[11] Patent Number: 5,577,023
[45] Date of Patent: Nov. 19, 1996

[54] METHOD AND APPARATUS FOR AUTOMATIC CONFIGURATION OF A NETWORK CONNECTION

[75] Inventors: John Marum, Oakland; Harold H. Webber, Berkeley, both of Calif.

[73] Assignee: Farallon Computing, Inc., Alameda, Calif.

[21] Appl. No.: 103,395

[22] Filed: Aug. 6, 1993

Related U.S. Application Data

[63] Continuation-in-part of Ser. No. 985,169, Dec. 1, 1992, Pat. No. 5,414,708.

[51] Int. Cl.$^6$ .................................................. H04L 1/22
[52] U.S. Cl. ........................... 370/16; 370/85.3; 370/84.3
[58] Field of Search ................................ 370/16, 16.1, 14,
370/85.3, 85.2, 13, 54, 93, 94.3, 31; 371/180,
181, 189.01, 189.02; 340/825.01, 827; 455/8,
79; 178/71 R; 375/219, 220

[56] References Cited

U.S. PATENT DOCUMENTS

| | | |
|---|---|---|
| 4,063,220 | 12/1977 | Metcalfe et al. . |
| 4,099,024 | 7/1978 | Boggs et al. . |
| 4,531,238 | 7/1985 | Rawson et al. . |
| 4,837,856 | 6/1989 | Glista, Jr. . |
| 4,862,158 | 8/1989 | Keller et al. . |
| 5,010,550 | 4/1991 | Hirata ........................................ 370/16 |
| 5,101,405 | 3/1992 | Bekki et al. ........................ 370/85.15 |
| 5,193,086 | 3/1993 | Satomi et al. ............................. 370/16 |
| 5,200,949 | 4/1993 | Kobayashi ................................ 370/16 |
| 5,218,600 | 6/1993 | Schenkyr et al. ......................... 370/16 |
| 5,249,183 | 9/1993 | Wong et al. ............................. 370/85.3 |
| 5,251,203 | 10/1993 | Thompson ............................. 370/85.3 |
| 5,311,114 | 5/1994 | Sambamurthy et al. ................. 370/31 |

FOREIGN PATENT DOCUMENTS 0190662  1/1986  European Pat. Off. .

*Primary Examiner*—Douglas W. Olms
*Assistant Examiner*—Ajit Patel
*Attorney, Agent, or Firm*—Hecker & Harriman

[57] ABSTRACT

The present invention provides automatic configuration of the transmit and receive paths of a network connection, preferably a 10Base-T network connection. It senses which pair in a cable is used for TX signals and which is used for RX signals, then it automatically swaps or unswaps the RX and TX pairs of the port so that a connection is made regardless of whether a crossover or straight-through cable is used. The invention uses link integrity pulses, which are used to periodically test the integrity of the network, to determine which pair is for reception and which is for transmission. Since the auto-crossover transceiver has line receivers and line drivers connected to both pairs of the cable, once it determines which pair is TX and which is RX, it selects the appropriate line receiver and driver to match the cable configuration. The present invention allows connection to a network where another node on the network is either of the standard "hub" type, of the standard "MAU" type, or of the auto-crossover type.

15 Claims, 46 Drawing Sheets

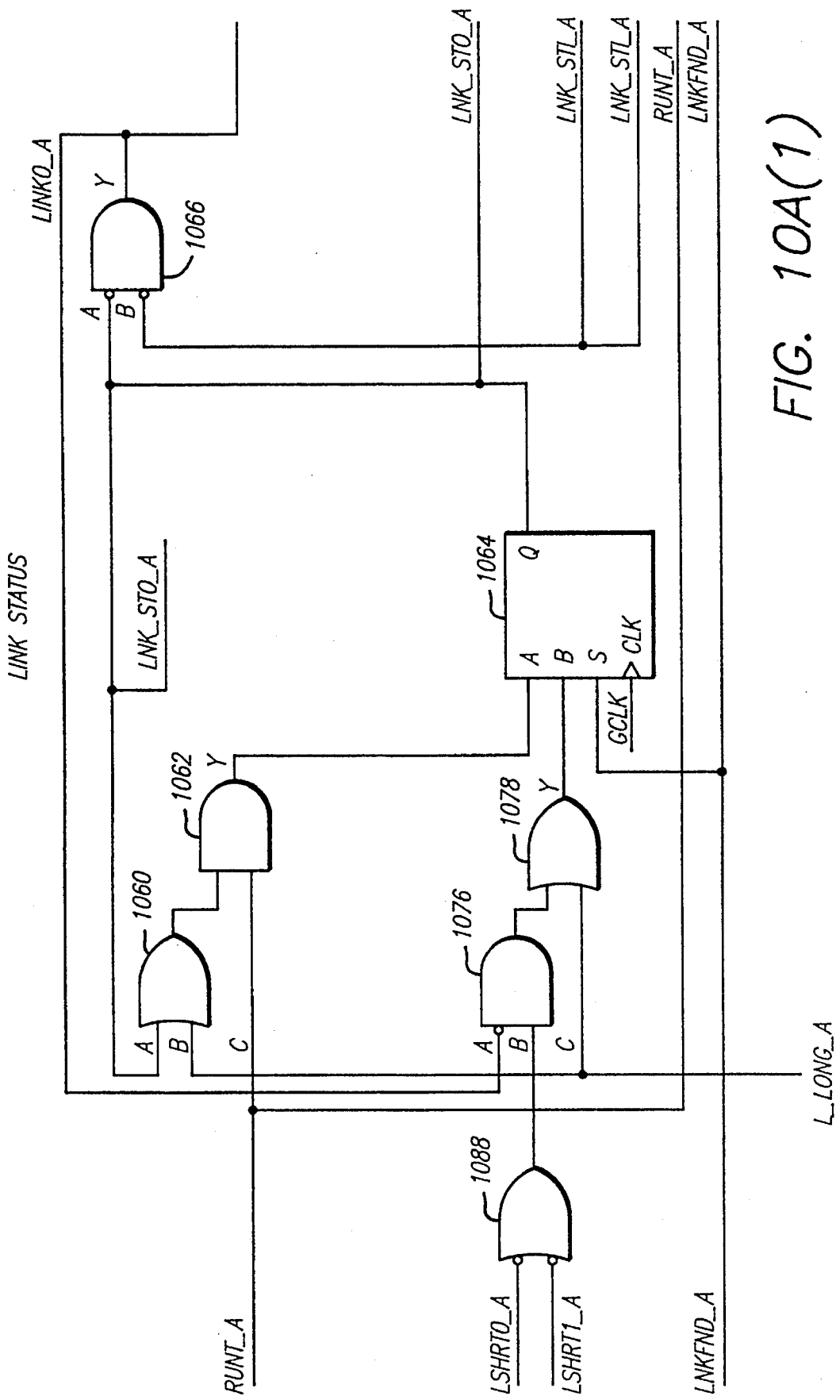
FIG. 10A(1)

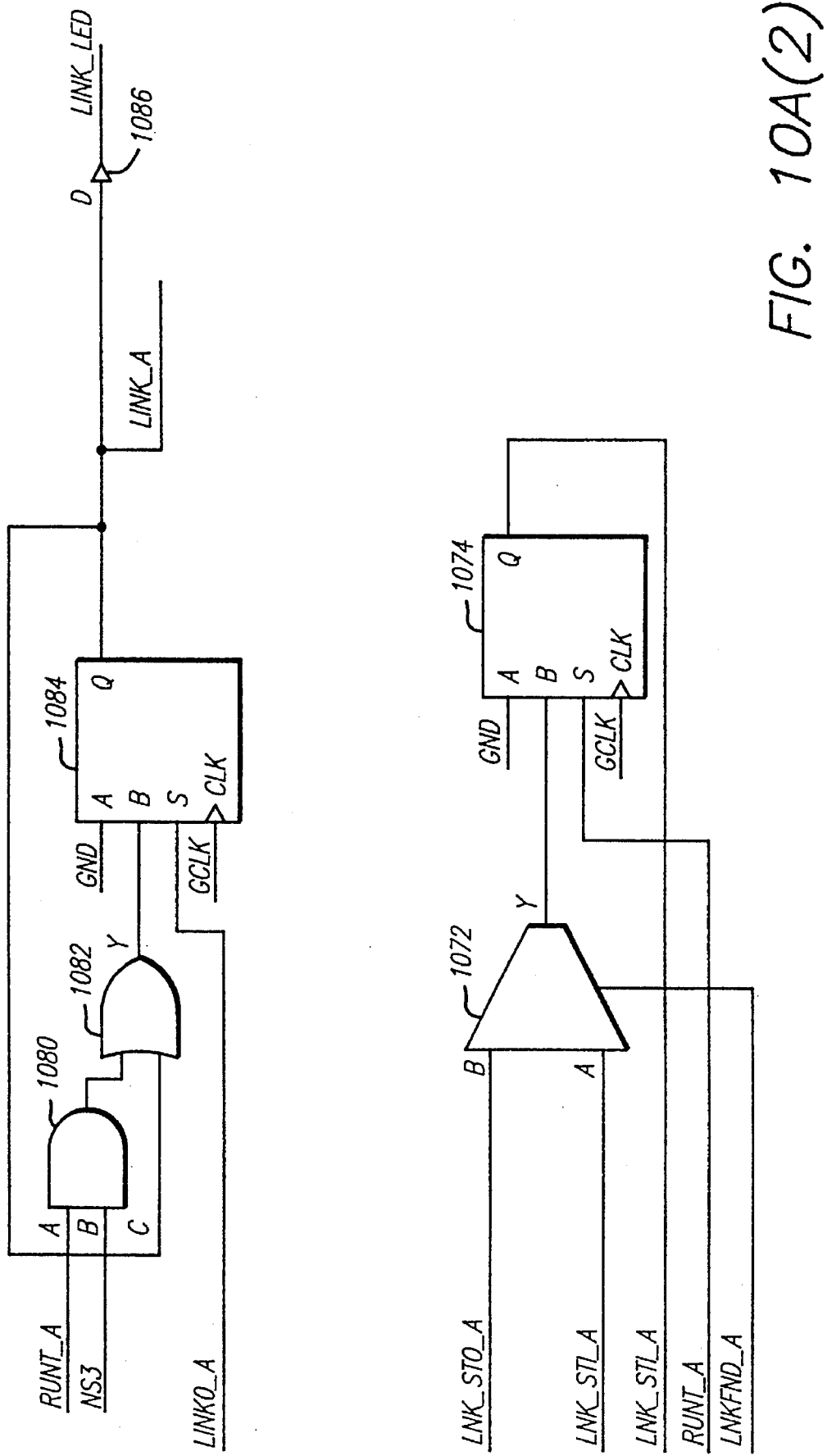
FIG. 10A(2)

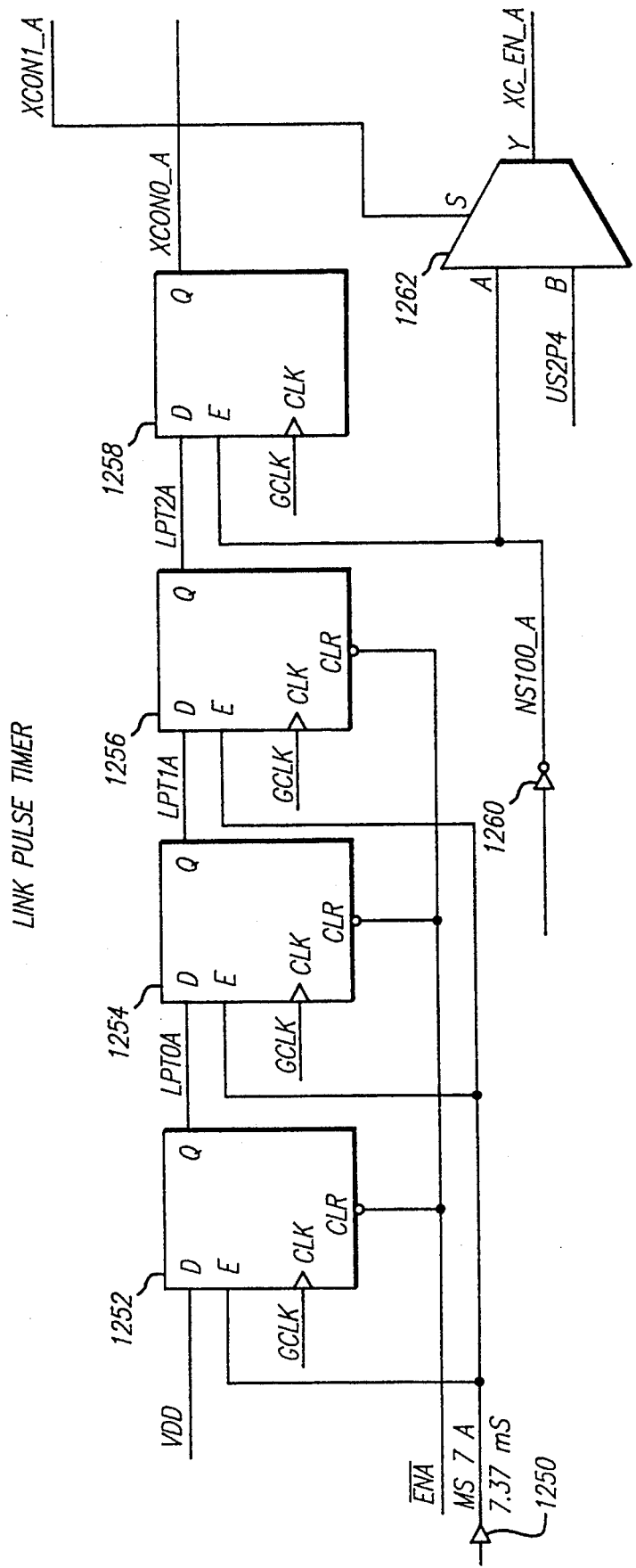
FIG. 12A(1)

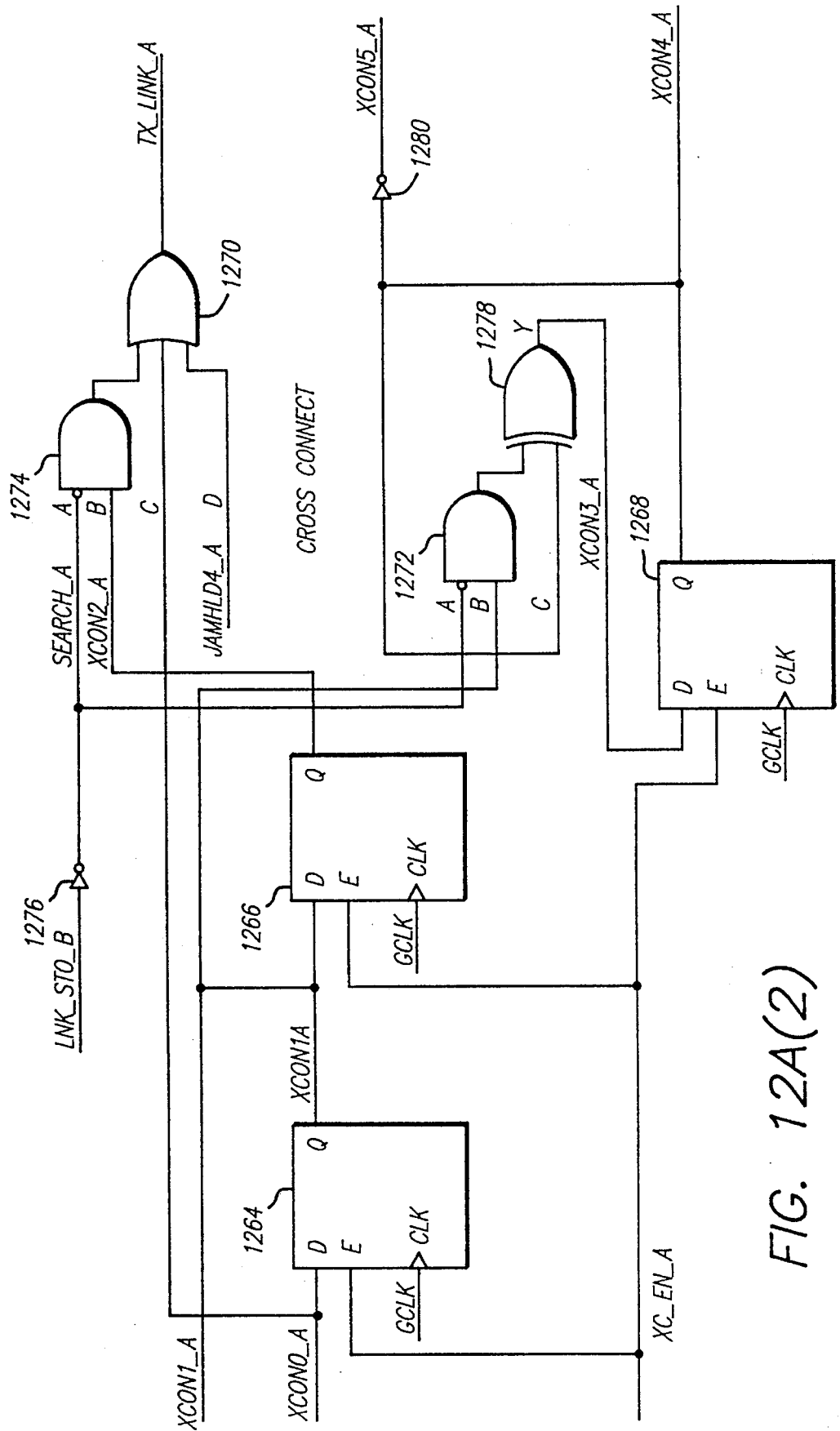
FIG. 12A(2)

METHOD AND APPARATUS FOR AUTOMATIC CONFIGURATION OF A NETWORK CONNECTION

CROSS-REFERENCES TO RELATED APPLICATIONS

This application is a continuation-in-part of U.S. patent application Ser. No. 07/985,169, filed on Dec. 1, 1992, now U.S. Pat. No. 5,414,708.

BACKGROUND OF THE INVENTION

1. Field of the Invention

This invention relates generally to the field of computer networks and, in particular, to the connection of nodes to a network.

2. Background Art

Current Ethernet systems described by the ANSI/IEEE 802.3 standard typically use one of four media to connect computer equipment to a computer network: thick coax (thicknet), optical fiber, thin coax (thinnet), or twisted pair wiring (commonly referred to as 10Base-T). Twisted pair wiring is hereinafter referred to as simply 10Base-T. Of these four media, the more costly thicknet and optical fiber are mainly used for connections over long distances such as between buildings. Less expensive thinnet and 10Base-T are used to connect computer equipment including personal computers (PC), workstations, etc. Thinnet and 10Base-T each have their own advantages and disadvantages.

A local area network using thinnet is constructed by connecting segments of coaxial cable together forming a bus topology using either custom-cut lengths of cable having crimped-on baby N connectors (BNC) or fixed length pre-made lengths of cable. At each end of the assembled cable is a terminator. A connection to the cable is made via a T connector that is inserted between two cable segments. The T connector attaches to computer equipment, referred to as Data Terminal Equipment (DTE) in IEEE Standard 802.3, using a Medium Attachment Unit (MAU). The MAU should be a simple, inexpensive, and flexible means of attaching computer equipment to the media which, in this case, is coaxial cable. The MAU converts signals on coaxial cable into a standard electrical interface referred to as an Attachment Unit Interface (AUI) which is common to nearly all Ethernet equipment.

IEEE Standard 802.3 for 10Base-2 Ethernet defines the functional, electrical, and mechanical specifications for a thinnet MAU. A thinnet MAU handles message flow between computer equipment and a thinnet bus. The MAU must be able to transmit streams of serial data from computer equipment to the thinnet bus, receive streams of serial data from the thinnet bus and transmit the data to computer equipment, detect collisions on the network due to another MAU transmitting concurrently with the local MAU, and automatically interrupt the transmit function to inhibit a long data stream. An optional monitor function disables the transmit function and prevents improper loading of the bus due to the disabled transmitter while permitting computer equipment to continue receiving data and detect collisions.

FIG. 1 is a diagram illustrating a method of adding computer equipment to a network having a bus topology implemented with coaxial cable (i.e. thinnet). The diagram shows a network segment comprising T connectors 106 and 108, terminator 110 and MAUs 102 and 104 having AUIs 130 and 132, respectively. AUIs 130 and 132 are interfaces to computer equipment. A thinnet cable 120 is coupled between a previous thinnet node (not shown in FIG. 1) and T connector 106. T connector 106 is coupled to MAU 102 and to thinnet cable 122. Thinnet cable 122 is coupled to T connector 108. T connector 108 is coupled to MAU 104 and to thinnet cable 124. Thinnet cable 124 is coupled to terminator 110.

A typical network begins with one cable segment 120 connecting two PCs or computer equipment. MAU 102 is coupled to the second computer equipment. When a third PC or item of computer equipment having AUI 132 coupled to MAU 104 is added to the network, a terminator 110 is removed from an end of cable segment 122, a new T connector 108 is attached between the aforesaid cable 122 and a new segment of cable 124, and terminator 110 is placed on the end of new cable segment 124 as illustrated in FIG. 1. Additional PCs or computer equipment may be added in a similar fashion. This method of wiring is commonly referred to as daisy-chaining.

Thinnet has the advantage of being easy to install and allowing easy growth of a network. No external equipment other than cable and MAUs is required to construct a network. In addition, cables and MAUs can be acquired incrementally: for each additional node added to the network, one thinnet MAU, one T connector, and one additional segment of coaxial cable are needed. Attaching additional nodes to an existing network is as simple as purchasing a MAU, a T connector, and a segment of coaxial cable for each node, and then stringing these items on either end of the existing cable in the manner described above.

The disadvantage of using thinnet becomes apparent as the network grows. Coaxial cable cannot be easily routed to all parts of a building, especially when the cable must remain connected together as a continuous segment. In addition, if the cable should break or be disconnected at any point, the two resulting halves become useless because they are not terminated at the break. Due to thinnet's bus topology and the lack of diagnostic capability built into the MAUs, finding the location where the break has occurred is not easily accomplished without specialized equipment (such as a time domain reflectometer), that the user is unlikely to have.

A competing wiring system, 10Base-T, builds a network as illustrated in FIG. 2A comprising an active hub 200 and nodes 202, 204 and 206. A port 200A of active hub 200 is coupled to node 202 by two 10Base-T twisted pairs 208 comprising transmit pair 208A and receive pair 208B. Port 200B of active hub 200 is coupled to node 204 by two 10Base-T twisted pairs 210 comprising transmit pair 210A and receive pair 210B. Port 200C of active hub 200 is coupled to node 206 by two 10Base-T twisted pairs 212 comprising transmit pair 212A and receive pair 212B.

The network illustrated in FIG. 2A comprises an external active hub 200 that is centrally located to connect to each node 202, 204 and 206 over standard telephone twisted pair wiring 208, 210 and 212. Each node 202, 204 and 206 requires its own separate connection to hub 200 using two pairs 208, 210 and 212 of wire (one pair 208A, 210A and 212A for transmitting signals and the other pair 208B, 210B and 212B for receiving signals), respectively. At nodes 202, 204 and 206, computer equipment connects to a port 200A–200C of an active hub 200, respectively, using a 10Base-T MAU thereby forming a point-to-point link between an active hub 200 and DTEs. The hub 200 consists of a reclocking repeater that has a separate port 200A–200C for each node connected to it. If another node is added to the network, the network requires two pairs of wire connecting the node to its own port on the hub. This type of wiring is usually referred to as either a star-topology or structured wiring, and is used by most telephone systems.

IEEE Standard 802.3 for 10Base-T Twisted Pair Ethernet defines the functional, electrical, and mechanical specifications for the 10Base-T MAU and the medium. A 10Base-T MAU handles message flow between computer equipment or hub (repeater) and a twisted pair link. The MAU must be able to transmit streams of serial data from computer equipment to the twisted pair link, receive streams of serial data from the twisted pair link and transmit data to computer equipment, detect collisions on the network due to another MAU transmitting concurrently with the local MAU, verify that the MAU and AUI are connected, automatically interrupt the transmit function by inhibiting a long data stream, and to test and disable a receive link if the link is faulty.

The chief disadvantage of 10Base-T is that it requires an external hub, each port of which can only connect to one node. However, one of the main advantages of using 10Base-T medium is avoiding the cost and inconvenience of routing cable to each node since telephone-grade twisted pair wiring already exists in most buildings and is therefore easier to use than coaxial cable or optical fiber. Since 10Base-T requires 4 wires (two twisted wire pairs) for each node, the supply of existing wiring in a building may be used up quickly. If two nodes are located in a room that only has one 10Base-T connection (two pairs of wires), two additional pairs of wires must be routed to the location to connect the second node to the hub, thus defeating one of the advantages of using existing twisted pair wiring.

In addition, each node added uses up an additional port on a hub, thereby requiring the installer to purchase an appropriate number of hubs to match the number of nodes. If the number of nodes exceeds the number of ports on a hub, an additional hub must be purchased to accommodate the nodes and the expense of the remaining unused ports is lost. For installations that have standardized on 10Base-T, the increasing number of nodes that must be added to the network becomes a major problem. Current alternative methods of adding nodes to a 10Base-T also have their difficulties.

FIG. 2B is a block diagram illustrating a 10Base-T network comprising active hub 230, mini-hub 240 and nodes 232, 234, 236 and 238 that uses 10Base-T mini-hub 240 to add nodes 236 and 238 to network. Ports 230A–230C of active hub 230 are coupled to nodes 232 and 234 and mini-hub 240 by 10Base-T twisted wire pairs 242, 244 and 246, respectively. Each 10Base-T twisted wire pairs 242, 244 and 246 comprises transmit pair 242A, 244A and 246A and receive pair 242B, 244B and 246C, respectively. Ports 240A and 240B of mini-hub 240 are coupled to nodes 236 and 238 by two twisted wire pairs 248 and 250 comprising transmit pair 248A and 250A and receive pair 248B and 250B, respectively.

If an additional two pairs of wire and an unused hub port are not available in a network as shown in FIG. 2A, a 10Base-T mini hub 240 can be connected to the main network as illustrated in FIG. 2B, and nodes 236 and 238 can then be connected to two ports 240A and 240B of the added mini hub 240. In this manner, a node comprising mini-hub 240 coupled to port 230C of active hub 230 connects nodes 236 and 238 to the network. However, this dramatically increases the incremental cost of adding a single node since an entire hub must be added. In addition, the Ethernet specification limits the number of hubs that can be between nodes, so adding an additional hub may not even be possible without violating the Ethernet standard.

FIG. 2C is a block diagram comprising active hub 260, nodes 262–270, and a 10Base-T to thinnet converter 272 that illustrates another common method of adding a node to a network. Ports 260A–260C of active hub 260 are coupled to nodes 262 and 264 and to 10Base-T to thinnet converter 272 by 10Base-T twisted wire pairs 274, 276 and 278, respectively. Each 10Base-T twisted wire pairs 274, 276 and 278 comprises transmit pair 274A, 276A and 278A and receive pair 274B, 276B and 278C, respectively. A thinnet bus 280 couples nodes 266, 268 and 270 to 10Base-T to thinnet converter 272 in a daisy-chain manner.

10Base-T to thinnet converter 272 allows nodes 266, 268 and 270 to be daisy-chained together using thinnet cable, and then to connect the thinnet segment 280 to a main 10Base-T network comprising active hub 260 and nodes 262 and 264 through converter 272. Again, this method has the disadvantage of requiring an external device (10Base-T to thinnet converter 272) to expand a single 10Base-T port 260C of active hub 260 in order to connect to multiple nodes 266–270. It is also not an incremental addition, since the node that is initially a 10Base-T port must first be converted to a thinnet port.

Traditional ethernet over twisted pair (10Base-T) wiring topology requires the use of a central hub (concentrator) which has multiple ports, each of which connects to one MAU at a workstation. This topology uses two pairs of wires, one for transmitting and one for receiving. The transmit pair on the hub connects to the receive pair on the MAU and the receive pair on the hub connects to the MAU's transmit pair.

To maintain proper orientation of the transmit and receive pairs in a traditional 10Base-T network, a hub port can only be connected to a single MAU port, and a MAU port can only be connected to a hub port. In many instances, such as when there are not enough hub ports or when a number of MAUs are clustered together in relatively close proximity to one another, it would be desirable to be able to connect a MAU to another MAU, rather that to a hub. For maximum versatility, it would be desirable to be able to connect hubs and MAUs together in any combination. Such connection capability would allow 10Base-T and other twisted pair networks to have a daisy chain topology. A daisy chain topology would overcome the disadvantages of a star topology. Of course, 10Base-T could still be used in a star topology, if such a topology provided advantages over a daisy chain topology. Additionally, a network could be constructed having some star portions and some daisy chain portions to allow maximum flexibility in the selecting the most suitable topology for the circumstances. However, to allow such capability, a method for automatically providing the proper configuration and connection of transmit and receive pairs is needed. Thus, an automatic crossover capability is needed.

RJ45-type modular connectors are typically used to provide a physical connection to a 10Base-T network. The RJ45 connectors on hubs and MAUs are wired so that they normally interconnect when using a straight-through cable, i.e. one where pin 1 connects to pin 1, pin 2 to pin 2, etc. On the MAU's connector, pin 1 is TX+, pin 2 is TX−, pin 3 is RX+ and pin 6 is RX−. On the hub's connector, pin 1 is RX+, pin 2 is RX−, pin 3 is TX+ and pin 6 is TX−. Thus, when a straight through cable is used to connect a hub to a MAU, the TX pair on the hub connects to the RX pair on the MAU and the RX pair on the hub connects to the TX pair on the MAU.

Since the connector pin configurations or pinouts differ between the MAU's connector and the hub's connector, a straight through cable may not be used to connect a MAU to another MAU or a hub to another hub. Use of a straight through cable to connect like devices results in signals from one MAU appearing at the wrong pins of the other MAU, thus preventing communication over the network.

Should the user wish to connect two MAUs or two hubs together, a special cable called a cross connect cable is required. This cross connect cable swaps the TX and RX pairs in the cable to compensate for the lack of a crossover built into the RJ45s. In the case of a daisy chainable 10Base-T system, the daisy chain MAU might be connected to either a MAU or a hub. One method to ensure compatibility of a piece of 10Base-T equipment, such as a daisy chain MAU, with both "MAU" and "hub" RJ45 connectors is to provide the equipment with two RJ45 connectors, one wired as a standard MAU RJ45 connector and the other wired as a hub RJ45 connector. However, since each piece of such equipment has both types of RJ45 connector, the user is required to possess sufficient expertise to determine whether a particular device should be connected to the "hub" RJ45 connector or to the "MAU" RJ45 connector. This situation is complicated by the existence of cross-connect cables. To connect a MAU to a hub, a user would expect to use the "hub" connector of the hub. However, if the user had only a cross-connect cable, the user would have to connect the MAU to the "MAU" connector of the hub. Thus, even though a connection may be possible with the right combination of connectors and cables, a user is required to pay close attention to the markings on the connectors and cables. If a connector or cable is unmarked or mismarked, great confusion and delay could easily result. Thus, a method is needed for automatically configuring a network connection.

SUMMARY OF THE PRESENT INVENTION

The present invention provides a method and apparatus for extending a local area network topology from only allowing point-to-point link segments to allowing daisy-chained segments with multiple nodes on each segment. To use a 10Base-T network as an example, the present invention allows computer equipment to be connected in a bus topology while retaining the characteristics of a 10Base-T node according to IEEE Standard 802.3 for 10Base-T Twisted Pair Ethernet. The present invention may be used not only with 10Base-T networks, but with any network having separate transmit and receive paths or a plurality of unidirectional links and a link integrity scheme.

In the preferred embodiment of the present invention, a non-reclocking repeater at a 10Base-T node coupled to a port of an active hub retransmits data packets from the node to subsequent nodes in a daisy-chained segment. When the repeater is not powered, bypass circuitry connects together the two ends of 10Base-T twisted pair wiring that are coupled to the node in order to remove the inactive node from the daisy-chain segment. This prevents the network from being rendered unusable by a node that is down.

The repeater includes modular connectors and analog transmit and receive sections for transmitting and receiving differential signals according to IEEE Standard 802.3 to and from the two network link interfaces and an AUI that couples computer equipment to the node. The analog circuitry allows a daisy-chain of nodes to be connected without violating IEEE standards for a cable segment. Further, the present invention does not reduce the range of an existing 10Base-T network to which it attaches.

The repeater also comprises digital logic to implement the functional circuitry of a 10Base-T Medium Attachment Unit (MAU). The digital logic also includes circuitry to detect data packets having two formats and link pulses. Because the IEEE Standard 802.3 only allows a fixed number of bits to be lost at a 10Base-T node, a repeater retransmits data packets having formats such that nodes further down the segment do not lose additional bits.

The present invention also supports and may include diagnostic circuitry including LEDs to aid installation and to provide useful information including collision detection and link integrity.

The present invention provides automatic configuration of the transmit and receive paths of a network connection. The present invention eliminates the need for two types of cables (standard and crossconnected). It senses which pair in a cable is used for TX signals and which is used for RX signals, then it automatically swaps or unswaps the RX and TX pairs of the port so that a connection is made regardless of whether a crossover or standard cable is used.

All 10Base-T transceivers (both MAUs and hubs) and some other types of network transceivers send link test pulses to check the integrity of the cable. Only after a sufficient number of these pulses are received is the connection considered good and packets transmitted onto it. The invention uses these link pulses to determine which of the two pairs is for reception and which is for transmission. Since the auto-crossover transceiver has line receivers and line drivers connected to both pairs of the cable, once it determines which pair is TX and which RX is selects the appropriate line receiver and driver to match the current cable configuration.

In the preferred embodiment of the auto-crossover system of the present invention, selectable transmit and receive circuits are provided for both the TX and RX connections. Control circuitry determines which transmit circuits and receives circuits are to be selected and which are to be deselected. The control circuitry provides proper timing of transmit and receive circuit selection and controls the transmission of link pulses. To determine which pair is for reception, the auto-crossover transceiver alternately enables the line receivers on one pair and then the other. While one pair is selected as receive, the other is selected as the transmit pair and link pulses are sent down it. If link pulses are received on the currently selected receive pair, they are passed to a standard 10Base-T link test state machine. Once one link pulse is successfully received, the auto-crossover state machine stops alternating the receivers, keeping the current receiver enabled (the one which just received the link pulse). The pair connected to the un-enabled receivers is assumed to be the transmit pair, and the auto-crossover state machine keeps this selection until the link test state machine indicates that the link is down.

This technique works very reliably if the transceiver on the other end of the cable is a standard transceiver that does not have an auto-crossover capability and that always sends out link pulses on the same pair. If, however, two auto-crossover transceivers, A and B, are connected to the same cable, there is a chance that the two will take a long time to link up because they are both alternating receive and transmit pairs. To maximize the chances of linking up, the auto-crossover state machine is synchronized to the link pulse state machine in a way so that immediately after one pair is selected as the receive pair, a link pulse is sent on the other pair. If transceiver A has chosen the same pair for receive as transceiver B, and A sends a link pulse, this link pulse will be lost. However, because transceiver A had just swapped pairs before sending the pulse, transceiver B will swap pairs before transceiver A does. When transceiver B does swap pairs, it will also immediately send out a link pulse which must be received by transceiver A, since A has not yet swapped pairs.

To insure that this algorithm also works with all conventional 10Base-T transceivers, the time between swaps must be long enough to guarantee that a link pulse from any 10Base-T device will be received. The 10Base-T specification requires that a link pulse be sent every 8 to 24 mS. Thus if the autocrossover state machine 'listens' to each pair for at least 24 mS, it is guaranteed to receive at least one link pulse on one of the pairs, thereby allowing it to determine which pair is the receive pair. Since the search algorithm requires that link pulses be synchronized with the autocrossover state machine, an autocrossover port's link pulses would also be at least 24 mS apart, which fails to meet the 10Base-T specification. This incompatibility is solved by sending two link pulses for each crossover period, one immediately at the start of the crossover period and one just before the end of the crossover period. If a period of just under 24 mS is used, a link pulse would be produced on both pairs within 24 mS, ensuring compliance with the 10Base-T specification.

By allowing simplified establishment of a network connection, the present invention reduces the amount of knowledge needed to connect computer networks and allows connection between heterogeneous (MAU and hub) network nodes or homogeneous (MAU and MAU or hub and hub) without the need to identify and select a straight-through or cross-connect cable. Thus, the present invention overcomes the disadvantages of the prior art.

BRIEF DESCRIPTION OF THE DRAWINGS

FIG. 10A is a detailed schematic diagram illustrating a link status state machine of one embodiment of the present invention.

FIG. 12A is a detailed schematic diagram of a link pulse timer and an auto-cross-connect state machine of another embodiment of the present invention.

DESCRIPTION

A method and an apparatus for connecting nodes on a computer network is described. In the following description, numerous specific details, such as number and nature of receivers, line drivers, gates, etc., are described in detail in order to provide a more thorough description of the present invention. It will be apparent, however, to one skilled in the art that the present invention may be practiced without these specific details. In other instances, well known features have not been described in detail so as not to unnecessarily obscure the present invention.

The present invention being a Medium Attachment Unit (MAU) extends an Ethernet 10Base-T local area network topology from allowing only point-to-point link segments to allowing daisy-chained segments with multiple nodes on each segment. The present invention does this by adding a non-reclocking repeater at each 10Base-T node which retransmits data packets from that node to the following node in the chain according to the present invention. In the case where a repeater is not powered, bypass circuitry connects the two ends of the chain together to remove the inactive node from the daisy chain.

The present invention also provides a 10Base-T port which can attach to either a MAU type or hub type RJ45 connection by automatically swapping transmit and receive pairs as needed to establish the connection.

Figure 1:
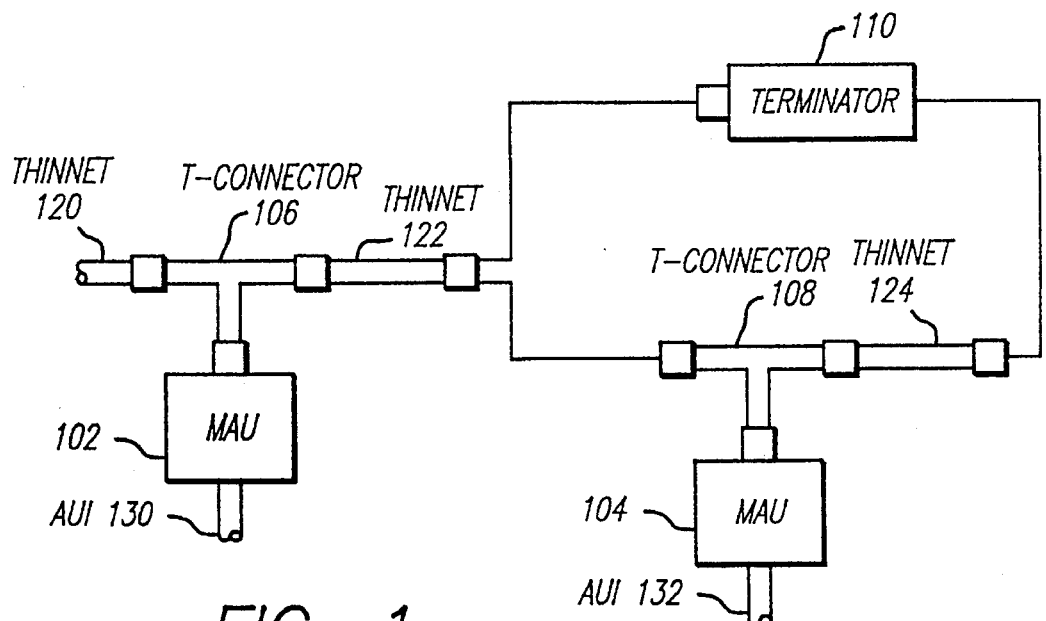
FIG. 1 is a diagram illustrating the addition of another node to a thinnet network by daisy-chaining another T connector, MAU, and new cable segment.
Figure 3:
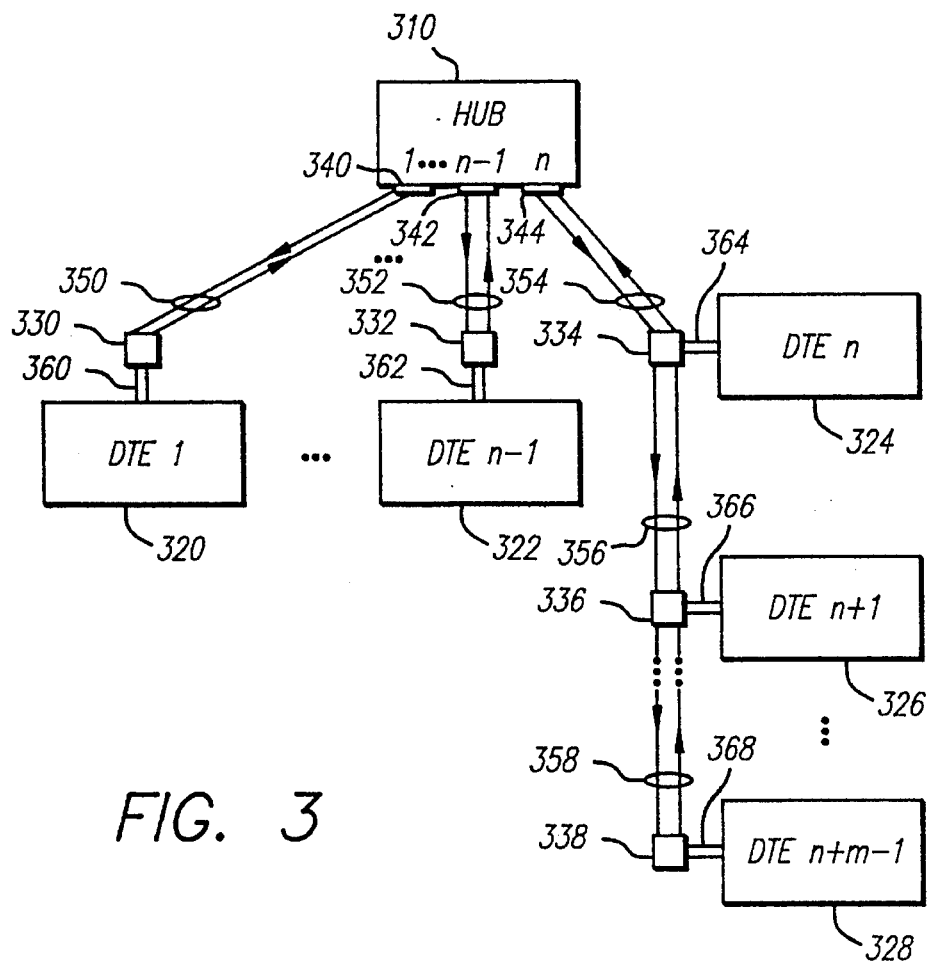
FIG. 3 is a diagram that illustrates daisy-chaining nodes to form a multiple tapped bus using MAUs according to the present invention in a star network topology.
Figure 2A:
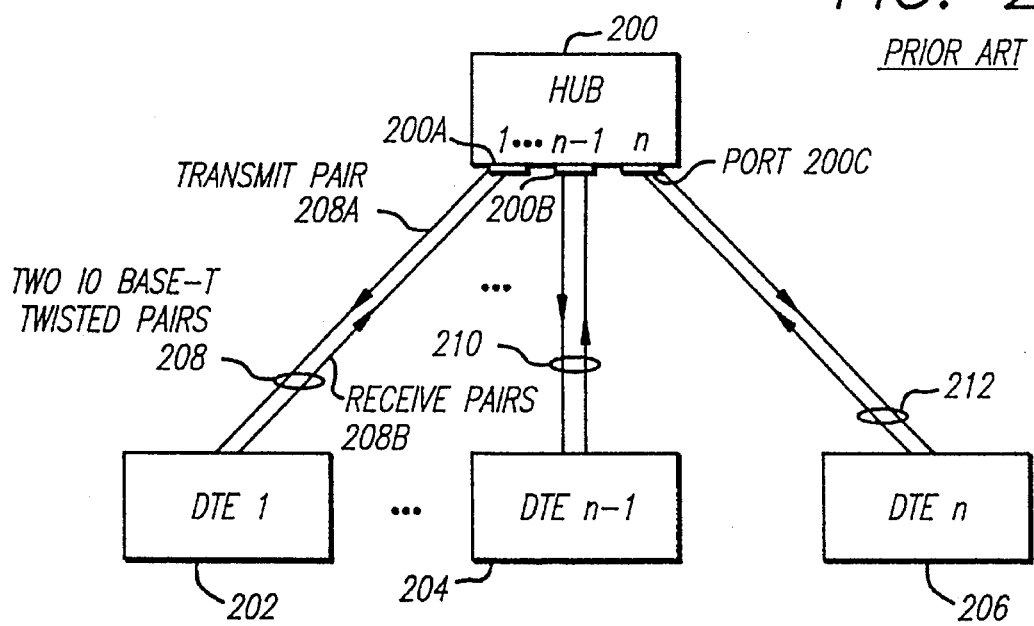
FIGS. 2A–2C are diagrams illustrating 10Base-T networks including a central hub only, a mini-hub, and a 10Base-T to thinnet converter, respectively.
Figure 2B:
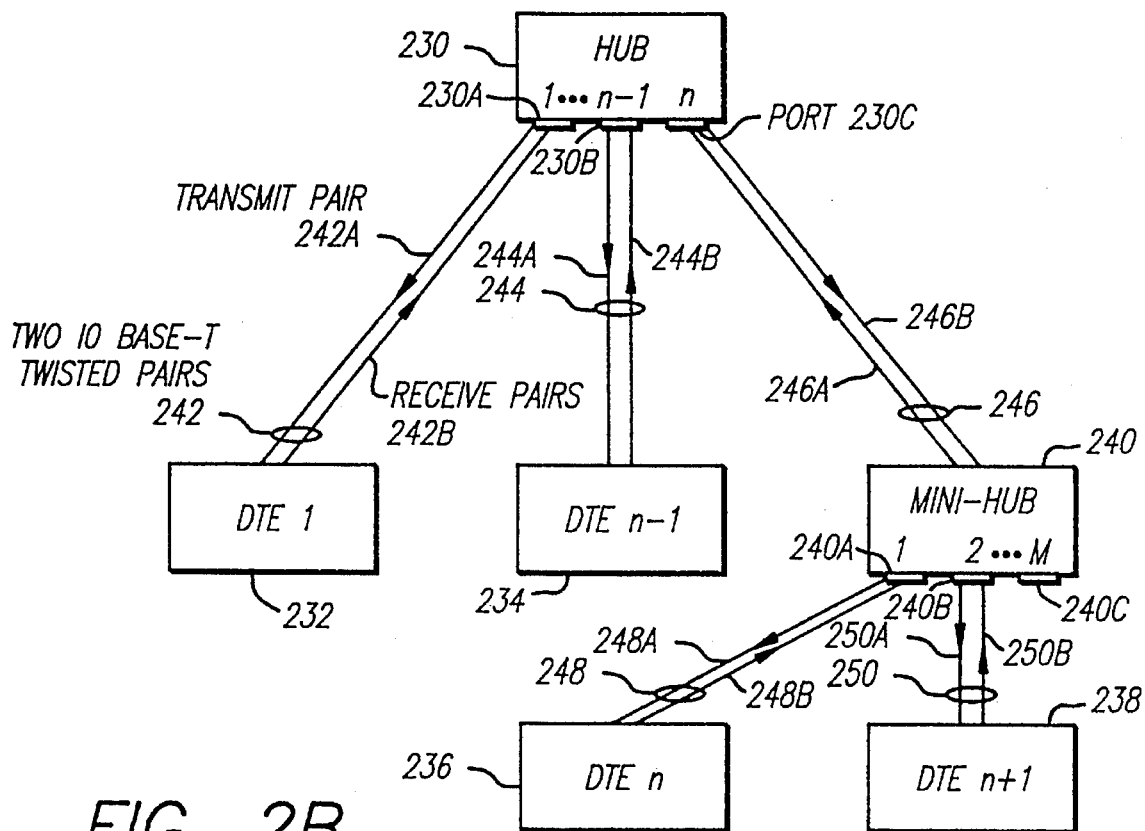
Figure 2C:
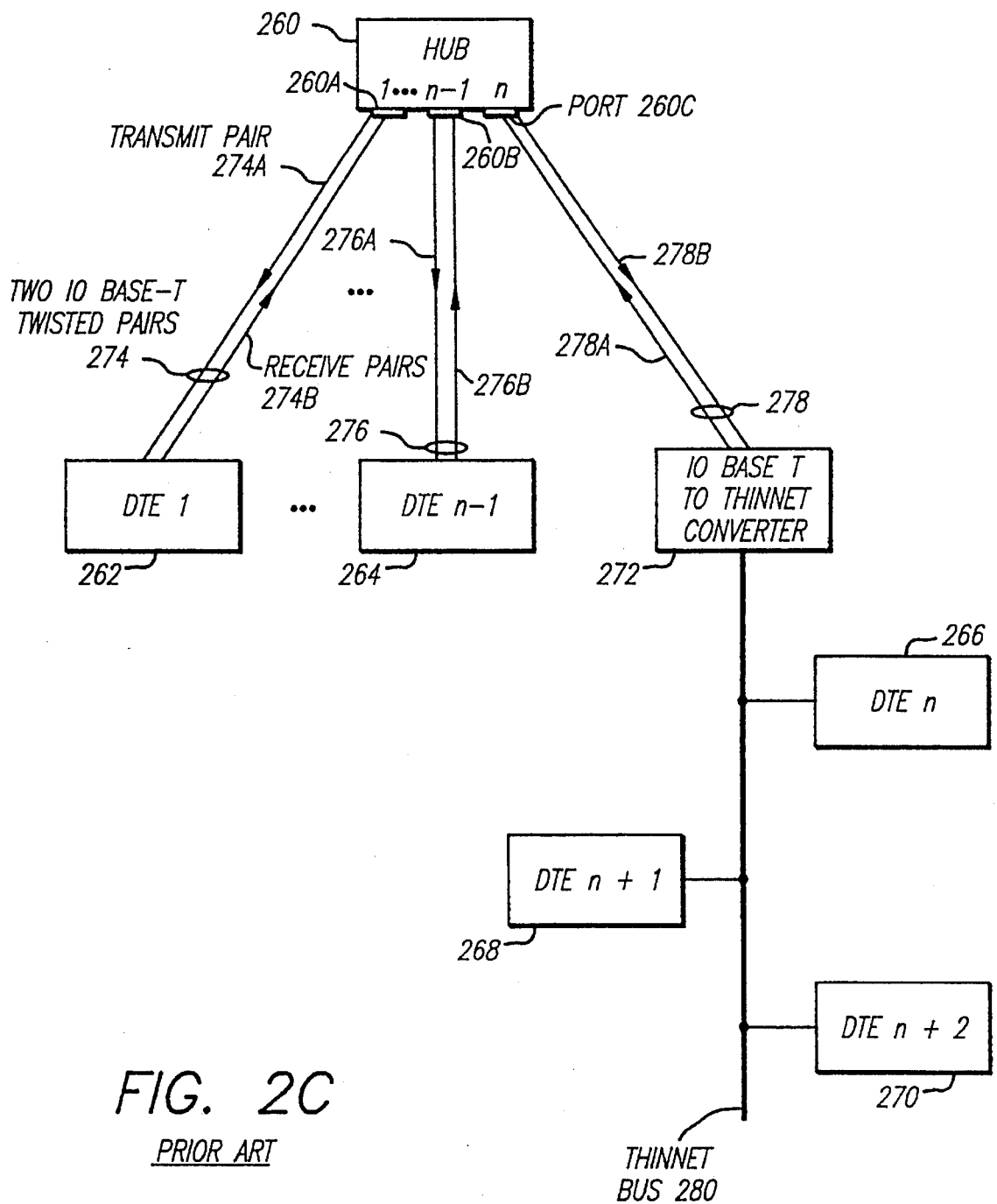

FIG. 3 illustrates a local area network having a star topology which includes a daisy-chain of nodes having MAUs of the present invention that are coupled by 10Base-T twisted pair links. An active hub 310 is shown in FIG. 3 including n ports 340, 342, and 344. Port 340 of hub 310 is coupled to 10Base-T MAU 330 by a 10Base-T twisted pair link 350. DTE 320 is coupled to 10Base-T MAU 330 by AUI 360. Port 342 is coupled to 10Base-T MAU 332 by 10Base-T twisted pair link 352. DTE 322 is coupled to 10Base-T MAU 332 by an AUI 362. Port 344 is coupled to MAU 334 of the present invention by 10Base-T twisted pair 354. DTE 324 is coupled to MAU 334 by AUI 364. The first MAU 334 is coupled to a second MAU 336 of the present invention by 10Base-T twisted pair link 356. DTE 326 is coupled to MAU 336 by AUI 366. MAU 336 is coupled to MAU 338 of the present invention by twisted pair link 358. DTE 328 is coupled to MAU 338 by AUI 368.

FIG. 3 illustrates a daisy-chain of m DTEs coupled to port 344, while n−1 10Base-T nodes are connected in point-to-point links to ports 340 and 342 of active hub 310. However, either or both 10Base-T nodes 340 and 342, each having a single DTE, can be replaced by a daisy-chain of nodes coupled by 10Base-T twisted pair links similar to the daisy-chain of nodes coupled to port 344.

A main advantage of the invention is that a point-to-point 10Base-T link segment appears as a multiple tapped bus segment. Small networks can be built by simply chaining together the present invention without the need for a separate active hub. If a structured wiring system already exists, additional nodes can be added to one of the 10Base-T link segments by adding a node according to the present invention between the hub and an existing 10Base-T node. Additional nodes according to the present invention can be added to this chain incrementally.

System reliability is improved over existing bus architectures, such as thinnet, because the segments are self-terminating. Unlike thinnet, a break in a chain comprising nodes according to the present invention does not render the entire network unusable. The self termination feature which is inherent in the 10Base-T specification (through the use of special link integrity pulses) isolates unterminated segments from the rest of the network. In addition, the link integrity test indicators found on nearly all 10Base-T nodes make it easy to locate a bad segment.

Figure 4:
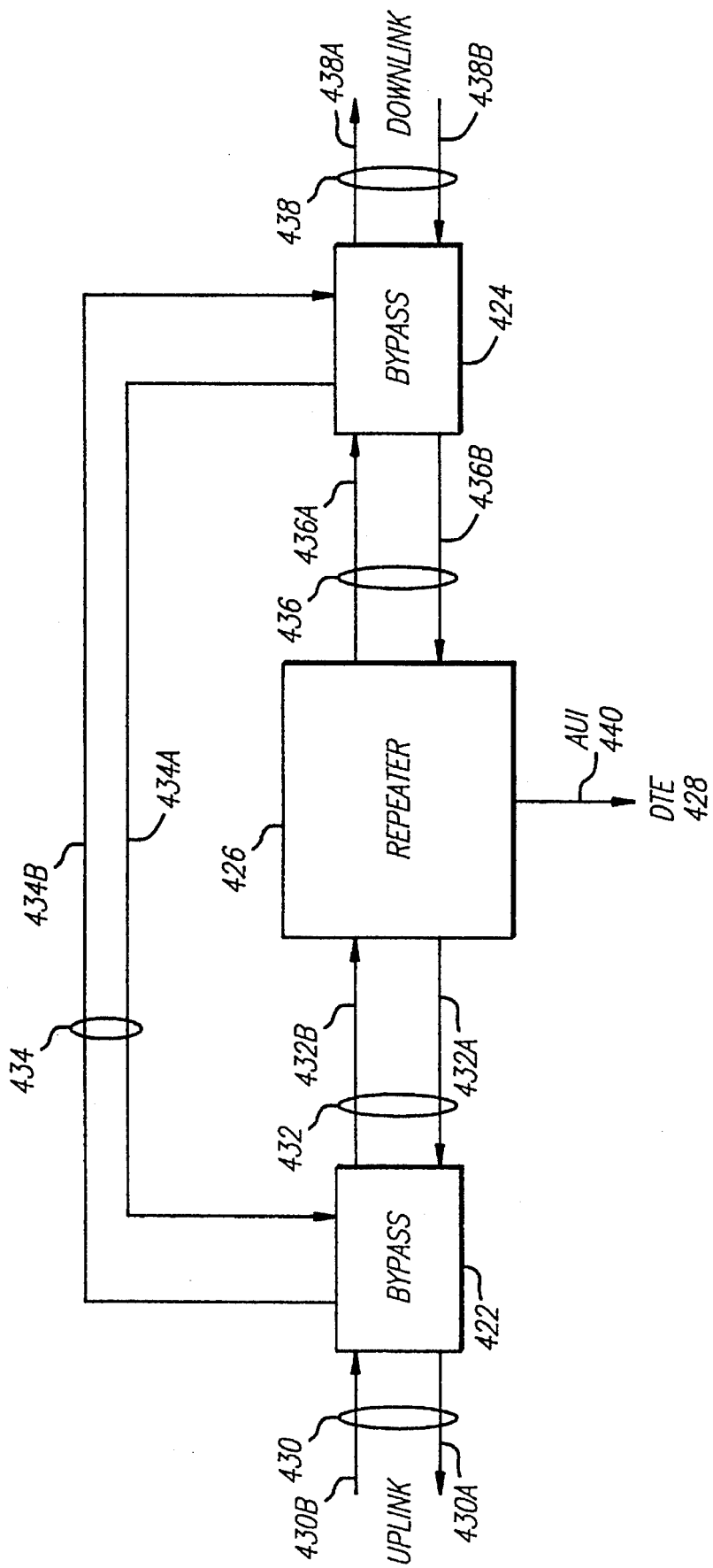
FIG. 4 is a block diagram of a MAU according to the present invention.

A block diagram of the present invention shown in FIG. 4 includes a first and second bypass circuit 422 and 424, repeater 426, and an AUI 440. An uplink node is coupled to bypass circuit 422 by twisted wire pairs 430 comprising a transmit circuit 430A and a receive circuit 430B. Bypass circuit 422 is coupled to bypass circuit 424 by coupling 434 comprising a transmit circuit 434A and a receive circuit 434B. Bypass circuit 422 is also coupled to repeater 426 by a transmit circuit 432A and a receive circuit 432B. Repeater 426 is coupled to bypass circuit 424 by a transmit circuit 436A and a receive circuit 436B. Repeater 426 is also coupled to DTE 428 by AUI 440. Bypass circuit 424 is coupled to a downlink node by twisted wire pairs 438 comprising a transmit circuit 438A and a receive circuit 438B.

As illustrated in FIG. 4, the present invention consists of two 10Base-T ports 430 and 438 connected through bypass circuitry 422 and 424 to a repeater section 426, which also connects to an AUI 440 of computer equipment 428. If the computer equipment 428 does not supply power to the MAU of the present invention (e.g. if computer equipment is powered down or the MAU is disconnected), bypass circuits 422 and 424 bridge the two 10Base-T ports 430 and 438 and isolate the inactive repeater 426 from the network. Data packets can pass freely through the MAU as if the node were removed from the chain.

Once the computer equipment 428 powers up the MAU, bypass circuits 422 and 424 route the two 10Base-T ports 430 and 438 into the central repeater section 426. Data packets received on one 10Base-T port are received by repeater 426 and retransmitted to both AUI 428 and the other 10Base-T port. Data packets received from AUI 440 are repeated on both 10Base-T ports 430 and 438. If data packets are received from two or more sources simultaneously, repeater 426 arbitrarily selects one of them to be repeated out of all ports and signals a collision to the computer equipment 428 through AUI 440.

Figure 15:
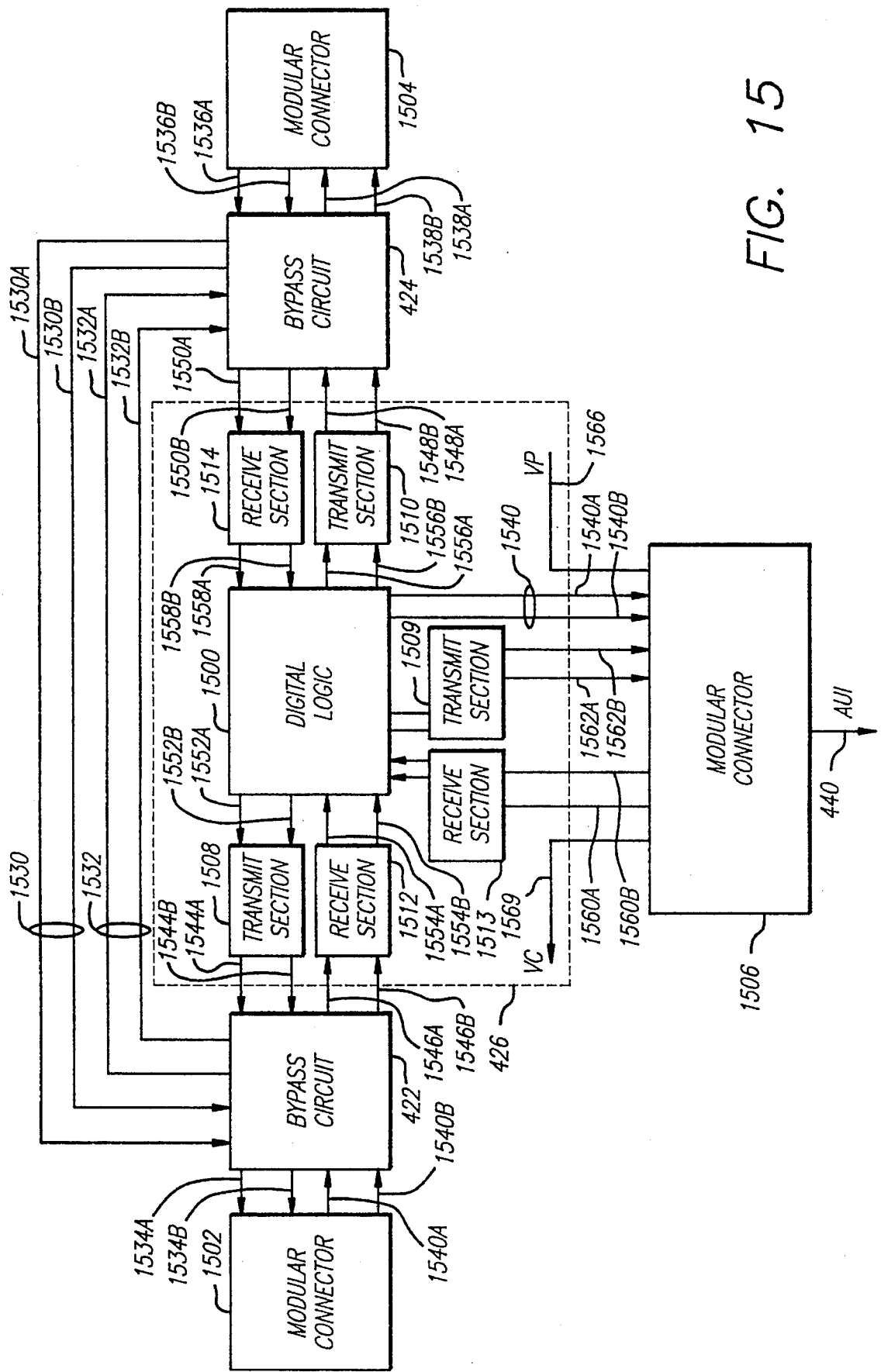
FIG. 15 is an intermediate level drawing of the present invention including bypass circuitry and a repeater comprising receive and transmit circuits for three interfaces and digital logic.

An intermediate level diagram of one embodiment of the present invention is illustrated in FIG. 15 including modular connectors 1502–1506, bypass circuitry 422 and 424, and repeater 426 comprising transmit sections 1508–1510, receive sections 1512–1514, and digital logic 1500. Modular connector 1502 is coupled to bypass circuitry 422 by receive circuit 1540 comprising lines 1540A and 1540B and transmit circuit 1534 comprising lines 1534A and 1534B. Similarly, modular connector 1504 is coupled to bypass circuit 424 by receive circuit 1536 comprising lines 1536A and 1536B and transmit circuit 1538 comprising lines 1538A and 1538B. Bypass circuitry 422 is coupled to bypass circuitry 424 by bypass coupling 1530 comprising lines 1530A and 1530B and bypass coupling 1532 comprising lines 1532A and 1532B.

Bypass circuitry 422 is coupled to transmit section 1508 by lines 1544A and 1544B and to receive section 1512 by lines 1546A and 1546B. Bypass circuitry 424 is coupled to transmit section 1510 by lines 1548A and 1548B and to receive section 1514 by lines 1550A and 1550B. Transmit section 1508 is coupled to digital logic 1500 by lines 1552A and 1552B. Receive section 1512 is coupled to digital logic 1500 by lines 1554A and 1554B. Transmit section 1510 is coupled to digital logic 1500 by lines 1556A and 1556B. Receive section 1514 is coupled to digital logic 1500 by lines 1558A and 1558B.

Modular connector 1506 is coupled to an AUI 440. Modular connector 1506 is coupled to receive section 1513 by lines 1560A and 1560B and to transmit section 1509 by lines 1562A and 1562B. Lines 1540A and 1540B provide a Collision signal from digital logic 1500 to modular connector 1506. Lines 1566 and 1569 of modular connector 1506 provide supply voltage VP and voltage common VC from AUI 440 to power the circuitry.

Supply voltage VP provided by AUI 440 couples the receive circuit 1540 and transmit circuit 1543 through bypass circuitry 422 to receive section 1512 and transmit section 1508, respectively. Similarly, the receive circuit 1536 and transmit circuit 1538 of modular connector 1504 are coupled through bypass circuitry to receive section 1514 and transmit section 1510 when powered. When AUI 440 does not provide power to bypass circuitry 422 and 424 and repeater 426, the receive circuit 1540 of modular connector 1502 is coupled to the transmit circuit 1538 of modular connector 1504 by bypass circuitry 422-424 and bypass lines 1532A and 1532B. Similarly, receive circuit 1536 of modular connector 1504 is coupled to transmit circuit 1534 by bypass circuitry 422-424 and bypass lines 1530A and 1530B.

Digital logic 1500 provides functional circuitry of a 10Base-T MAU specified by IEEE Standard 802.3 as well as circuitry to receive and retransmit data packets having specific bit pattern formats to other nodes connected in a daisy-chain (described below). Receive sections 1512–1514 process signals from the 10Base-T network links coupled to modular connectors 1502 and 1504 and from computer equipment coupled to modular connector 1506 by AUI 440 to digital logic 1500. Transmit sections 1508–1510 transmit signals from digital logic 1500 of repeater 426 to the 10Base-T network links coupled to modular connectors 1502 and 1504 and to computer equipment coupled to modular connector 1506 by AUI 440.

Figure 15A:
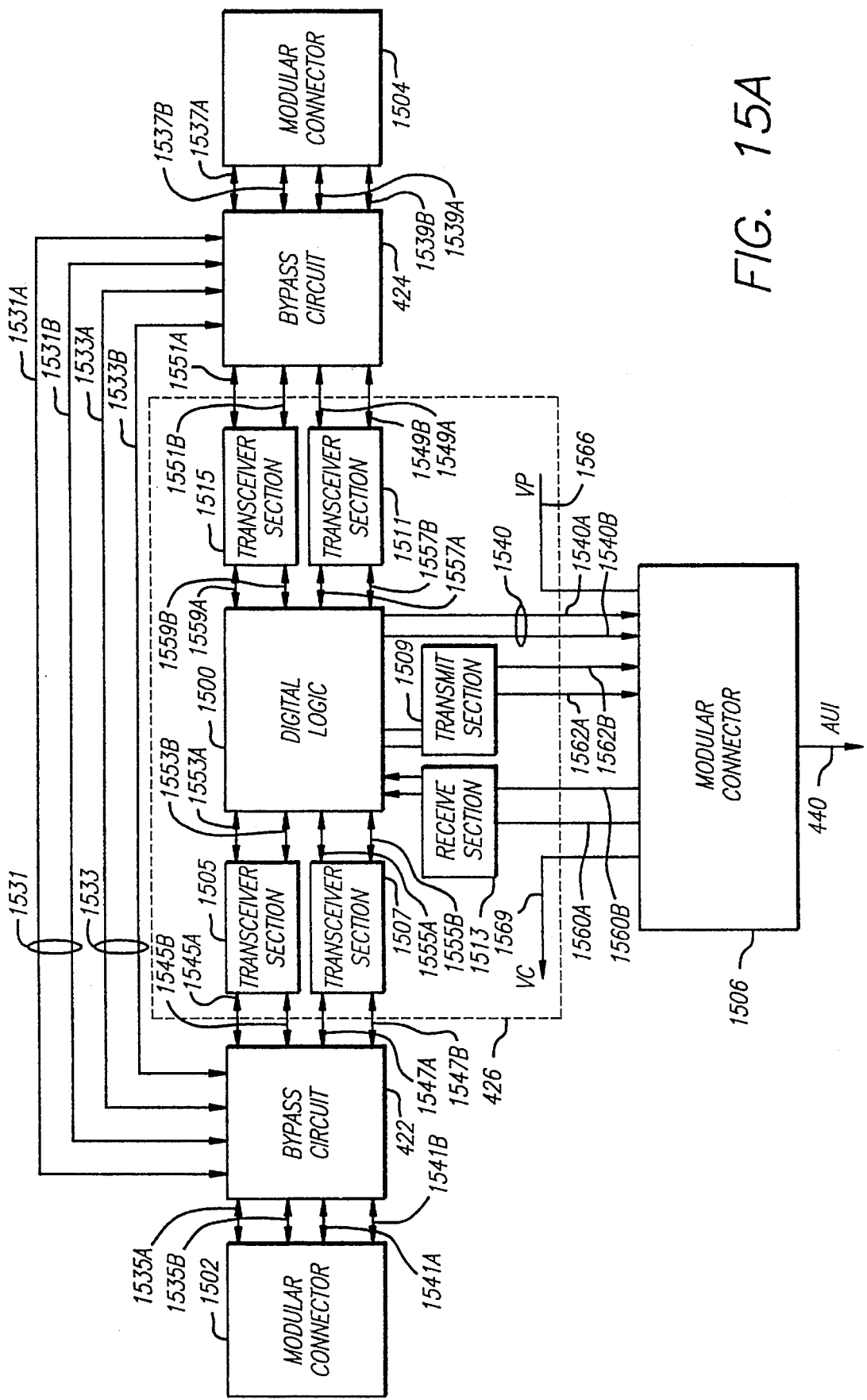
FIG. 15A is an intermediate level diagram of the preferred embodiment of the present invention applied to a daisy-chainable 10Base-T MAU.

An intermediate level diagram of the preferred embodiment of the present invention is illustrated in FIG. 15A including modular connectors 1502, 1504 and 1506, bypass circuitry 422 and 424, and repeater 426 comprising transceiver sections 1505, 1507, 1509, 1511, 1513 and 1515, and digital logic 1500. Modular connector 1502 is coupled to bypass circuitry 422 by transceiver circuit 1541 comprising lines 1541A and 1541B and transceiver circuit 1535 comprising lines 1535A and 1535B. Similarly, modular connector 1504 is coupled to bypass circuit 424 by transceiver circuit 1537 comprising lines 1537A and 1537B and transceiver circuit 1539 comprising lines 1539A and 1539B. Bypass circuitry 422 is coupled to bypass circuitry 424 by bypass coupling 1531 comprising lines 1531A and 1531B and bypass coupling 1533 comprising lines 1533A and 1533B.

Bypass circuitry 422 is coupled to transceiver section 1505 by lines 1545A and 1545B and to receive section 1507 by lines 1547A and 1547B. Bypass circuitry 424 is coupled to transceiver section 1511 by lines 1549A and 1549B and to transceiver section 1515 by lines 1551A and 1551B. Transceiver section 1505 is coupled to digital logic 1500 by lines 1553A and 1553B. Transceiver section 1507 is coupled to digital logic 1500 by lines 1555A and 1555B. Transceiver section 1511 is coupled to digital logic 1500 by lines 1557A and 1557B. Transceiver section 1515 is coupled to digital logic 1500 by lines 1559A and 1559B.

Digital logic 1500 provides functional circuitry of a 10Base-T MAU specified by IEEE Standard 802.3 as well as circuitry to automatically swap receive and transmit lines as necessary. Transceiver sections 1505 and 1507 process signals between the 10Base-T network links coupled to modular connector 1502 and digital logic 1500. Transceiver sections 1511 and 1515 process signals between digital logic 1500 and the 10Base-T network links coupled to modular connector 1504. Transceiver sections 1505, 1507, 1511 and 1515 can be selected to operate as either transmitters or receivers under the control of signals XCON4A and XCON5A, which are illustrated on FIG. 12A. Other circuitry of FIG. 15A is substantially similar to that of FIG. 15.

One of the difficulties in adding a chain of repeaters into a 10Base-T link segment is the IEEE Standard 802.3 limitation on the number of bits which can be lost (i.e. truncated from the beginning of a data packet) before the data packet reaches either a reclocking repeater (i.e. an active hub) or its destination node. An additional requirement limits the allowed delay through the segment as well. A repeater 426 must recognize the beginning of an incoming data packet at one port of a MAU of the present invention and begin retransmitting the packet out the other port without dropping too many bits or unduly delaying the data packet.

This bit loss and delay problem is further complicated by the presence of link pulses on 10Base-T link segments. Link pulses each consist of a single positive pulse and are sent down the 10Base-T link periodically (in the absence of data packets) to indicate the presence of an intact link between transmitter and receiver. The design of a repeater must overcome the dilemma of how to faithfully repeat both data packets and link pulses while remaining within the limits for bit loss and delay set by IEEE Standard 802.3.

Figure 5A:
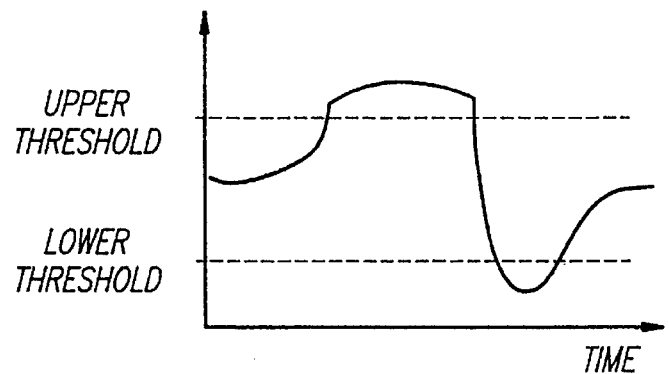
FIGS. 5A–5B illustrate link pulses before and after passing through receivers of a repeater.
Figure 5B:
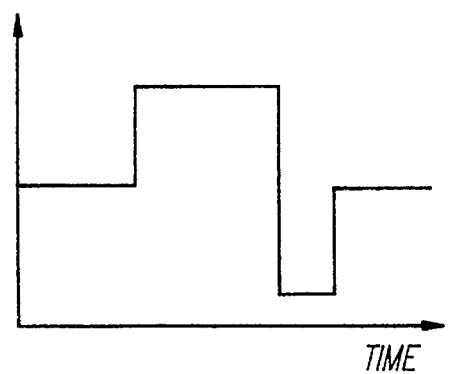

Link pulses are illustrated in FIGS. 5A–5B before and after passing through a receiver 1512–1514 of repeater 426. The drawing of FIG. 5A illustrates a link pulse that is input to a receiver 1512–1514 having three output levels: zero (Z), high (H), and low (L). A zero level is outputted by the receiver 1512–1514 for an input pulse level between the two threshold levels indicated by dotted lines. A high level is outputted for an input pulse level equal to or greater than the upper threshold level, while a low level is outputted for an input pulse level equal to or less than the lower threshold level. The drawing of FIG. 5B illustrates a corresponding signal having multiple transitions produced by receiver 1512–1514 at its output.

If repeater 426 simply passes on what appears on its line receivers 1512–1514 to its transmitters 1508–1510, the link pulses run the risk of becoming distorted. Link pulses from a source nearby (repeater of adjacent node) contain a certain amount of undershoot as shown in FIG. 5A. If the undershoot exceeds the lower threshold level of a receiver 1512–1514 of repeater 426 (indicated by dotted lines), then the received signal appears as a positive pulse followed by a shortened negative pulse as shown in FIG. 5B. If this wave form is sent on to the next repeater, the process repeats itself and adds another short pulse in the positive direction to the pulse train. This distortion of the link pulse, even from only a single repeater 426, renders the link pulse distorted enough that it no longer meets the 10Base-T standard and may be rejected by the receiving node. If the separation between threshold levels of the receiver 1512–1514 of repeater 426 is increased to avoid triggering on the undershoot, the sensitivity of repeater 426 is severely reduced and it no longer operates over the maximum cable length specified in the IEEE Standard 802.3 for 10Base-T.

Another technique is to wait a fixed interval or until the end of the pulse before deciding whether the incoming signal is a link pulse or data packet. If it is a link pulse, it can safely be ignored as these pulses can easily be regenerated by the repeater. If it is a data packet, the repeater begins to pass on the received data to its transmitter. The shortfall of this method is that a bit or two is lost each time a data packet passes through a repeater in each node of the daisy-chain. Since IEEE Standard 802.3 for 10Base-T only allows a limited number of bits lost (7), this would severely limit the number of repeaters allowed in a chain.

The problem is to distinguish data packets from link pulses so that data packets can be retransmitted immediately without mistaking them for link pulses. A preferred method implemented in the present invention to do this is to encode the data packets so that the first bit of a data packet is different from the first bit of a link pulse. One way to do this (but not the only) is for digital logic 1500 of repeater 426 to force all data packets to begin with a negative going pulse as shown for signal C of FIG. 6. Since link pulses must all start with a positive pulse as indicated by signal A of FIG. 6, link pulses and data packets having these formats can be distinguished immediately by each MAU.

Figure 6:
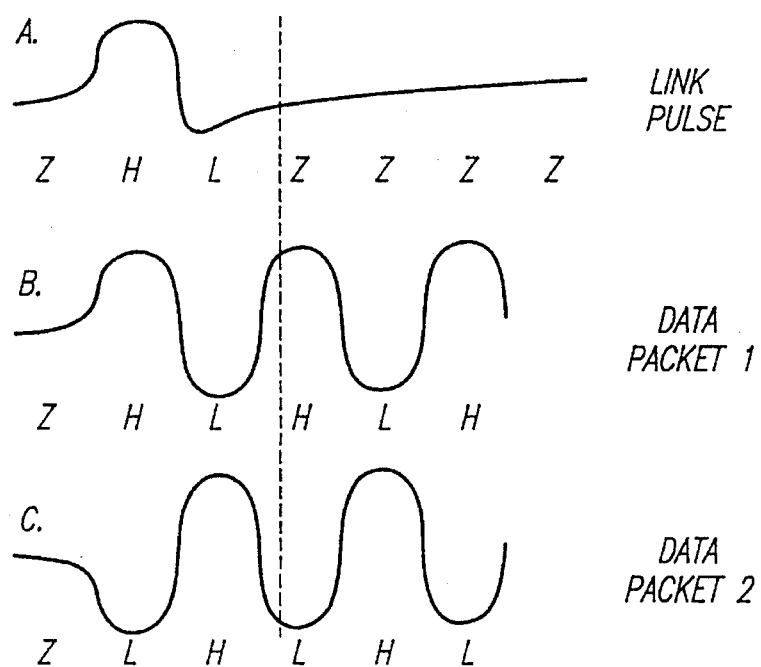
FIGS. 6A–6C are diagrams illustrating bit patterns of a link pulse and two data packets.

However, not all 10Base-T data packets begin with a negative pulse as indicated by signal B illustrated in FIG. 6. Since a MAU according to the present invention must be able to connect to an existing 10Base-T network, there is no guarantee how data packets begin. This means that the MAU can receive any one of the three types of signals illustrated in FIG. 6. The first signal A is a link pulse having a bit pattern of Z-H-L-Z where the low level in the third bit time is due to overshoot. The second signal B is a data packet 1 which begins with a positive pulse having a bit pattern of Z-H-L-H-L-H . . . Finally, there is a data packet 2 having the desired data packet format of Z-L-H-L-H . . . Since a MAU according to the present invention can receive any one of these three signals at any time (as repeaters are switched in and out), the digital logic 1500 of repeater 426 must be able to correctly identify each of them without dropping too many bits from the start of the packet.

Since only one MAU according to the present invention in a daisy-chain receives data packets from an original 10Base-T source (as shown in FIG. 3 where MAU 334 is connected to active hub 310), it is allowable that this first node take extra bits to distinguish between data packets and link pulses. It does this by examining the first three bits of the received signal. If the pattern is Z-H-L-Z, then the signal must be a link pulse and can be noted as such in the MAU's link status state machine (as described in IEEE Standard 802.3 for 10Base-T).

If the pattern is Z-L . . . , the signal must be the beginning of a data packet and the received data can be transmitted as soon as the first negative going pulse is detected. If the pattern begins Z-H-L-H . . . , the signal must be a data packet from a 10Base-T MAU rather than a MAU according to the present invention. In this case, the MAU recognizes the pattern as a data packet at the beginning of the second "H" pulse (i.e. at Z-H-L-H).

At this point, the MAU can begin retransmitting the data. However, if it did so immediately, the data packet would again begin with a positive pulse and be truncated again by the next MAU according to the present invention further down the daisy-chain. Instead, the MAU starts by beginning two negative pulses in a row, converting the data pattern from Z-H-L-H-L . . . to Z-L-L . . . This double length negative pulse distinguishes the data packet from link pulses for the benefit of MAUs further down the daisy-chain.

Alternatively, the MAU could simply wait one more bit and begin sending the data packet on the start of the second negative pulse (i.e. at Z-H-L-H-L . . . ). The advantage of adding an extra negative pulse on the start of the packet is that distinguishing a data packet from background noise on a network takes a small amount of time (although it is less than one bit time), and extending this negative pulse in the beginning increases the amount of time the receiver MAU has to recognize the incoming data packet.

Figure 7A:
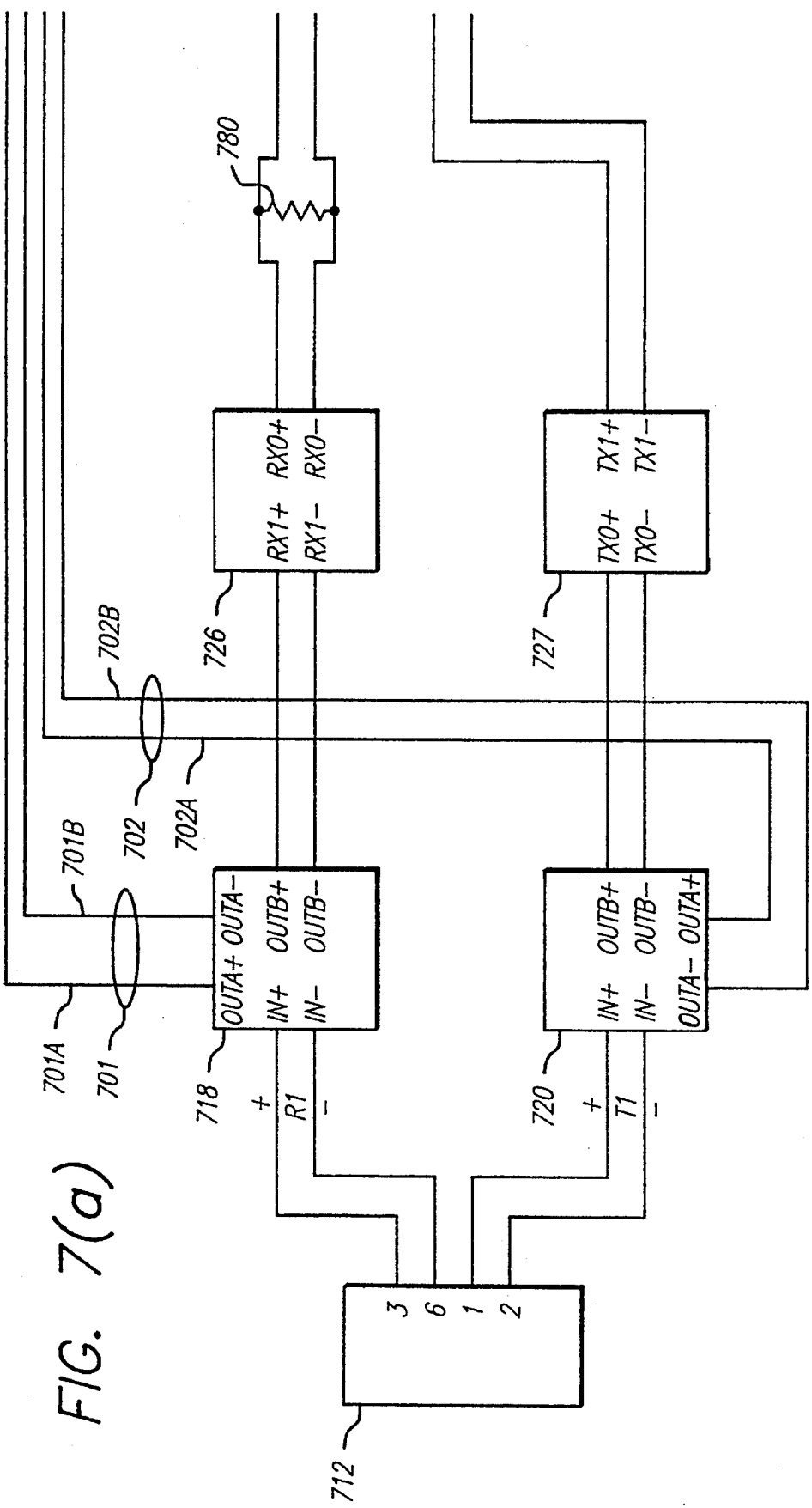
FIG. 7 is a schematic diagram of the preferred embodiment of the present invention.
Figure 7B:
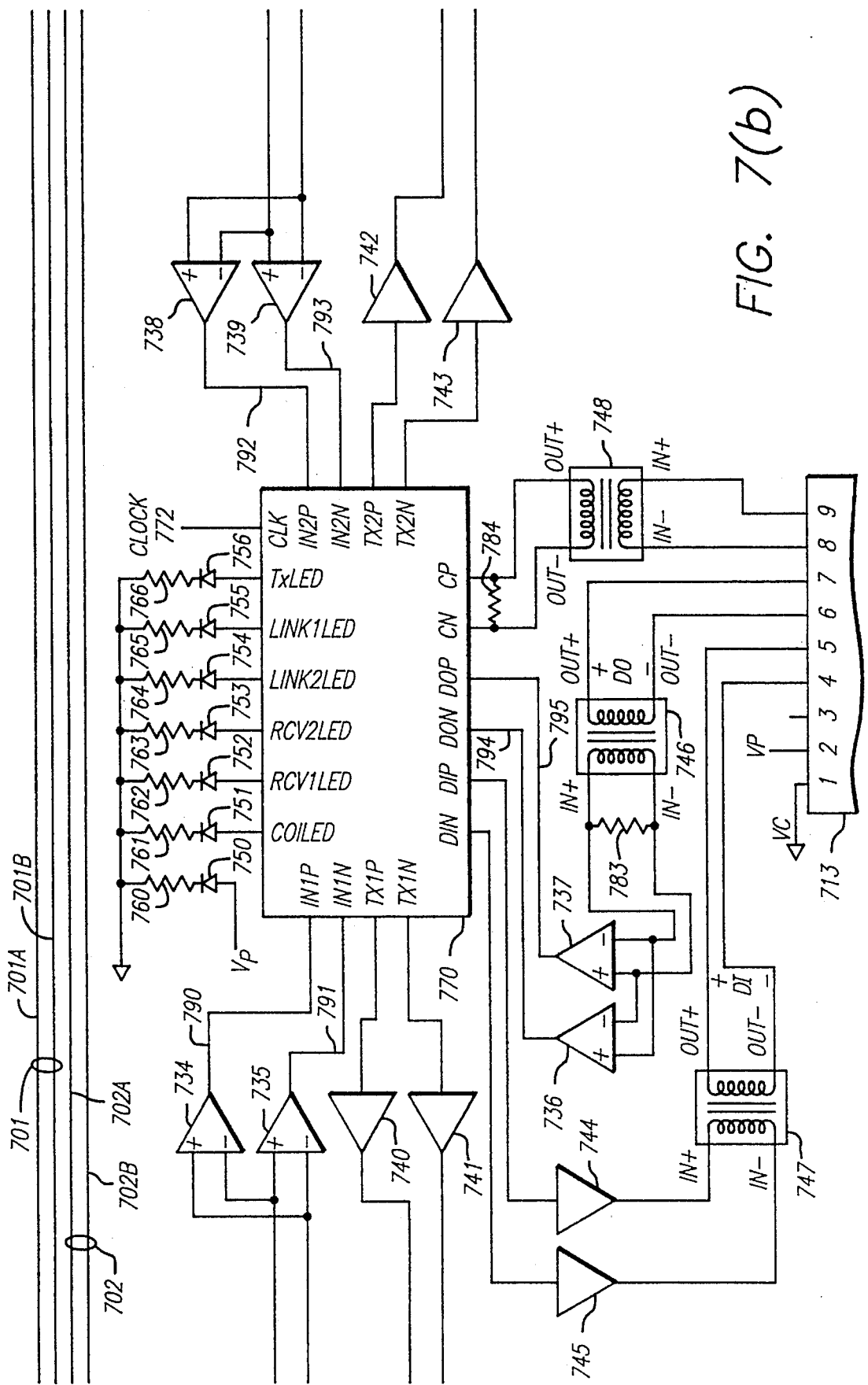
Figure 7C:
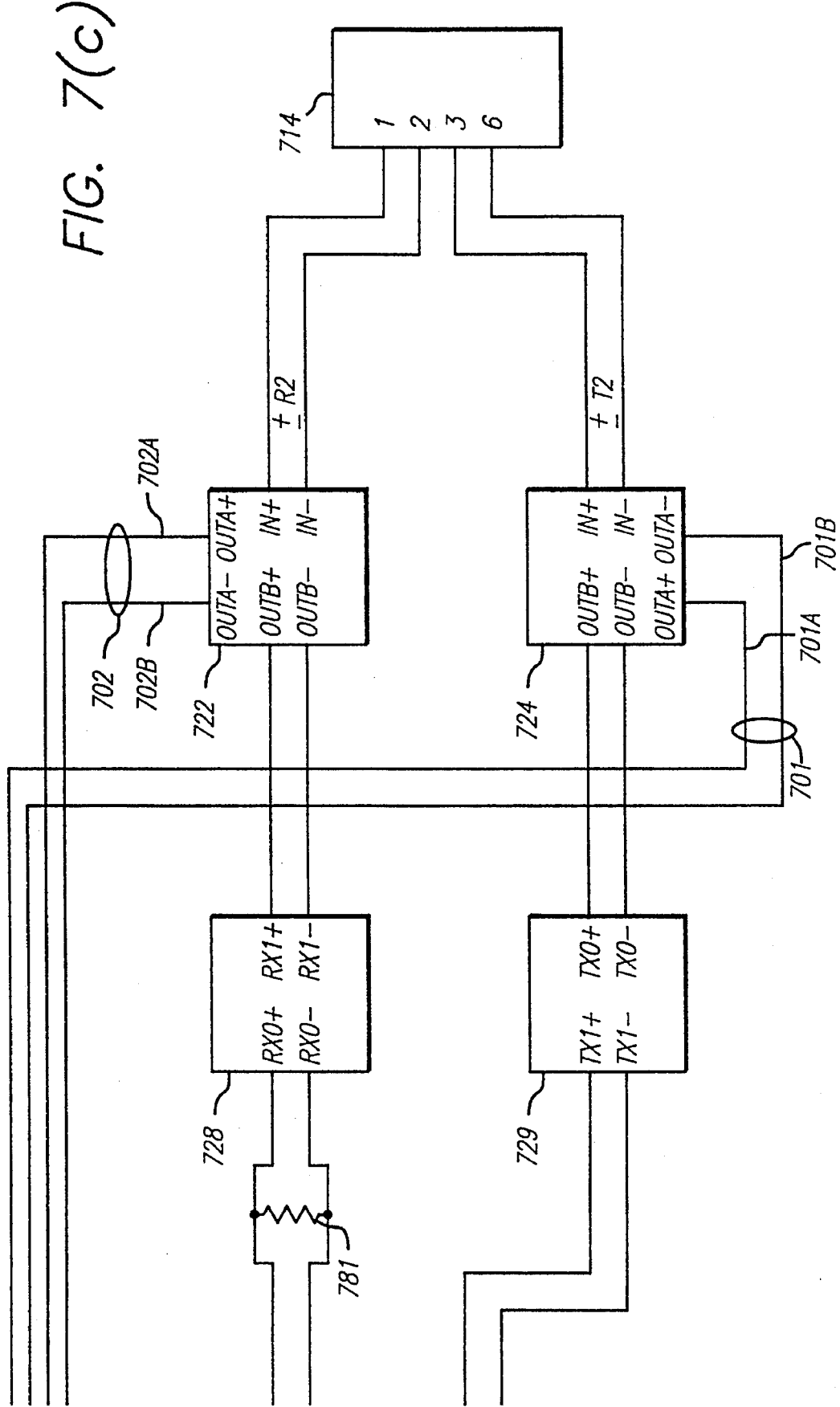

A preferred embodiment of the present invention is illustrated in FIG. 7 comprising modular connectors 712–714, relays 718 and 720, each having two inputs and four outputs, form bypass circuitry 422, relays 722 and 724, each having two inputs and four outputs, form bypass circuitry 424, and repeater 426 comprising line filters 726–729, analog receivers 734–739, line drivers 740–745, isolation transformers 746–748, LEDs 750–756, and gate array 770 that digitally processes data.

Pins 3 and 6 of modular connector 712 are coupled to inputs IN+ and IN– of relay 718, respectively. Outputs OUTA+ and OUTA– of relay 718 are coupled to outputs OUTA+ and OUTA– of relay 724 by bypass pair 701 comprising lines 701A and 701B, respectively. Outputs OUTB+ and OUTB– of relay 718 are coupled to a inputs RXI+ and RXI– of filter 726, respectively. A resistor 780 is coupled between outputs RXO+ and RXO– of filter 726. Output RXO+ of filter 726 is coupled to an inverting input of receiver 734 and to a non-inverting input of receiver 735. Output RXO– of filter 726 is coupled to a non-inverting input of receiver 734 and to an inverting input of receiver 735. The output of receiver 734 is coupled to input IN1P of gate array 770. The output of receiver 735 is coupled to input IN1N of gate array 770.

Outputs TX1P and TX1N of gate array 770 are coupled to line drivers 740 and 741, respectively. The outputs of line drivers 740 and 741 are coupled to inputs TXI+ and TXI– of filter 727, respectively. Outputs TXO+ and TXO– of filter 727 are coupled to outputs OUTB+ and OUTB– of relay 720, respectively. Outputs OUTA+ and OUTA– of relay 720 are coupled to outputs OUTA+ and OUTA– of relay 722 by bypass pair 702 comprising lines 702A and 702B, respectively. Inputs IN+ and IN– of relay 720 are coupled to pins 1 and 2 of modular connector 712, respectively.

Pins 1 and 2 of modular connector 714 are coupled to inputs IN+ and IN– of relay 722, respectively. Outputs OUTB+ and OUTB– of relay 722 are coupled to inputs RXI+ and RXI– of filter 728, respectively. A resistor 781 is coupled between outputs RXO+ and RXO– of filter 728. Output RXO– of filter 728 is coupled to an inverting input of receiver 739 and to a non-inverting input of receiver 738. Output RXO+ of filter 728 is coupled to a non-inverting input of receiver 739 and to an inverting input of receiver 738. The output 792 of receiver 738 is coupled to input IN2P of gate array 770. The output 793 of receiver 739 is coupled to input IN2N of gate array 770.

Outputs TX2P and TX2N of gate array 770 are coupled to line drivers 742 and 743. The outputs of line drivers 742 and 743 are coupled to inputs TXI+ and TXI– of filter 729, respectively. Outputs TXO+ and TXO– of filter 729 are coupled to outputs OUTB+ and OUTB– of relay 724, respectively. Inputs IN+ and IN– of relay 724 are coupled to pins 3 and 6 of modular connector 714, respectively.

Pins 1 and 2 of modular connector 713 provide AUI signals GND and VP, respectively. Pins 7 and 6 of modular connector 713 are coupled to inputs IN+ and IN– of isolation transformer 746. A resistor 783 is coupled between outputs OUT+ and OUT– of isolation transformer 746. Output OUT+ of transformer 746 is coupled to the non-inverting input of receiver 736 and the inverting input of receiver 737. Output OUT– of transformer 746 is coupled to the inverting input of receiver 736 and the non-inverting input of receiver 737. The output of receiver 736 is coupled to input DON of gate array 770. The output of receiver 737 is coupled to input DOP of gate array 770.

Outputs DIP and DIN of gate array 770 are coupled to line driver 744 and 745. The outputs of line driver 744 and 745 are coupled to inputs IN+ and IN– of transformer 747. Outputs OUT+ and OUT– of transformer 747 are coupled to pins 5 and 4 of modular connector 713, respectively. A resistor 782 is coupled between pins 5 and 4 of modular connector 713. Pins 8 and 9 of modular connector 713 are coupled to inputs IN+ and IN– of transformer 748. Outputs OUT+ and OUT– of transformer 748 to inputs CP and CN of gate array 770. A resistor 784 is coupled between outputs OUT+ and OUT– of transformer 748.

Voltage VP of pin 2 of modular connector 713 is coupled to the anode of LED 750. Resistance 760 is coupled between the cathode of LED 750 and voltage common VC of pin 1 of modular connector 713. The outputs ColLED, Rcv1LED, Rcv2LED, Link2LED, Link1LED, and TxLED of gate array 770 are coupled to the anodes of LEDs 751–756, respectively. Resistances 761–766 are coupled between the cathodes of LEDs 751–756 and voltage common VC. Clock signal 772 is provided to the CLK input of gate array 770.

Modular connectors 712 and 714 connect to a network using twisted pair cabling. Connector 712 is wired as a traditional 10Base-T MAU having pins 1 and 2 comprising a transmit pair while pins 3 and 6 comprise a receive pair. Connector 714 is a cross connect circuit having pins 1 and 2 wired so that when connector 712 of one MAU according to the present invention is connected to connector 714 of another such MAU by a 10Base-T twisted pair link, the transmit pair of the first MAU is connected to the receive pair of the other and vice versa. Connector 712 is normally used to connect to a traditional 10Base-T hub. Connector 712 of a second MAU would then connect to modular connector 714 of the first MAU, and so on.

Bypass circuitry 442 and 424 comprise four relays 718, 720, 722 and 724. Pin 2 of modular connector 713 provides power having voltage level VP from a DTE to the present invention. When a MAU according to the present invention is powered, voltage VP energizes relays 718, 720, 722 and 724. Inputs IN+ and IN– of relays 718, 720, 722 and 724 are connected to outputs OUTB+ and OUTB– of relays 718, 720, 722 and 724, respectively. Therefore, a receive circuit across pins 3 and 6 of modular connector 712 and a transmit circuit across pins 1 and 2 of modular connector 712 are connected to the inputs RXI+ and RXI– of filter 726 and outputs TXO+ and TXO– of filter 727, respectively. Similarly, a receive circuit across pins 1 and 2 of modular connector 714 and a transmit circuit across pins 3 and 6 of modular connector 714 are connected to the inputs RXI+ and RXI– of filter 728 and outputs TXO+ and TXO– of filter 729.

When a MAU according to the present invention is not powered, relays 718, 720, 722 and 724 deenergize. Inputs IN+ and IN– of relays 718, 720, 722 and 724 are connected to outputs OUTA+ and OUTA– of relays 718, 720, 722 and 724, respectively. Outputs OUTA+ and OUTA– of relay 718 are coupled to outputs OUTA+ and OUTA– of relay 724 by bypass link 701, therefore, a receive circuit across pins 3 and 6 of modular connector 712 is coupled to a transmit circuit across pins 3 and 6 of modular connector 714, respectively, by deenergized relays 718 and 724. Similarly, outputs OUTA+ and OUTA– of relay 720 are coupled to outputs OUTA+ and OUTA– of relay 722 by bypass link 702, therefore, a transmit circuit across pins 1 and 2 of modular connector 712 is coupled to a receive circuit across pins 1 and 2 of modular connector 714 by deenergized relays 720 and 722, respectively. Thus, modular connector 712 is connected to modular connector 714 which allows signals to directly pass from one connector to the other when power is not supplied to circuitry of the present invention.

The following description of the operation of the present invention illustrated in FIG. 7 is based upon proper powering of the circuit. Signals received on pins 3 and 6 of modular connector 712 pass through relay 718 into the inputs RXI+ and RXI– of filter 726, respectively. Filter 726 suppresses extraneous noise and passes signals having the desired frequency of data signals. The filtered receive signal output between RXO+ and RXO– of filter 726 is connected across resistor 780 thereby preventing reflections from propagating back into the network. Filters 726–728 can be implemented with integrated filter modules (i.e. Valor PT3877) in conjunction with appropriate resistor and capacitor values to make up the transmitter and receiver circuits of the MAU according to the present invention.

Receiver 734 (i.e. 26C32) is wired so that a positive-going signal across the outputs RXO+ and RXO– of filter 726 that exceeds the preset threshold level of receiver 734 triggers it. Receiver 735 is wired so that a negative-going signal across the outputs RXO+ and RXO– of filter 726 that goes below the preset threshold level of receiver 735 triggers it. This produces two output signals 790 and 791 from receivers 734 and 735, respectively, which together indicate whether the received signal is positive, negative or absent (high impedance). These two output signals 790 and 791 are sent to inputs IN1P and IN1N of gate array 770 for processing, respectively. Filter 728 and receivers 738 and 739 operate similarly to produce signals 792 and 793 that are sent to inputs IN2P and IN2N of gate array 770, respectively, based on signals received on modular connector 714.

Receivers 734–739 can be implemented using integrated circuits such as 26C32. When implemented with 26C32 ICs, receivers 734, 735, 738 and 739 require appropriate resistors for each input to isolate the receivers from each other due to resistors 780 and 781 across the outputs RXO+ and RXO– of filters 726 and 728 for absorbing reflections and to set a threshold level for each receiver.

The transmitter section for modular connector 712 comprises line drivers 740 and 741. The outputs TX1P and TX1N of gate array 770 are coupled to line drivers 740 and 741, respectively. Signals TX1P and TX1N indicate positive and negative going polarity data. Filter 727 removes undesired frequencies from the transmitted data according to IEEE Standard 802.3 for 10Base-T Twisted Pair and passes the filtered signals through relay 720 to pins 1 and 2 of connector 712. In a similar fashion, outputs TX2P and TX2N of gate array 770 control line drivers 742 and 743 to produce balanced signals which are sent to pins 3 and 6 of modular connector 714. Line drivers 740–743 can be implemented using integrated circuits such as 74HC365.

Although FIG. 7 shows receivers 734, 735, 738 and 739 and transmitters 740, 741, 742 and 743, these receivers and transmitters may be replaced by transceivers capable of both transmission and reception. Circuitry may be incorporated into gate array 770 to detect which pairs are to be used for transmission and which are to be used for reception and to select the transceivers accordingly. For example, if the pair present at pins 3 and 6 of connector 712 is to be used for reception and the pair present at pins 1 and 2 of connector 712 is to be used for transmission, transceivers 734 and 735 are to be selected to function as receivers and transceivers 740 and 741 are selected to function as transmitters. Alternatively, if the pair present at pins 3 and 6 of connector 712 is to be used for transmission and the pair present at pins 1 and 2 of connector 712 is to be used for reception, transceivers 734 and 735 are selected to function as transmitters and transceivers 740 and 741 are selected to function as receivers. Likewise, if the pair present at pins 1 and 2 of connector 714 is to be used for reception and the pair present at pins 3 and 6 is to be used for transmission, transceivers 738 and 739 are selected to function as receivers and transceivers 742 and 743 are selected to function as transmitters. Alternatively, if the pair present at pins 1 and 2 of connector 714 is to be used for transmission and the pair present at pins 3 and 6 is to be used for reception, transceivers 738 and 739 are selected to function as transmitters and transceivers 742 and 743 are selected to function as receivers.

Computer equipment connects to the MAU according to the present invention through a standard AUI. The AUI passes through a cable which is rewired to form a nine pin interface which connects to connector 713. Power for the MAU is provided through connector 713 on pins 2 (supply) and 1 (return). The voltage supplied by computer equipment connected to connector 713 powers relays 718, 720, 722 and 724. A passive regulator may be used to convert the voltage across pins 1 and 2 of connector 713 to lower voltages to power circuit elements using an integrated circuit such as an LM7805 and appropriate capacitances.

IEEE Standard 802.3 for 10Base-T Twisted Pair Ethernet defines the AUI as an interface between a MAU and either a DTE or a repeater (i.e. an active hub). It further states that a physical AUI is optional. The AUI consists of several differential signal interchange circuits that are defined by IEEE Standard 802.3 and is used below to describe the present invention and its operation. The interchange circuits are: Data Out (DO), Data In (DI), Control Out (CO), Control In (CI), Voltage Plus (VP) and Voltage Common (VC). The DO circuit is a differential pair that provides encoded data from a DTE. Similarly, the DI circuit is a differential pair, however, encoded data is provided by the MAU. CO and CI are differential pairs that provide encoded control signals sourced by a DTE and a MAU, respectively. VP and VC provide power transfer from a DTE to a MAU.

Data received from the computer equipment appears on receive pair DO where DOP and DON are the differential lines which connect to pins 7 and 6 of connector 713, respectively. After passing through isolation transformer 746, the signal from DO is received using a pair of receivers 736 and 737 in a manner similar to that of receivers 734, 735, 738 and 739 of the two twisted pair interfaces comprising connectors 712 and 713. The outputs 794 and 795 of receivers 736 and 737 are coupled to inputs DON and DOP of gate array 770, respectively, indicating whether a signal from a DTE is received with a positive or negative polarity, respectively. Gate array 770 processes data from the DO circuit.

Data sent to a DTE is passed from gate array 770 on outputs DIP and DIN of gate array 770 to line drivers 744 and 745, respectively. The outputs of line drivers 744 and 745 are passed through isolation transformer 747 to the computer equipment on pins 5 and 4 of connector 713. The DI circuit of the AUI comprises DIP and DIN which are the positive and negative differential lines connected to pins 5 and 4 of connector 713, respectively.

The presence of a collision on the network is indicated to a DTE using the collision signal pair CI of the AUI. The outputs CP and CN of gate array 770 are connected to pins 9 and 8 of connector 713, respectively, through isolation transformer 748. In the case of a collision, a collision signal is generated according to IEEE 802.3 Standard by gate array 770 and passed from outputs CP and CN of gate array 770 to the AUI on the CI circuit comprising CIP and CIN which are the positive and negative differential lines connected to pins 9 and 8 of connector 713, respectively.

The presence of receive signals on connectors 712, 714 and 713 are indicated by three LEDs 752, 753 and 756, respectively. Gate array 770 tests for each condition and outputs Rcv1LED, Rcv2LED and TxLED of gate array 770 enable LEDs 752, 753 and 756, respectively. The presence of good links (as defined in the IEEE Standard 802.3 for 10Base-T) on connectors 712 and 714 are indicated by two LEDs 755 and 754, respectively. Gate array 770 tests for each condition and outputs Link1LED and Link2LED of gate array 770 enable LEDs 755 and 754, respectively. LED 750 indicates a good connection on AUI connection 713 where voltage VP of pin 2 of connector 713 is provided to LED 750. The presence of a collision on the network is indicated by LED 751 which is connected to output ColLED of gate array 770.

The internal logic of gate array 770 contains digital circuitry for processing signals received from any of the three interfaces and routing them to the appropriate interface transmitter. A clock signal 772 is applied to the CLK input of gate array 770 illustrated in FIG. 7. This clock signal is referred to as clock signal GCLK in FIGS. 8–14. The present invention includes frequency division circuits implemented with divide-by-N counters well known in the art to provide clock signals having several different frequencies using clock signal 772. Therefore, the circuits for generating these signals are not shown in FIGS. 8–14. The clock signals have a single 50 nS pulse during each period of the clock signal. The following clock signals (the signal period is indicated in parentheses) are generated in gate array 770: NS_100 (period of 100 nS), NS_300 (period of 300 nS), NS_600 (600 nS), US_2P4 (2.4 µS), MS_2 (1.84 mS), MS_7 (7.37 mS), MS_20 (22.1 mS), MS_50 (44 mS), MS_100 (88.5 mS), and MS_400 (354 mS).

The Packet Detection section for a twisted pair port of gate array 770 acts as an asynchronous state machine to detect both link pulses and the start of data packets as shown in FIG. 6. Since both link pulses and data packets can begin with the same bit pattern, the packet detection state machine must examine the incoming data continuously (rather than synchronously) so that it can make a decision as soon as possible as to whether incoming data is a link pulse or a data packet.

Over short distances of cable, link pulses can ring below the zero threshold level causing the incoming link pulse pattern to begin with Z-H-L-Z-Z . . . However, incoming data packets often begin with the pattern Z-H-L-H-L . . . where the first three bits of the two patterns are the same. In order to distinguish a data packet from a link pulse, the packet detection state machine looks for a Z-H-L-H pattern which identifies a data packet. In addition, the packet detection state machine looks for a Z-L pattern which is a second bit pattern indicating a data packet. A polarity reversal could cause a link pulse to begin with this pattern. However, it is assumed that either the polarity is correct or it has been corrected elsewhere in the repeater. If only a Z-H-L-Z pattern is received, the packet detection state machine waits for a timeout (described below in the discussion concerning the Link Timeout section of gate array 770) before deciding that a link pulse is detected instead of the start of a data packet.

The Link Status machine notes the reception of link pulses and updates according to IEEE Standard 802.3. The link pulse is not repeated directly out the other side of the MAU, but rather is "eaten" by the Squelch/Link Detect circuitry. A separate Link Pulse Timer generates the link pulses to be sent out to the other twisted pair link from the MAU.

If the incoming data packet also begins with a Z-H-L-H . . . pattern, the Squelch/Link Detect circuitry also truncates the initial two bits H-L, thereby, shortening the packet by two bits. To prevent this from occurring at every MAU in the daisy-chain, the data packet sent out to the twisted pair link by the first MAU is modified so that it always begins with a Z-L . . . pattern which each subsequent MAU in the chain always recognizes as a data packet. Since the data packets tend to get shortened anyway, the MAU replaces the first H bit in the data packet with an L, thereby, turning the Z-H-L-H-L-H . . . bit sequence into Z-Z-Z-L-L-H . . . The next MAU according to the present invention has two bit times to recognize the incoming data packet.

Figure 8:
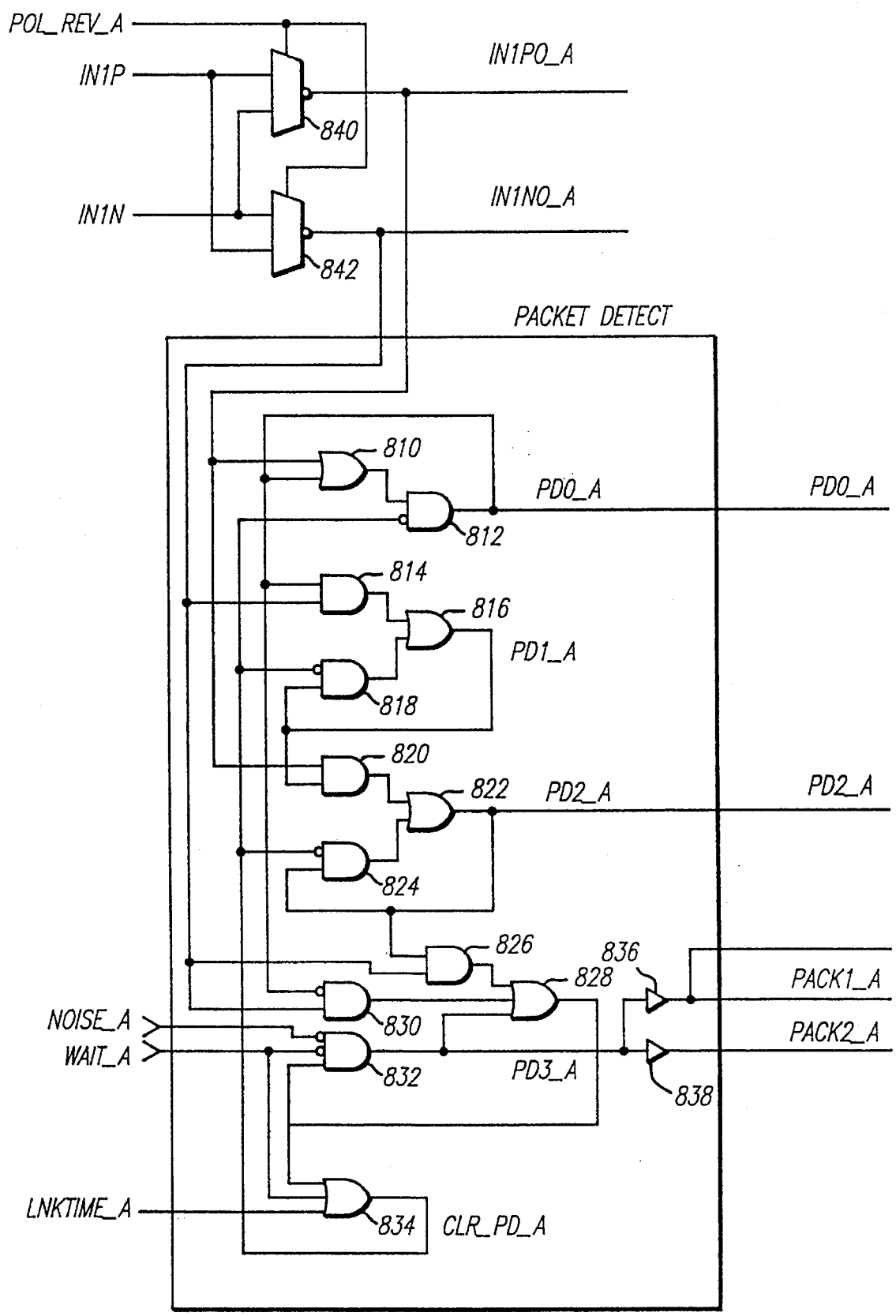
FIG. 8 is a detailed schematic of a Packet Detect state machine implemented using a Gate Array in the preferred embodiment of the present invention for a 10Base-T network port.
Figure 9A:
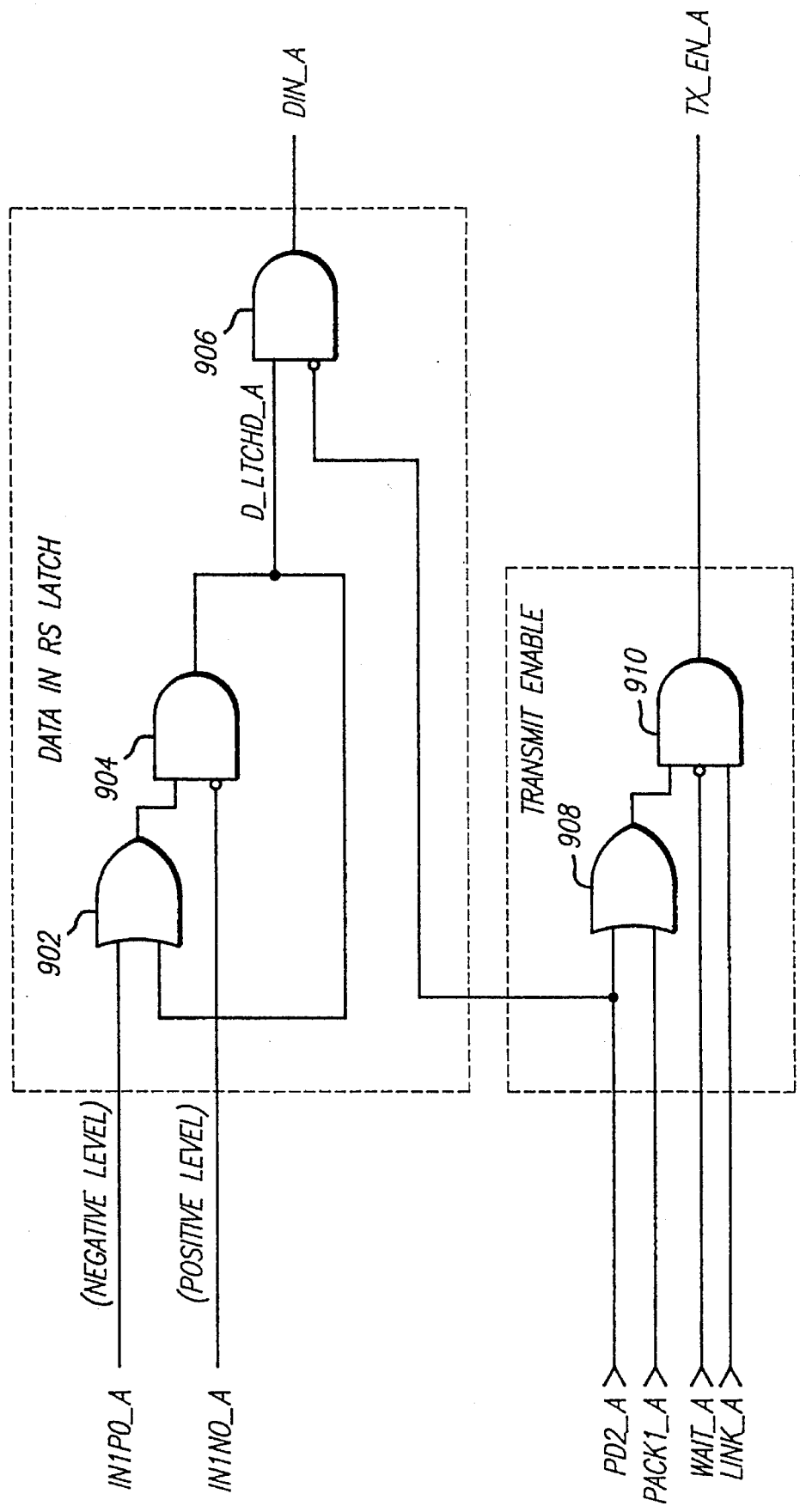
FIG. 9 is a detailed schematic of Data In Latch section, Transmission Enable Logic, Link Timeout section and Link Validate section implemented using a Gate Array in the preferred embodiment of the present invention for a 10Base-T network port.
Figure 9B:
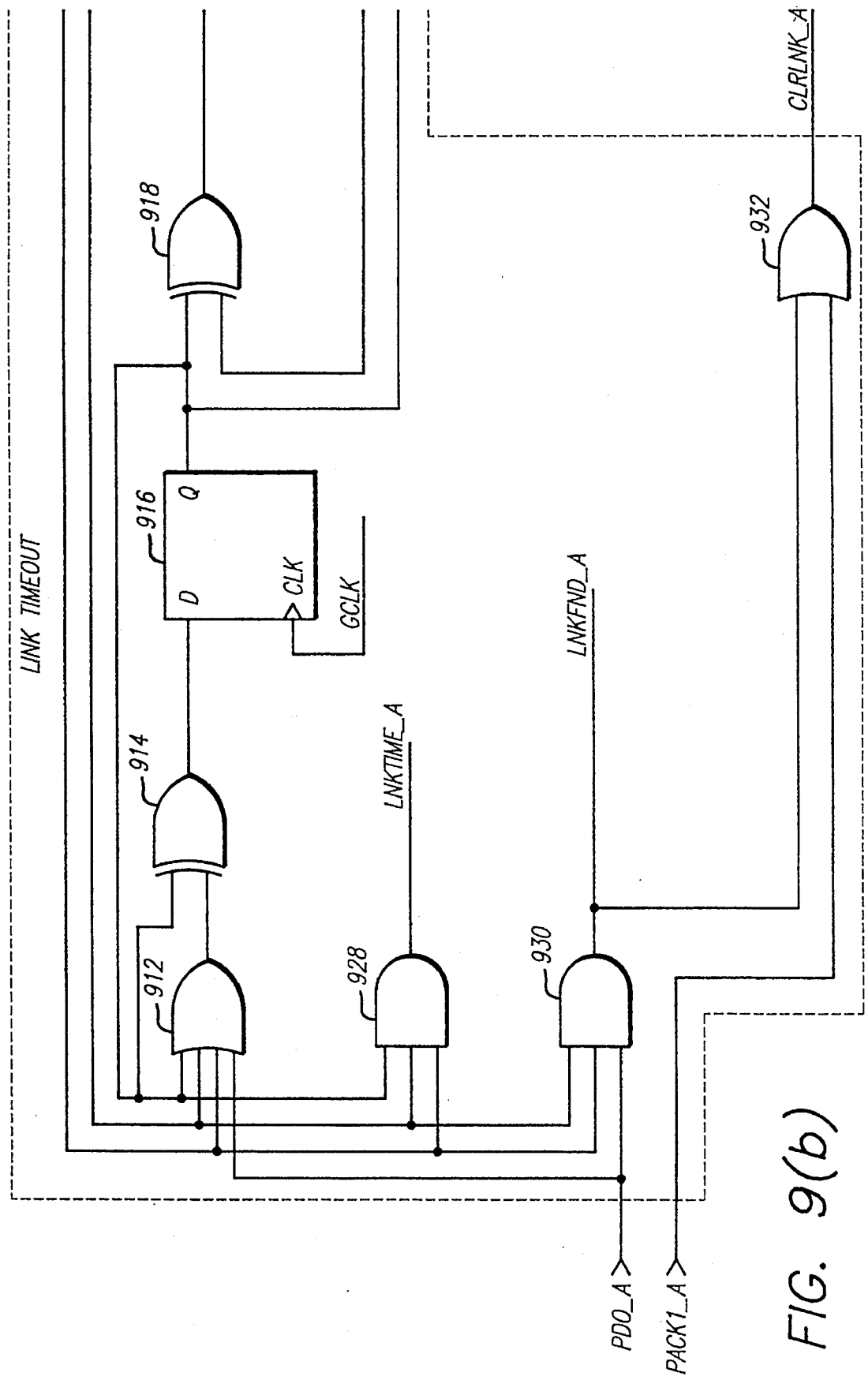
Figure 9C:
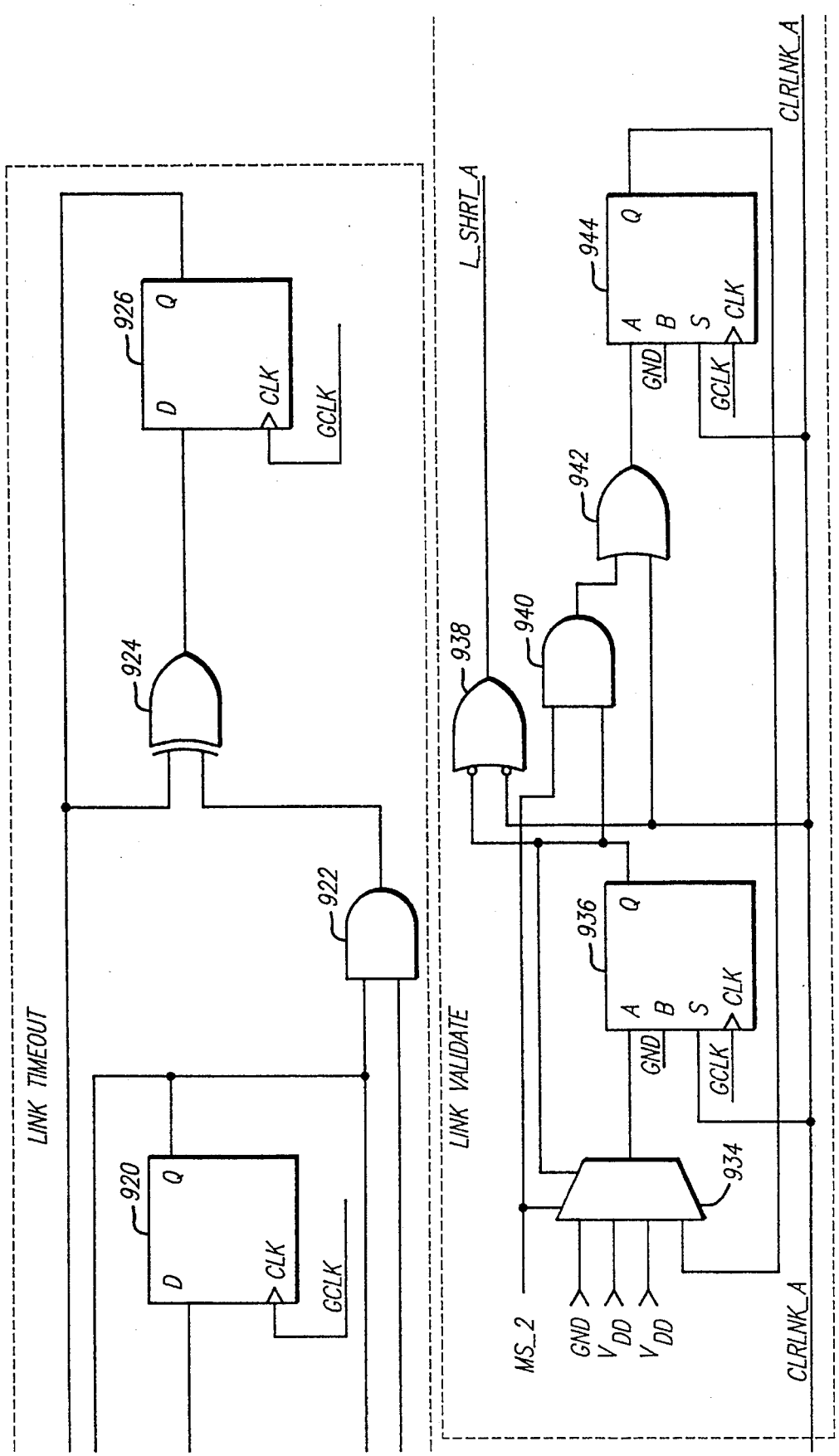
Figure 9D:
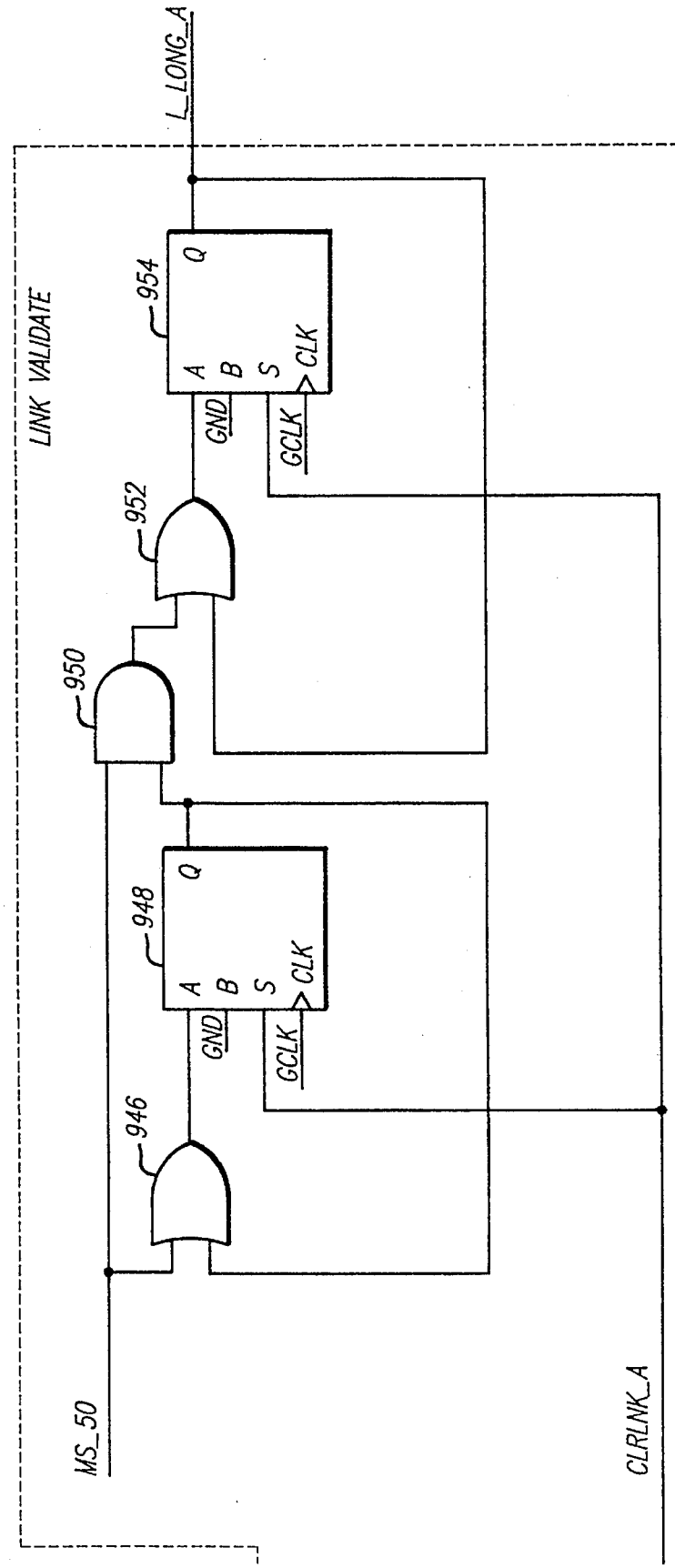

FIG. 8 is a detailed drawing illustrating the circuitry of the Packet Detect circuitry. Input signal IN1P is coupled to a first input of multiplexer 840 and to a second input of multiplexer 842. Input signal IN1N is coupled to a second input of multiplexer 840 and to a first input of multiplexer 842. A signal POL_REV_A is coupled to a select input of multiplexers 840 and 842. Signal POL_REV_A is provided by flip-flop 1622 illustrated in FIG. 16. The inverted output IN1P0_A of multiplexer 840 is coupled to an input of OR gate 810 and an input of AND gate 820. The inverted output IN1N0_A of multiplexer 842 is coupled to an input of AND gate 814, an input of AND gate 826, and an input of AND gate 830. A signal NOISE_A provided by the Q output of flip-flop 1148 of the Noise Detect section illustrated in FIG. 11 is coupled to a negated input of AND gate 832. A signal WAIT_A provided by the output of AND gate 1128 of the EOP Detection section illustrated in FIG. 11 is coupled to another negated input of AND gate 832 and an input of OR gate 834. A signal LNKTIME_A provided by the output of AND gate 930 of the Link Timeout Section illustrated in FIG. 9 is coupled to an input of OR gate 834.

Output CLR_PD_A of OR gate 834 is coupled to a negated input of AND gate 824, a negated input of AND gate 818 and a negated input of AND gate 812. The output of OR gate 810 is coupled to an input of AND gate 812. The output PD0_A of AND gate 812 is coupled to an input of OR gate 810, an input of AND gate 814 and a negated input of AND gate 830. The output of AND gate 814 is coupled to an input of OR gate 816. The output PD1_A of OR gate 816 is coupled to an input of AND gate 818 and an input of AND gate 820. The output of AND gate 818 is coupled to an input of OR gate 816.

The output of AND gate 820 is coupled to an input of OR gate 822. Output PD2_A of OR gate 822 is coupled to an input of AND gate 824 and an input of AND gate 826. The output of AND gate 824 is coupled to an input of OR gate 822. The output of AND gate 826 is coupled to an input of OR gate 828. The output of AND gate 830 is coupled to an input of OR gate 828. The output of AND gate 832 is coupled to an input of OR gate 828. The output PD3_A of OR gate 828 is coupled to an input of AND gate 832 and an input of OR gate 834. The output of AND gate 832 is coupled to an input of buffer 836 and to an input of buffer 838. The output of buffer 836 is signal PACK1_A and the output of buffer 838 is signal PACK2_A.

The Packet Detect state machine is built with RS latches. Because the gate array (ACTEL) does not provide an RS latch macro, each latch is built using AND and OR gates with a feedback path. There are four stages in the state machine labelled PD0_A–PD3_A shown in FIG. 8. The operation of the Packet Detect state machine is discussed below assuming that it starts in the idle state having all LOWs.

If a negative-going signal is received, IN1N goes LOW causing output PD3_A of AND gate 832 to become HIGH. This indicates reception of a packet. The output PD3_A being HIGH clears and holds clear the outputs PD0_A–PD2_A by causing output CLR_PD_A to be HIGH. The output PD3_A remains latched until a signal WAIT_A is received indicating that the end of packet has been detected and the repeater is waiting for the line to settle. If a positive-going signal is detected, IN1P goes LOW causing PD0_A to go HIGH. PD0_A being HIGH enables the next latch having output PD1_A which is looking for IN1N to go LOW. When the incoming signal falls below −400 mV, IN1N goes LOW and the output PD1_A of OR gate 816 becomes HIGH. The output PD1_A then enables the next latch having output PD2_A which is waiting for a positive signal again (IN1P is LOW).

At this point the data packet received could be either a data packet or a link pulse. If the state machine stays in this state for longer than 100 nS, the output LNKTIME_A of the Link Timeout section shown in FIG. 9 resets the state machine to the idle state. Timing out LNKTIME_A also sends a pulse to the Link Status state machine shown in FIG. 10 which keeps track of the state of the twisted pair link. If the incoming data goes positive once again, IN1P goes LOW and sets the output PD2_A of the third RS latch comprising AND gates 820 and 824 and OR gate 822. At this point, the incoming data must be a data packet.

The Packet Detect state machine prefers incoming data packets to start with a negative transition. To aid other MAUs according to the present invention further down the chain, it is preferable to start all packets with a negative pulse (L) for the first transmitted bit. This beginning negative pulse is lengthened by beginning to transmit a negative signal immediately after output PD2_A is set HIGH. This compensates for shortening of the first bit by MAU links that are down the chain (the IEEE Standard 802.3 for 10Base-T Twisted Pair allows phase violations for the first bit).

With output PD2_A set HIGH, the next negative transition sets output PD3_A to HIGH. This first clears the other bits of the Packet Detect state machine by setting output CLR_PD_A to HIGH. With output PD2_A cleared and PD3_A set HIGH, data is sent out instead of a "0" (although the data at this point is also a "0"). Output PD2_A also indicates to the rest of the circuitry that a packet has been detected.

FIG. 9 is a block diagram illustrating Transmit Enable circuitry, a Data In RS Latch, a Link Timeout section, and a Link Validate section. The Data In RS Latch comprises OR gate 902 and AND gates 904 and 906. The inverted output INP0_A of multiplexer 840 of FIG. 8 is coupled to an input of OR gate 902. The inverted output INN0_A of multiplexer 842 of FIG. 8 is coupled to negated input of AND gate 904. The output of OR gate 902 is coupled to an input of AND gate 904. The output of AND gate 904 is coupled to an input of AND gate 906 and an input of OR gate 902. The output PD2_A of OR gate 822 of FIG. 8 is coupled to an input of OR gate 908 and to a negated input of AND gate 906. The output of AND gate 906 is output signal DIN_A.

The Transmit Enable circuit comprises OR gate 908 and AND gate 910. The output PACK1_A of buffer 836 of FIG. 8 is coupled to an input of OR gate 908. Signal WAIT_A is coupled to a negated input of AND gate 910. A signal LINK_A is coupled to an input of AND gate 910. The output of OR gate 908 is coupled to an input of AND gate 910. The output of AND gate 910 is signal TX_EN_A. An output PD0_A of AND gate 812 of FIG. 8 is coupled to an input of AND gate 930 and an input of OR gate 912.

The Link Timeout section comprises AND gates 922, 928 and 930, OR gates 912 and 932, exclusive-OR gates 914, 918 and 924, and flip-flops 916, 920 and 926. An output PACK1_A of buffer 836 of FIG. 8 is coupled to an input of OR gate 932. The output of OR gate 912 is coupled to an input of exclusive-OR gate 914. The output of exclusive-OR gate 914 is coupled to a D input of flip-flop 916. A clock signal GCLK is input to the CLK input of flip-flop 916. The Q output of flip-flop 916 is coupled to an input of exclusive-OR gate 918, an input of AND gate 922, an input of exclusive-OR gate 914, an input of OR gate 912 and an input of AND gate 928. The output of exclusive-OR gate 918 is coupled to a D input of flip-flop 920. A signal GCLK is coupled to the CLK input of flip-flop 920. The Q output of flip-flop 920 is coupled to an input of AND gate 922, an input of exclusive-OR gate 918, an input of OR gate 912, an input of AND gate 928 and an input of AND gate 930.

The output of AND gate 922 is coupled to an input of exclusive-OR gate 924. The output of exclusive-OR gate 924 is coupled to a D input of flip-flop 926. A signal GCLK is coupled to the CLK input of flip-flop 926. The Q output of flip-flop 926 is coupled to an input of exclusive-OR gate 924, an input of OR gate 912, an input of AND gate 928 and an input of AND gate 930. The output of AND gate 928 is a signal LNKTIME_A. The output of AND gate 930 is a signal LNKFND_A.

The Link Validate section comprises multiplexer 934, OR gates 938, 942, 946 and 952, AND gates 940 and 950, and flip-flops 936, 944, 948 and 954. The output CLRLNK_A of OR gate 932 is coupled to an S input of flip-flops 936, 944, 948 and 954. The CLK input of flip-flops 936, 944, 948 and 954 are coupled to signal GCLK. The B input of flip-flops 936, 944, 948 and 954 are coupled to ground. A clock signal MS_2 is coupled to a select S input of multiplexer 934 and an input of AND gate 940. A data input of multiplexer 934 is coupled to ground. Another data input of multiplexer 934 is coupled to supply voltage $V_{DD}$. A third input of multiplexer 934 is coupled to supply voltage $V_{DD}$. The Q output of flip-flop 944 is coupled to another data input of multiplexer 934. The output of multiplexer 934 is coupled to an A input of flip-flop 936.

The Q output of flip-flop 936 is coupled to an input of AND gate 940, a negated input of OR gate 938 and an S input of multiplexer 934. The output of OR gate 938 is signal L_SHRT_A. The output of AND gate 940 is coupled to an input of OR gate 942. The output of OR gate 942 is coupled to an A input of flip-flop 944. A clock signal MS_50 is coupled to an input of OR gate 946 and an input of AND gate 950. The output of OR gate 946 is coupled to an A input of flip-flop 948. The Q output of flip-flop 948 is coupled to an input of AND gate 950 and an input of OR gate 946. The output of AND gate 950 is coupled to an input of OR gate 952. The output of OR gate 952 is coupled to an A input of flip-flop 954. The output L_LONG_A of flip-flop 954 is coupled to an input of OR gate 952.

The Link Timeout section illustrated in FIG. 9 is a three bit counter comprising flip-flops 916, 920 and 926 which times out 300 nS after any incoming data is received that starts with a positive transition. Thus, signal PD0_A going HIGH enables the counter which continues to count until it rolls over to 000. At any time from 250–300 nS after PD0_A becomes HIGH, the output LNKFND_A of AND gate 930 goes HIGH. If LNKFND_A is still HIGH at the next rising clock of GCLK (300–350 nS after PD0_A goes HIGH), a link pulse is recorded in the Link Status state machine illustrated in FIG. 10. After the next clock (again 300–350 nS after PD0_A goes HIGH), an output LNKTIME_A of AND gate 928 which is coupled to an input of OR gate 834 goes HIGH, thereby, clearing the lower bits of the Packet Detect state machine. If a data packet were being received, it should have been recorded by this time.

The Link Validate circuit illustrated in FIG. 9 consists of two sections: one section to detect when link pulses are too close together producing an output L_SHRT_A and another section to determine when they are too far apart producing an output L_LONG_A. In order to save on modules, the resolution of these two sections has been reduced, but remains within the IEEE Standard 802.3 specification for 10Base-T Twisted Pair. The first section consists of a two bit counter which counts the number of pulses of a clock signal MS_2 since the last link pulse. The clock signal MS_2 sends a pulse every 2 mS, so, by the time that the counter has reached 11 at least 4–6 mS has elapsed since the previous link pulse. Thus, if the counter has reached 11, the incoming link pulse does not occur too close after the previous link pulse (or data packet) and the signal L_SHRT_A (link is too short) becomes LOW. Prior to the counter reaching 11, L_SHRT_A is HIGH.

The second section of the Link Validate circuit insures that at least 50–100 mS has elapsed between link pulses before the link is considered lost. MS_50 is a 50 mS clock having a 50 nS pulse per interval for timing the link fail interval for the Link Status state machine. The first pulse from MS_50 sets the Q output of flip-flop 948 to HIGH and the second pulse sets the output L_LONG_A of flip-flop 954 (link pulse is too long) to HIGH. Since the pulses are 50 mS apart, 50 mS must elapse before output L_LONG_A is set HIGH. The two signals L_LONG and L_SHRT_A are coupled to the Link Status state machine shown in FIG. 10.

Figure 10:
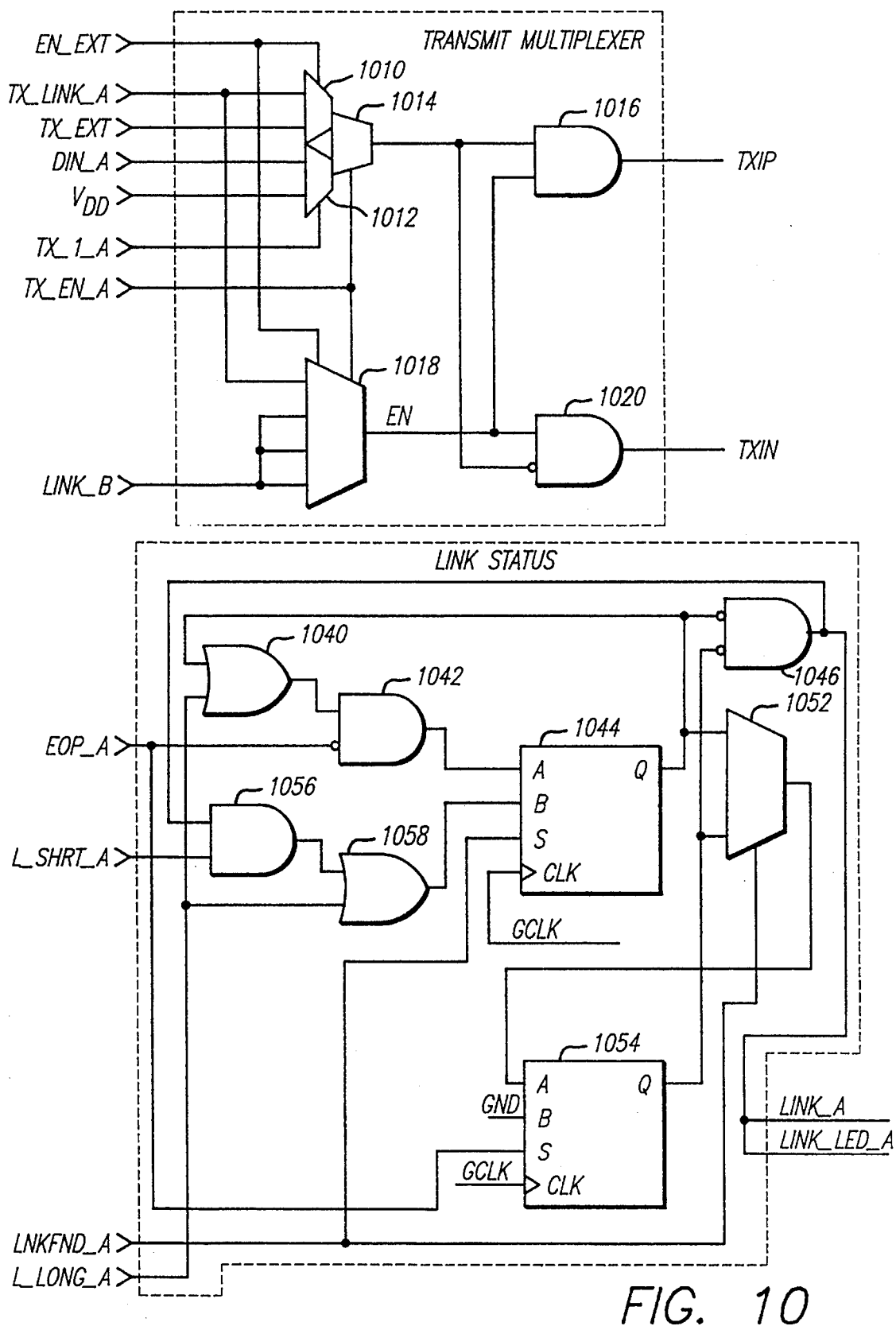
FIG. 10 is a detailed schematic of Transmit Multiplexer section and Link Status state machine implemented using a Gate Array in the preferred embodiment of the present invention for a 10Base-T network port.
Figure 11A:
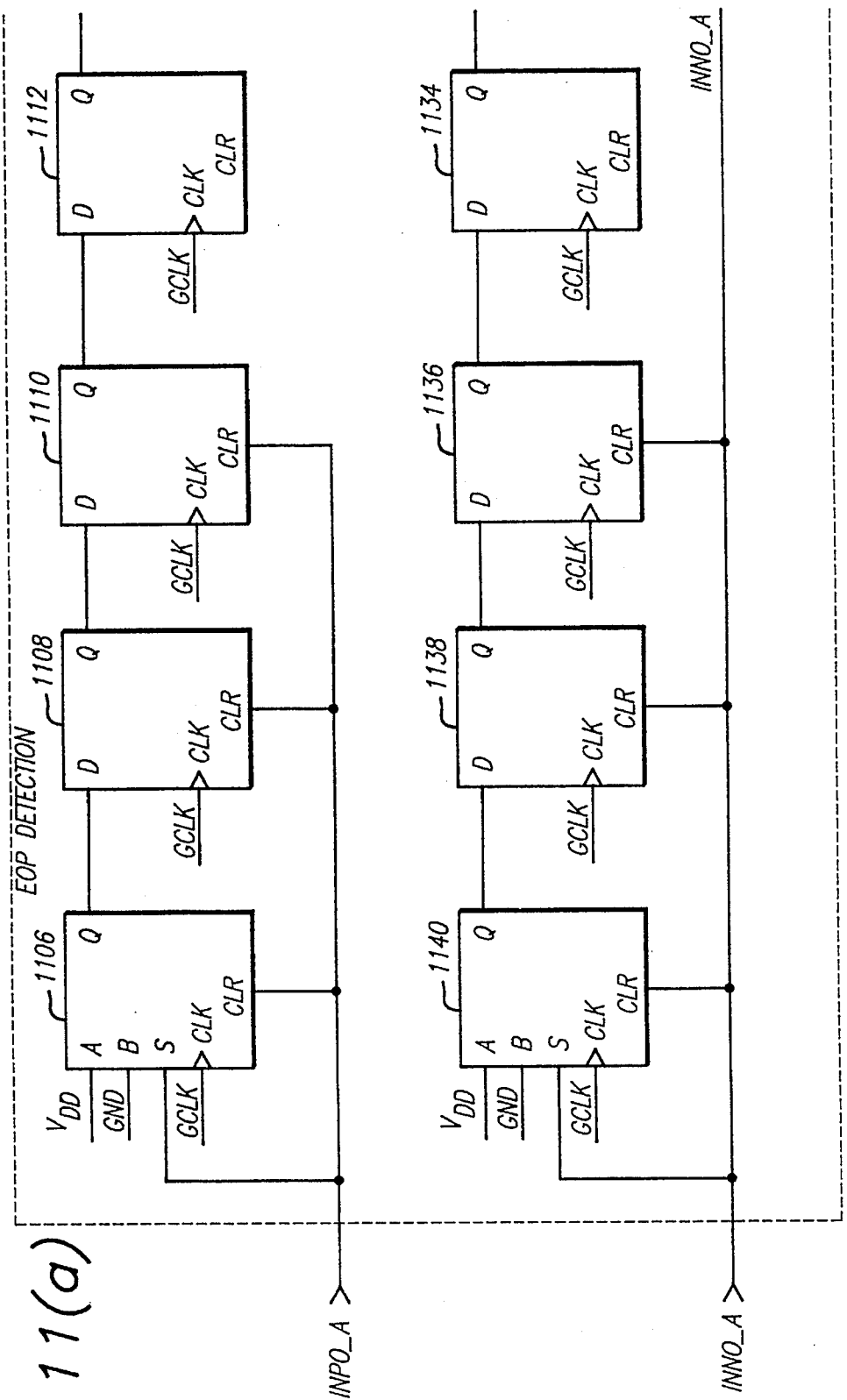
FIG. 11 is a detailed schematic of an EOP section, Noise Detect section and a Receive LED Timer implemented using a Gate Array in the preferred embodiment of the present invention for a 10Base-T network port.
Figure 11B:
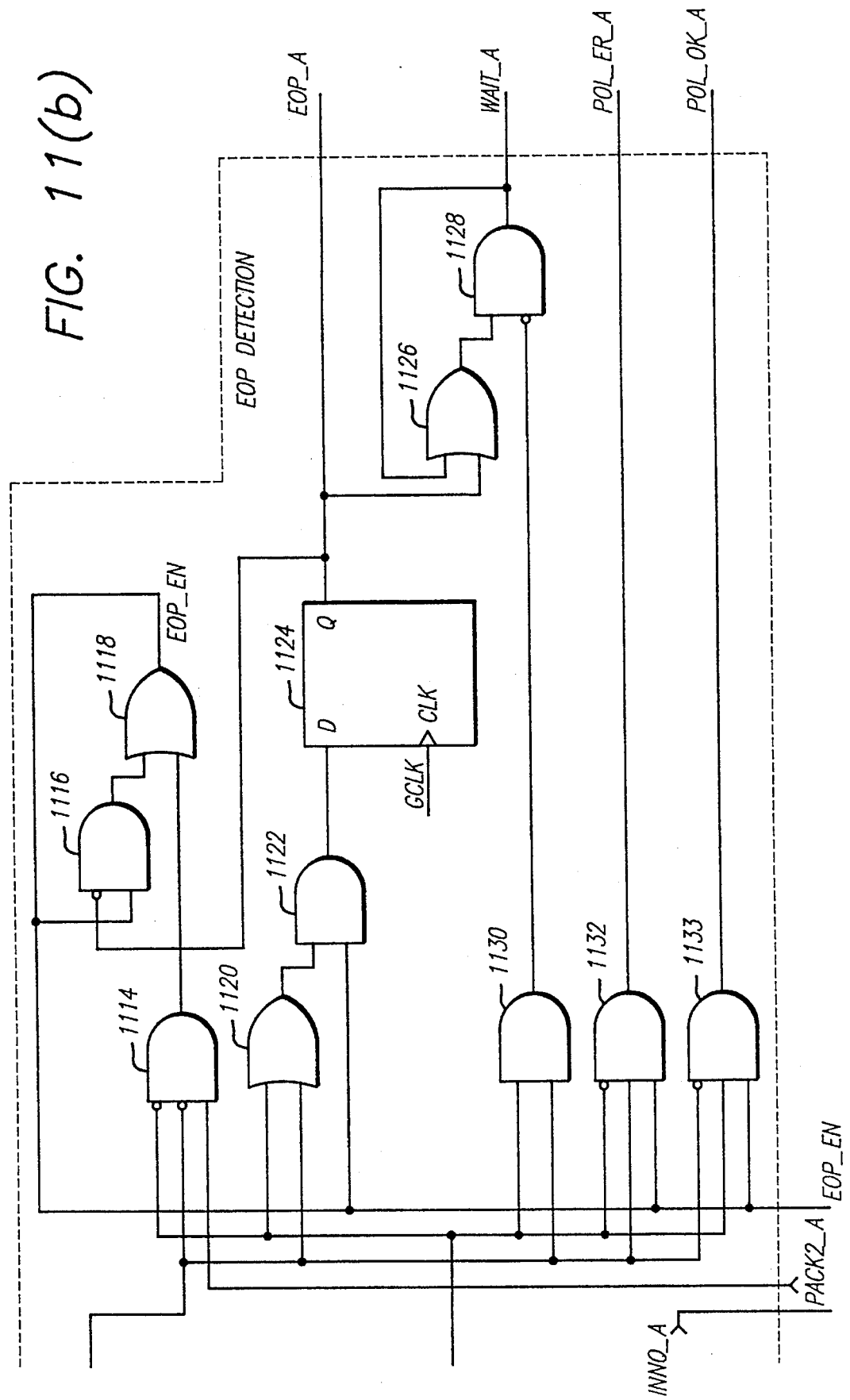
Figure 11C:
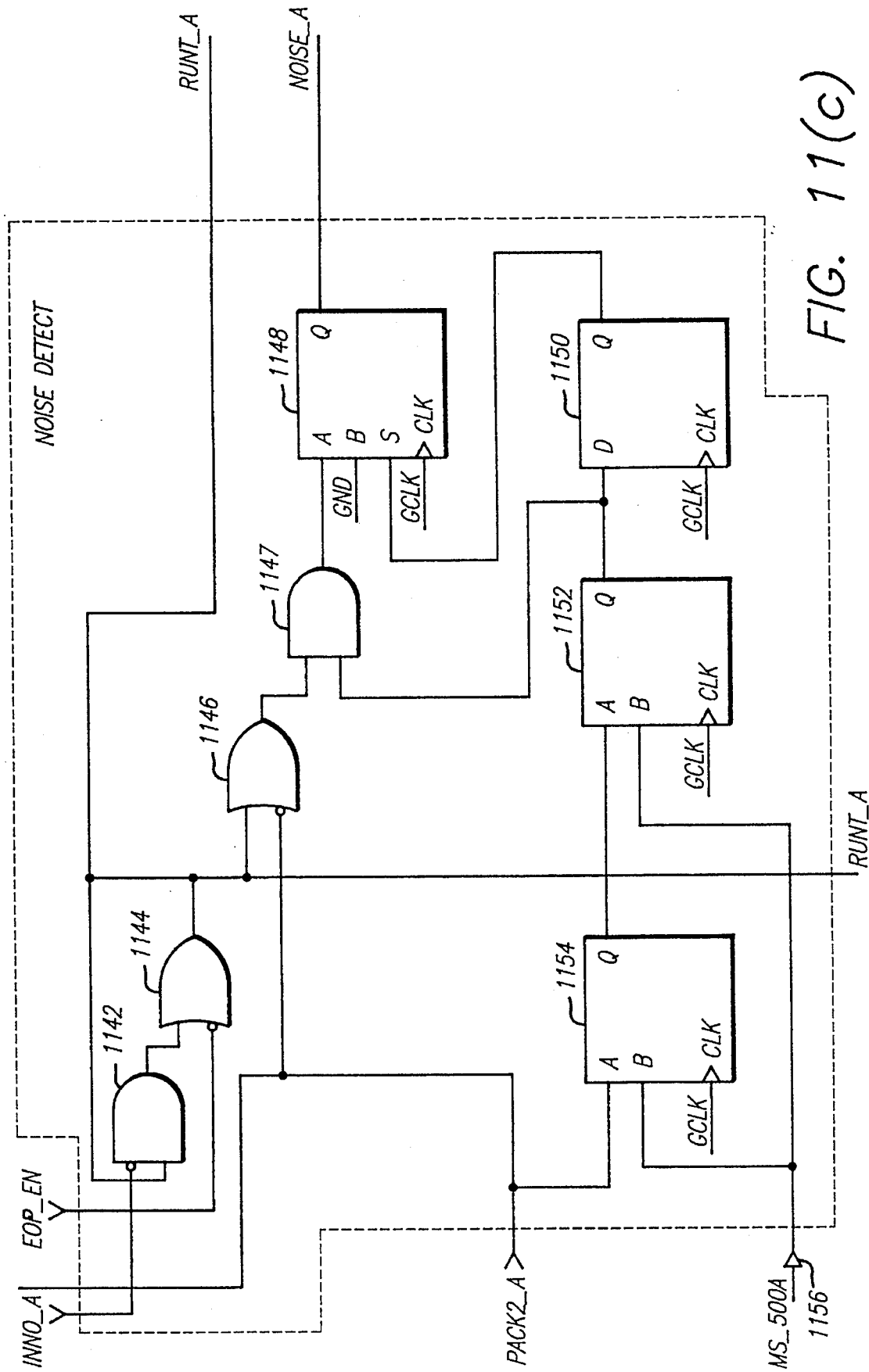
Figure 11D:
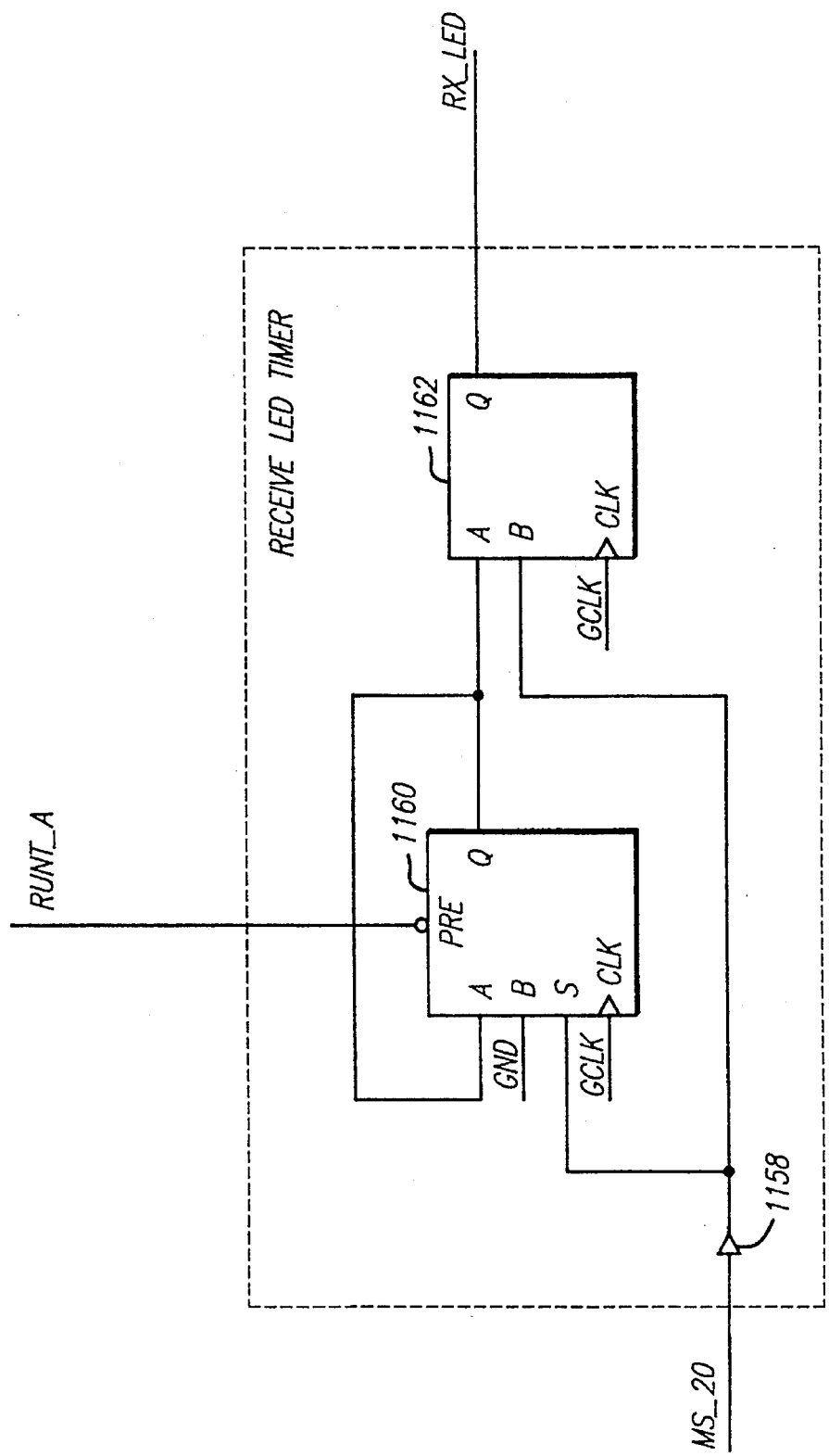

FIG. 10 is a detailed drawing of a Transmit Multiplexer and Link Status section. The Transmit Multiplexer comprises multiplexers 1010, 1012, 1014 and 1018. A signal EN_EXT is connected to a select input of multiplexer 1010 and a select input of multiplexer 1018. A signal TX_LINK_A is coupled to a data input of multiplexer 1010 and a data input of multiplexer 1018. A signal TX_EXT is coupled to a data input of multiplexer 1010. A signal DIN_A is coupled to a data input of multiplexer 1012. An input of multiplexer 1012 is connected to supply voltage $V_{DD}$. A signal TX_1_A is coupled to a select input of multiplexer 1012. A signal TX_EN_A is coupled to a select input of multiplexer 1014 and to a select input of multiplexer 1018. A signal LINK_B is coupled to three data inputs of multiplexer 1018. The output of multiplexer of 1014 is coupled to an input of AND gate 1016 and negated input of AND gate 1020. The output of AND gate 1016 is signal TX1P. The output of multiplexer 1018 is coupled to an input of AND gates 1016 and 1020. The output of AND gate 1020 is a signal TX1N.

The Link Status section comprises OR gates 1040 and 1058, AND gates 1042, 1046 and 1056, flip-flops 1044 and 1054, and multiplexer 1044. A signal EOP_A is coupled to a negated input of AND gate 1042 and to an S input of flip-flop 1054. A signal L_SHRT_A is coupled to an input of AND gate 1056. A signal LNKFND_A is coupled to an S input of flip-flop 1044 and to a select input of multiplexer 1052.

A signal L_LONG_A is coupled to an input of OR gate 1058 and an input of OR gate 1040. The output of OR gate 1040 is coupled to an input of AND gate 1042. The output of AND gate 1042 is coupled to an A input of flip-flop 1044. The output of AND gate 1056 is coupled to an input of OR gate 1058. The output of OR gate 1058 is coupled to a B input of flip-flop 1044. A signal GCLK is coupled to a CLK input of flip-flop 1044. The output of AND gate 1046 is coupled to a negated input of AND gate 1056. The output of AND gate 1046 is a signal LINK_A and a signal LINK_LED_A.

The Link Status state machine follows the algorithm for determining the state of a link between two nodes that is described in IEEE Standard 802.3 specification. If the time elapsed between link pulses or packets exceeds 50–150 mS, the state machine enters the fail state. Once in this state, two link pulses must be received in a row which are neither too close together (less than 6 mS) nor too far apart (50–150 mS) to reset the Link Status state machine to the link good state. Alternatively, a packet also resets it to the link good state.

The Link Status machine uses signals LNKFND, EOP, L_LONG_A and L_SHRT_A to determine the state of the link between two nodes. An EOP signal indicating that a packet has been received resets the state to good causing output LINK_A to become HIGH. The L_SHRT_A signal is ignored unless the state is link fail. L_LONG_A indicates that a link pulse is missing thereby setting the Q output of flip-flop 1044 to HIGH, and putting the state machine in the link fail state causing output LINK_A to become LOW. This also causes the cross connect section to begin searching for a connection by swapping the transmit and receive pairs. If the Q output of flip-flop 1044 is already set HIGH, a LNKFND_A and L_SHRT_A pulse keeps it set HIGH. If a LNKFND_A pulse occurs with signals L_SHRT_A and L_LONG_A both LOW, the Q output of flip-flop 1044 is cleared to LOW indicating that the first good link pulse has been found. When the Q output of 1044 goes low, the cross connect section stops searching and retains the current selection of transmit and receive pairs.

The state of flip-flop 1044 is clocked into flip-flop 1054 each time a link pulse is found (LNKFND_A). Thus, only after two consecutive good link pulses (or one EOP signal which always resets both bits of the Link Status state machine) both Q outputs of flip-flops 1044 and 1054 are cleared. When both Q outputs of flip-flops 1044 and 1054 are cleared, the Link Status state machine is in the link good state having output LINK_A set HIGH. The link LED is lit by output LINK_LED indicating a link good state, and packets are again relayed.

FIG. 10A is a detailed schematic diagram illustrating a link status state machine of one embodiment of the present invention. Signal LSHRT0_A is applied to the inverted A input of OR gate 1088. Signal LSHRT1_A is applied to the inverted B input of OR gate 1088. The output of OR gate 1088 is coupled to the B input of AND gate 1076. Signal RUNT_A is applied to an input of AND gate 1062 and to the S input of flip-flop 1074. Signal LNKFND_A is applied to the S input of flip-flop 1064 and to the S input of 2-input multiplexer 1072. Signal L_LONG_A is applied to the B input of OR gate 1060 and to the C input of OR gate 1078. The output of OR gate 1060 is coupled to an input of AND gate 1062. The output of AND gate 1076 is coupled to an input of OR gate 1078.

The output of AND gate 1062 is coupled to the A input of flip-flop 1064. The output of OR gate 1078 is coupled to the B input of flip-flop 1064. Clock signal GCLK is applied to the clock (CLK) input of flip-flop 1064. The Q output of flip-flop 1064 provides signal LNK_STO_A and is coupled to the A input of OR gate 1060, to the inverted A input of AND gate 1066 and to the B input of 2-input multiplexer 1072. The output of 2-input multiplexer 1072 is coupled to the B input of flip-flop 1074. The A input of flip-flop 1074 is coupled to ground. Clock signal GCLK is coupled to the clock (CLK) input of flip-flop 1074. The Q output of flip-flop 1074 is coupled to the A input of 2-input multiplexer 1072 and to the inverted B input of AND gate 1066.

The output of AND gate 1066 provides signal LINK0_A and is coupled to the inverted A input of AND gate 1076 and to the S input of flip-flop 1084. Clock signal GCLK is coupled to the clock (CLK) input of flip-flop 1084. The A input of flip-flop 1084 is coupled to ground. Signal RUNT_A is coupled to the A input of AND gate 1080. Signal NS3 is coupled to the B input of AND gate 1080. The output of AND gate 1080 is coupled to an input of OR gate 1082. The output of OR gate 1082 is coupled to the B input of flip-flop 1084. The Q output of flip-flop 1084 provides signal LINK_A and is coupled to an input of OR gate 1082 and to the input of inverter 1086. The output of inverter 1086 provides signal LINK_LED.

The LINK_A (link status good) output may be used to drive autocrossover circuitry to automatically select the appropriate receive and transmit pairs of the twisted pair interface. Background information relating to this approach may be found in IEEE Standard 802.3.

Figure 12:
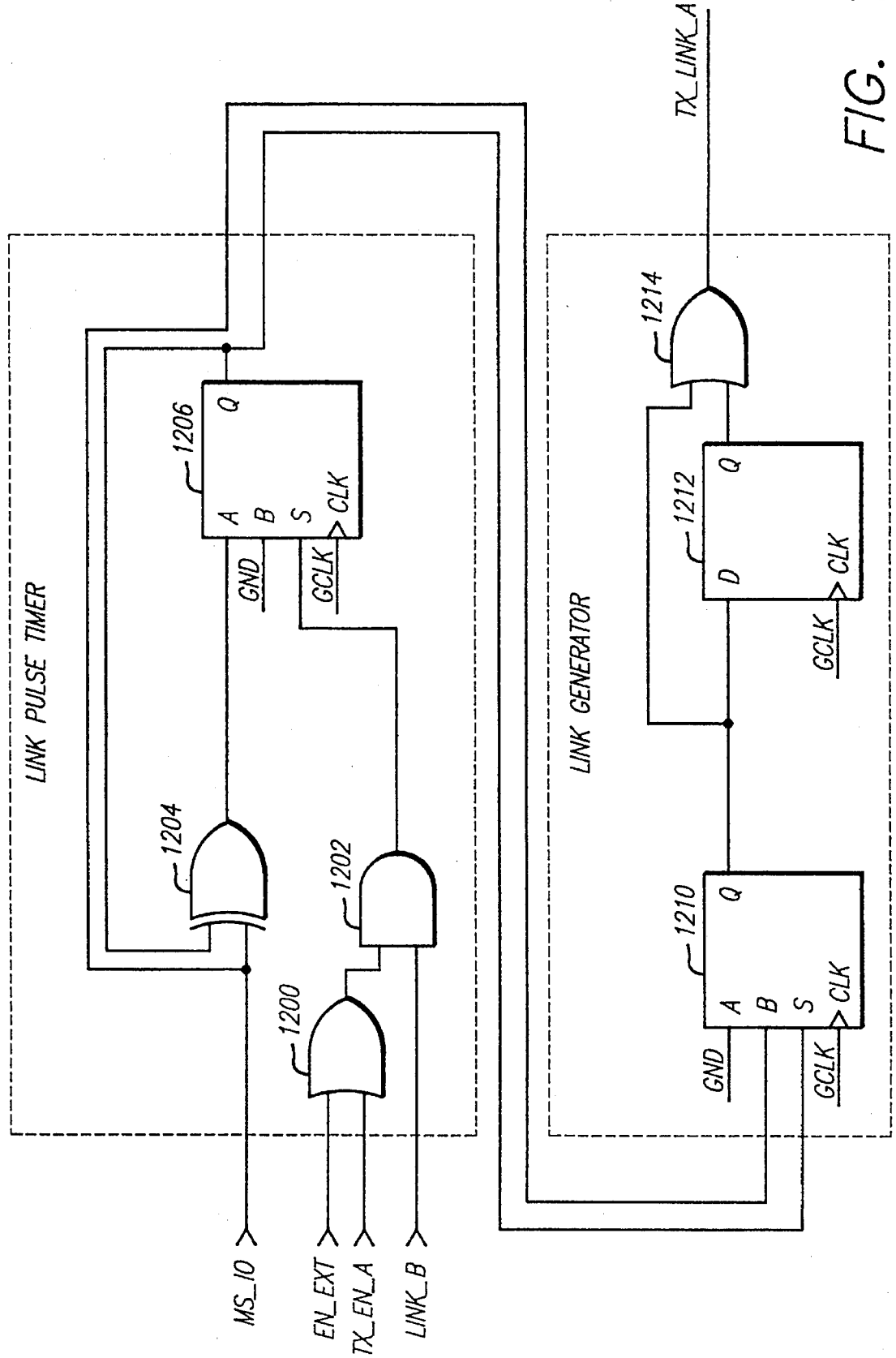
FIG. 12 is a detailed schematic of a Link Pulse Timer and a Link Generator implemented using a Gate Array in one embodiment of the present invention for a 10Base-T network port.

FIG. 12 is a detailed drawing illustrating a Link Pulse Timer section and a Link Generator circuit of one embodiment of the present invention. The Link Pulse Timer comprises exclusive-OR gate 1204, OR gate 1200, flip-flop 1206 and AND gate 1202. A clock signal MS_10 is coupled to an input of exclusive-OR gate 1204 and a B input of flip-flop 1210. A signal EN_EXT is coupled to an input of OR gate 1200. A signal TX_EN_A is coupled to an input of OR gate 1200. A signal LINK_B is coupled to an input of AND gate 1202. The output of OR gate 1200 is coupled to an input of AND gate 1202. The output of AND gate 1202 is coupled to an S input of flip-flop 1206. The output of exclusive-OR gate 1204 is coupled to an A input of flip-flop 1206. The B input of flip-flop 1206 is coupled to ground. The CLK input of flip-flop 1206 is coupled to clock signal GCLK. The Q output of flip-flop 1206 is coupled to an S input of flip-flop 1210 and an input of exclusive-OR gate 1204.

The Link Generator comprises OR gate 1214 and flip-flops 1210 and 1212. The CLK inputs of flip-flops 1210 and 1212 are coupled to a clock signal GCLK. The A input of flip-flop 1210 is coupled to ground. The Q output of flip-flop 1210 is coupled to the D input of flip-flop 1212 and an input of OR gate 1214. The Q output of flip-flop 1212 is coupled to an input of OR gate 1214. The output of OR gate 1214 is a signal TX_LINK_A.

The Link Pulser Timer section illustrated in FIG. 12 insures that a link pulse is sent out every 20 mS. The clock signal MS_10 is a 10 mS clock having a 50 nS pulse per interval for timing the interval between link pulses. It sends a pulse every 10 ms which toggles the Q output of flip-flop 1206. When the Q output of flip-flop is HIGH and another MS_10 pulse arrives, the output of the Link Pulse Timer is set HIGH causing the Link Generator flip-flop 1210 to be set HIGH. Flip-flops 1210 and 1212 together stretch the 50 nS pulse width of the Link Pulse Timer output to 100 nS. The signal TX_LINK_A enables the line driver 740 and forces the data to "1" forming a link pulse. To insure that a link does not occur within 10 mS of a packet and especially during one, the packet detect signal EN_EXT and TX_EN resets flip-flop 1206 of the Link Pulse Timer section.

FIG. 12A is a detailed schematic diagram of a link pulse timer and an auto-cross-connect state machine of another embodiment of the present invention. Signal MS7A is buffered by buffer 1250 and is applied to an E input of each of D flip-flops 1252, 1254 and 1256. Signal ENA is applied to a clear (CLR) input of each of D flip-flops 1252, 1254 and 1256. Clock signal GCLK is applied to a clock (CLK) input of each of D flip-flops 1252, 1254 and 1256. Voltage VDD is coupled to a D input of D flip-flop 1252. The Q output of D flip-flop 1252 provides signal LPT0A and is coupled to the D input of D flip-flop 1254. The Q output of D flip-flop 1254 provides signal LPT1A and is coupled to the D input of D flip-flop 1256. The Q output of D flip-flop 1256 provides signal LPT2A and is coupled to the D input of D flip-flop 1258.

Clock signal GCLK is applied to the dock (CLK) input of D flip-flop 1258. Signal NS100A is coupled to the input of inverting buffer 1260. The output of inverting buffer 1260 is coupled to the E input of D flip-flop 1258 and to the A input of 2-input multiplexer 1262. Signal US2P4 is applied to the B input of 2-input multiplexer 1262. The output of 2-input multiplexer 1262 is coupled to the E input of each of D flip-flops 1264, 1266 and 1268.

The Q output of D flip-flop 1258 provides signal XCON0A and is coupled to the D input of D flip-flop 1264 and to an input of 3-input OR gate 1270. Signal GCLK is applied to the clock (CLK) input of D flip-flop 1264. The Q output of D flip-flop 1264 provides signal XCON1A and is coupled to the select (S) input of 2-input multiplexer 1262, to a non-inverting input of AND gate 1272 and to the D input of D flip-flop 1266. Clock signal GCLK is applied to the clock (CLK) input of D flip-flop 1266. The Q output of D flip-flop 1266 provides signal XCON2A and is coupled to a non-inverting input of AND gate 1274.

Signal LNKSTOB is applied to the input of inverting buffer 1276. The output of inverting buffer 1276 provides signal SEARCHA and is coupled to an inverting input of AND gate 1274 and to an inverting input of AND gate 1272. The output of AND gate 1274 is coupled to an input of 3-input OR gate 1270. Signal JAMHLD4A is coupled to an input of 3-input OR gate 1270. The output of 3-input OR gate 1270 provides signal TXLINKA.

The output of AND gate 1272 is coupled to an input of XOR gate 1278. The output of XOR gate 1278 provides signal XCON3A and is coupled to the D input of D flip-flop 1268. Clock signal GCLK is applied to the dock (CLK) input of D flip-flop 1268. The Q output of D flip-flop 1268 provides signal XCON4A and is coupled to an input of XOR gate 1278 and to the input of inverting buffer 1280. The output of inverting buffer 1280 provides signal XCON5A.

Enableable D flip-flops 1252, 1254 and 1256 determine the 22 mS interval to send link pulses. A transmission of any type (including a link pulse) resets (clears) D flip-flops 1252, 1254 and 1256. Every 7.37 mS, a pulse arrives on the MS_7 line, which enables a high value to be shifted one flip-flop to the right. After 3 periods of the MS_7 line (3×7.37 mS=22.11 mS), signal LPT2A at the output of flip-flop 1256 goes high.

100 nS after signal LPT2A goes high, D flip-flop 1258 gets enabled and clocks a high onto its output, causing signal XCON0A to go high. This enables the C input of OR gate 1270, which simultaneously transmits a link pulse and (via the ENA line) resets D flip-flops 1252, 1254 and 1256. After another 100 nS, D flip-flop 1258 gets enabled again and clocks a low to its output, causing signal XCON0A to go low and ending the link pulse while D flip-flop 1264 clocks in the high that was present at signal XCON0A, causing signal XCON1A to go high. With signal XCON1A high at the output of flip-flop 1264, flip-flop 1264 changes the select input of 2-input multiplexer 1262, selecting the B input. The B input of 2-input multiplexer 1262 connects a 2.4 μS clock to the enable inputs of flip-flops 1264, 1266 and 1268 so that the next enable pulse arrives 2.4 μS later.

If the MAU is still searching for a connection, the signal SEARCH will be low, enabling AND gate 1272. When the signal SEARCH is low and the signal XCON1A is high, the state of flip-flop 1268 is toggled by taking its current state and inverting it using XOR gate 1278. The next enable pulse (100 nS later) clocks the new (inverted) value, which appears as signal XCON3A, into flip-flop 1268, swapping the values of signals XCON4A and (through inverter 1280) XCON5A. The two opposite signals XCON4A and XCON5A control transmitters and receivers so that the transmit and receive pairs of the MAU can be readily swapped.

After an enable pulse arrives (after 2.4 μS), the high level of signal XCON1A is clocked into D flip-flop 1266, causing signal XCON2A to go high and selecting the A input of 2-input multiplexer 1262. By selecting the A input of 2-input multiplexer 1262, signal NS100A is applied to the enable (E) inputs of D flip-flops 1264, 1266 and 1268, thereby pulsing the enable inputs every 100 nS. While signal XCON2A is high, a second link pulse is sent if the signal SEARCH is low, enabling AND gate 1274 and indicating that the MAU is still searching for a connection. When the MAU is not searching, no second link pulse is transmitted.

Once a packet has been found, the contents of the packet are relayed out through the output of multiplexer 1014 until the end of packet (EOP) is detected. EOP is detected when the incoming data remains either HIGH or LOW for longer than 150 nS. If the polarity of the incoming data is correct or has been corrected by another portion of the repeater, the data output by multiplexer 1014 is always HIGH at EOP. Once EOP is found, the output of multiplexer 1014 is forced to a "1" and the output signal EN of multiplexer 1018 is held HIGH for an additional 50 nS. This insures the length of the EOP signal remains in the range of 200 to 250 nS. Any further data is ignored until both the IN1N and IN1P inputs indicate an idle line.

FIG. 11 is a detailed drawing illustrating an EOP Detection circuit, a Noise Detect section and a Receive LED Timer section of the present invention. EOP Detection section comprises flip-flops 1106–1112, 1124 and 1134–1140, AND gates 1114, 1116, 1122, 1128, 1130, 1132 and 1133, and OR gates 1118, 1120 and 1126. An input INP0_A is connected to an S input of flip-flop 1106 and CLR inputs of flip-flops 1106, 1108 and 1110. An input signal INN0_A is coupled to an S input of flip-flop 1140, CLR inputs of flip-flops 1140, 1138 and 1136, and a negated input of AND gate 1142.

An input signal PACK2_A is coupled to a D input of flip-flop 1154, an input of AND gate 1114 and a negated input of OR gate 1146. Input A of flip-flop 1106 is connected to supply voltage $V_{DD}$ and input B of flip-flop 1106 is coupled to ground. The Q output of flip-flop 1106 is coupled to the D input of flip-flop 1108. The Q output of flip-flop 1108 is coupled to the D input of flip-flop 1110. The Q output of flip-flop 1110 is coupled to the D input of flip-flop 1112. The Q output of flip-flop 1112 is coupled to a negated input of AND gate 1114, an input of OR gate 1120, an input of AND gate 1130, an input of AND gate 1132, and a negated input of AND gate 1133. The A input of flip-flop 1140 is coupled to supply voltage $V_{DD}$ and the B input of flip-flop 1140 is coupled to ground. The Q output of flip-flop 1140 is coupled to the D input of flip-flop 1138. The Q output of flip-flop 1138 is coupled to the D input of flip-flop 1136. The Q output of flip-flop 1136 is coupled to the D input of flip-flop 1134. The Q output of flip-flop 1134 is coupled to a negated input of AND gate 1132, an input of AND gate 1130, an input of OR gate 1120, negated input of AND gate 1114, and an input of AND gate 1133.

The output of AND gate 1114 is coupled to an input of OR gate 1118. The output of AND gate 1116 is coupled to an input of OR gate 1118. The output of OR gate 1118 is coupled to an input of AND gate 1116, an input of AND gate 1122, an input of AND gate 1132, a negated input of OR gate 1144 and an input of AND gate 1133. The output of OR gate 1120 is coupled to an input of AND gate 1122. The output of AND gate 1122 is coupled to a D input of flip-flop 1124. The CLK input of flip-flop 1124 is coupled to signal GCLK. The Q output of flip-flop 1124 is coupled to a negated input of AND gate 1116 and an input of OR gate 1126. The Q output of flip-flop 1124 is signal EOP_A. The output of OR gate 1126 is coupled to an input of AND gate 1128. The output of AND gate 1130 is coupled to a negated input of AND gate 1128. The output of AND gate 1128 is coupled to an input of OR gate 1126. The output of AND gate 1128 is a signal WAIT_A. The outputs of AND gates 1132 and 1133 are signals POL_ER_A and POL_OK_A, respectively.

Noise Detect section comprises flip-flops 1148, 1150, 1152 and 1154, AND gates 1142 and 1147, and OR gates 1144 and 1146. The E inputs of flip-flops 1152 and 1145 are coupled to clock signal NS_500. The CLK inputs of flip-flops 1152 and 1154 are coupled to clock signal GCLK. The Q output of flip-flop 1154 is coupled to D input of flip-flop 1152. The Q output of flip-flop 1152 is coupled to a D input of flip-flop 1150 and an input of AND gate 1147. The output of AND gate 1150 is coupled to an S input of flip-flop 1148. The output RUNT_A of OR gate 1144 is coupled to an input of AND gate 1142, an input of OR gate 1146 and a preset input of flip-flop 1160. The output of OR gate 1146 is coupled to an input of AND gate 1147. The output of AND gate 1147 is coupled to an A input of flip-flop 1148. The B input of flip-flop 1148 is coupled to ground. The Q output of flip-flop 1148 is a signal NOISE_A.

The Receive LED Timer comprises flip-flops 1160 and 1162. clock signal MS_20 is coupled to an input of buffer 1158. The output of buffer 1158 is coupled to an S input of flip-flop 1160 and an E input of flip-flop 1162. The CLK input of flip-flops 1160 and 1162 are connected to clock signal GCLK. The B input of flip-flop 1160 is coupled to ground. The Q output of flip-flop 1160 is coupled to the A input of flip-flop 1160 and the D input of flip-flop 1162. The Q output of flip-flop 1162 is coupled to a buffer 1164. The output of buffer 1164 is a signal RX_LED2_A.

The LED timers keep the LEDs lighted for at least 20 ms after an event. Flip-flop 1160 is set by an incoming packet which causes RUNT_A to go low at the next negative going pulse after EOP_EN_A goes HIGH thereby preventing inverted link pulses from lighting the LED. The RUNT signal presets flip-flop 1160. The next pulse on MS_20 clocks a HIGH into flip-flop 1162 after 20 mS, lighting the LED with signal RX_LED2_A. Simultaneously, a LOW is clocked into flip-flop 1160. If a packet is still being received, flip-flop will continue to be preset until the packet ends. The first pulse on MS_20 clears flip-flop 1160 and the second pulse clears flip-flop 1162 extinguishing the LED by setting RX_LED_A to LOW.

Eight flip-flops are used to detect an EOP: four flip-flops 1106, 1108, 1110 and 1112 for a positive EOP signal and four flip-flops 1134, 1136, 1138 and 1140 for a negative EOP signal. As long as the incoming data remains above 400 mV, the IN1P signal is LOW and keeps the four Positive EOP Detect flip-flops 1106, 1108, 1110 and 112 reset. Once IN1P goes HIGH, the four flip-flops 1106, 1108, 1110 and 112 begin counting up. If IN1P goes LOW within 150 nS, the fourth flip-flop 1112 is never set HIGH. If IN1P remains HIGH for longer than 150 nS, the Q output of flip-flop 1112 is set HIGH. A similar set of four flip-flops 1134, 1136, 1138 and 1140 detects when the incoming data remains LOW for 150 nS.

Before the EOP can be detected setting the output EOP of flip-flop 1124 to HIGH, it is necessary to first enable the RS latch comprising AND gates 1114 and 1116 and OR gate 1118 having an output EOP_EN. The latch having output EOP_EN prevents an idle line from continuously signalling an EOP. The EOP_EN latch is set when the Q outputs of flip-flop 1112 of Positive EOP Detect and flip-flop 1134 of Negative EOP Detect section are both LOW indicating that neither has been held constant for 150 nS indicating that valid data is coming in. With both Q outputs of flip-flops 1112 and 1134 held LOW, the output EOP_EN of the RS latch is set HIGH. The first EOP detector (positive or negative) to go HIGH clocks a "1" into the D input of flip-flop 1124 as well as forcing the data transmitted to be held at a "1" (through TX_1). The EOP signal then sets the output WAIT_A of an RS latch comprising OR gate 1126 and AND gate 1128 to HIGH which disables further data reception by setting output CLR_PD_A of Packet Detect circuitry to LOW until the line goes idle for at least 150 nS. Once both IN1N and IN1P indicate an idle line for 150 nS, the WAIT_A output is reset. During this interval when WAIT_A is LOW, the data path is disabled and the Packet Detect state machine is held reset by signal CLR_PD. This prevents ringing on the line from retriggering the Packet Detect circuitry.

Figure 16:
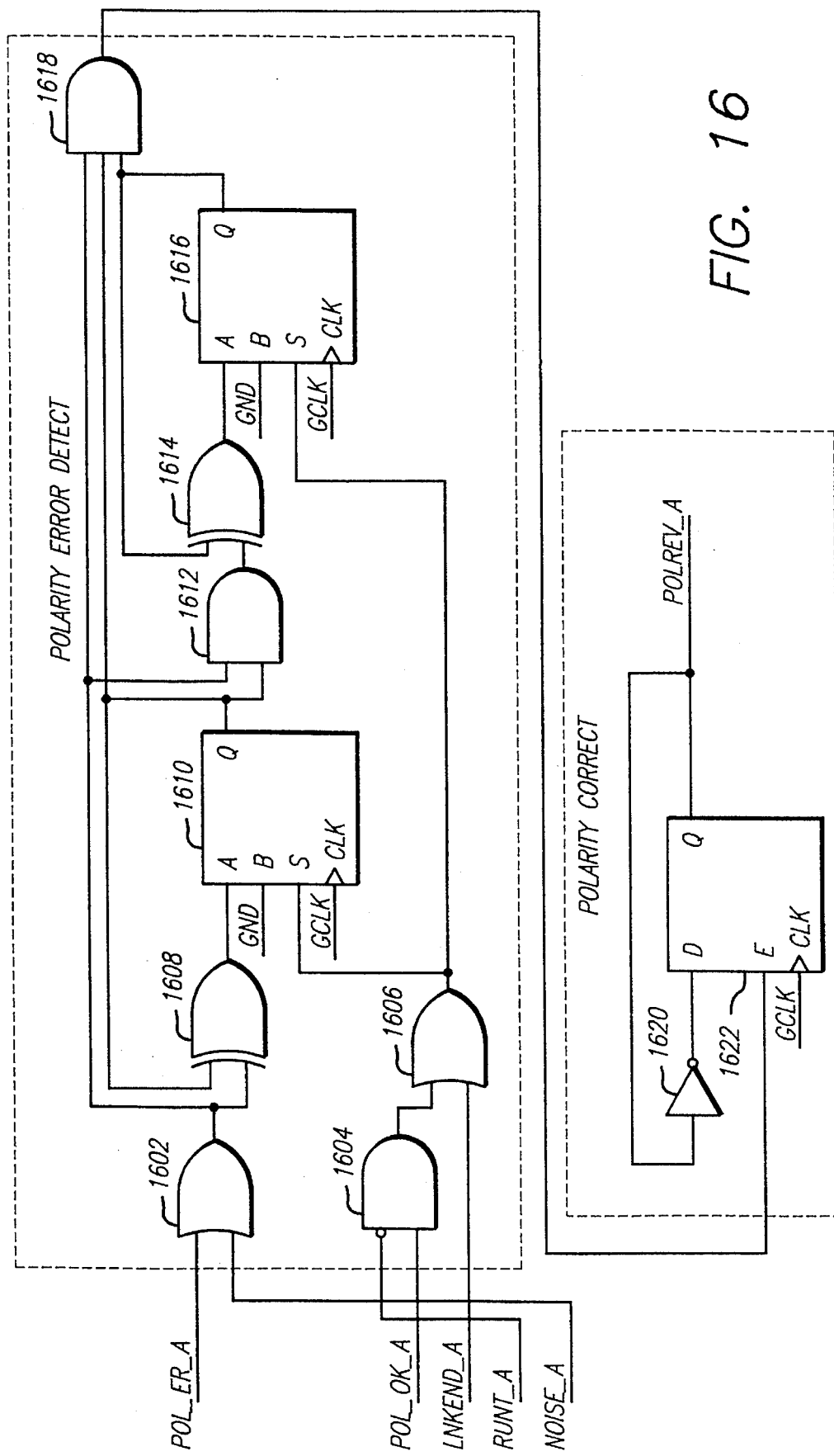
FIG. 16 is a circuit diagram illustrating the Polarity Error Detect and the Polarity Correct state machines of the present invention.

FIG. 16 is a detailed diagram of the Polarity Error Detect and the Polarity Correct state machines. Polarity Error Detect state machine comprises flip-flops 1610 and 1616 and digital logic 1602–1618. Signal POL_ER_A is provided to an input of OR gate 1602. Signal NOISE_A is provided to a second input of OR gate 1602. The output of OR gate 1602 is coupled to an input of Exclusive-OR gate 1608, an input of AND gate 1612 and an input of AND gate 1618. Signal POL_OK_A is provided to an input of AND gate 1604. Signal RUNT_A is provided to a negated input of AND gate 1604. The output of AND gate 1604 is coupled to an input of OR gate 1604. Signal LNK_FND_A is coupled to a second input of OR gate 1606. The output of OR gate 1606 is coupled to S inputs of flip-flops 1610 and 1616. B inputs of flip-flops 1610 and 1616 are coupled to ground. Signal GCLK is provided to the CLK inputs of flip-flops 1610 and 1616. The Q output of flip-flop 1610 is coupled to an input of AND gate 1612, an input of Exclusive-OR gate 1608, and an input of AND gate 1618. The output of AND gate 1612 is coupled to an input of Exclusive-OR gate 1614. The output of Exclusive-OR gate 1614 is coupled to A input of flip-flop 1616. The Q output of flip-flop 1616 is coupled to an input of Exclusive-OR gate 1614 and an input of AND gate 1618.

The Polarity Correct state machine comprises flip-flop 1622 and inverter 1620. The output of AND gate 1618 is coupled to E input of flip-flop 1622. Signal GCLK is coupled to the CLK input flip-flop 1622. The Q output of flip-flop 1622 is signal POLREV_A which is coupled to an input of inverter 1620. The output of inverter 1620 is coupled to D input of flip-flop 1622.

Polarity Error Detect and Polarity Correct state machines count polarity error events (an inverted link pulse or an inverted end of packet). If four such events occur consecutively, the Polarity Correct state machine toggles signal POLREV_A which signals multiplexers 840 and 842 to swap the two input lines (IN1P and IN1N). Any link pulse or packet received with the correct polarity resets the error count to zero thereby preventing false triggering. This occurs if LNKFND_A is set HIGH or if both signal RUNT_A is LOW and signal POL_OK_A is HIGH.

The path for data through the MAU (FIG. 9) passes first through an RS latch comprising OR gate 902 and AND gate 904, then through several controlling gates including AND gate 906 and multiplexers 1012 and 1014 (FIG. 10) to the final output signals TX1P and TX1N. To avoid needing a third data input based on a zero volt comparator threshold, the two biased data inputs IN1P and IN1N are used to set and reset an RS latch comprising OR gate 902 and AND gate 904. The output D_LTCHD of this latch should be a balanced data signal. This data signal is gated by an AND gate that forces the data DIN to a "0" during the extended first bit of a packet (see above description of Packet Detect state machine), during the wait period after the end of packet, and if the link is down as indicated by the Link Status state machine. For the last two conditions, the CLR_PD_A output of OR gate 834 in the Packet Detect section shown in FIG. 9 is held HIGH. In both the wait and link down states, the output enable signal for line drivers are disabled also.

For each twisted pair connection, data can come from one of several sources: the other twisted pair connection, the AUI port, or the internal Link Generator. The data values and output enable signals for all these sources are multiplexed together before being passed to their respective output pins. Thus the circuit of FIGS. 9–12 for a first twisted pair port of the gate array logic has been described in detail. A second such circuit for the opposite side of the gate array logic is not shown because the circuits are duplicates of one another. Therefore, it is not be described for brevity. All signals and circuits of the second side of gate array 770 have the same names as those of FIGS. 8–12 except that the signal references end with _B instead of _A and vice versa. The signals generated by the two circuits for the twisted pair ports of gate array 770 are used in the following discussion of the circuit for the AUI side of gate array 770. The second twisted pair port of gate array 770 includes inputs IN2P and IN2N and outputs TX2P and TX2N.

Figure 13A:
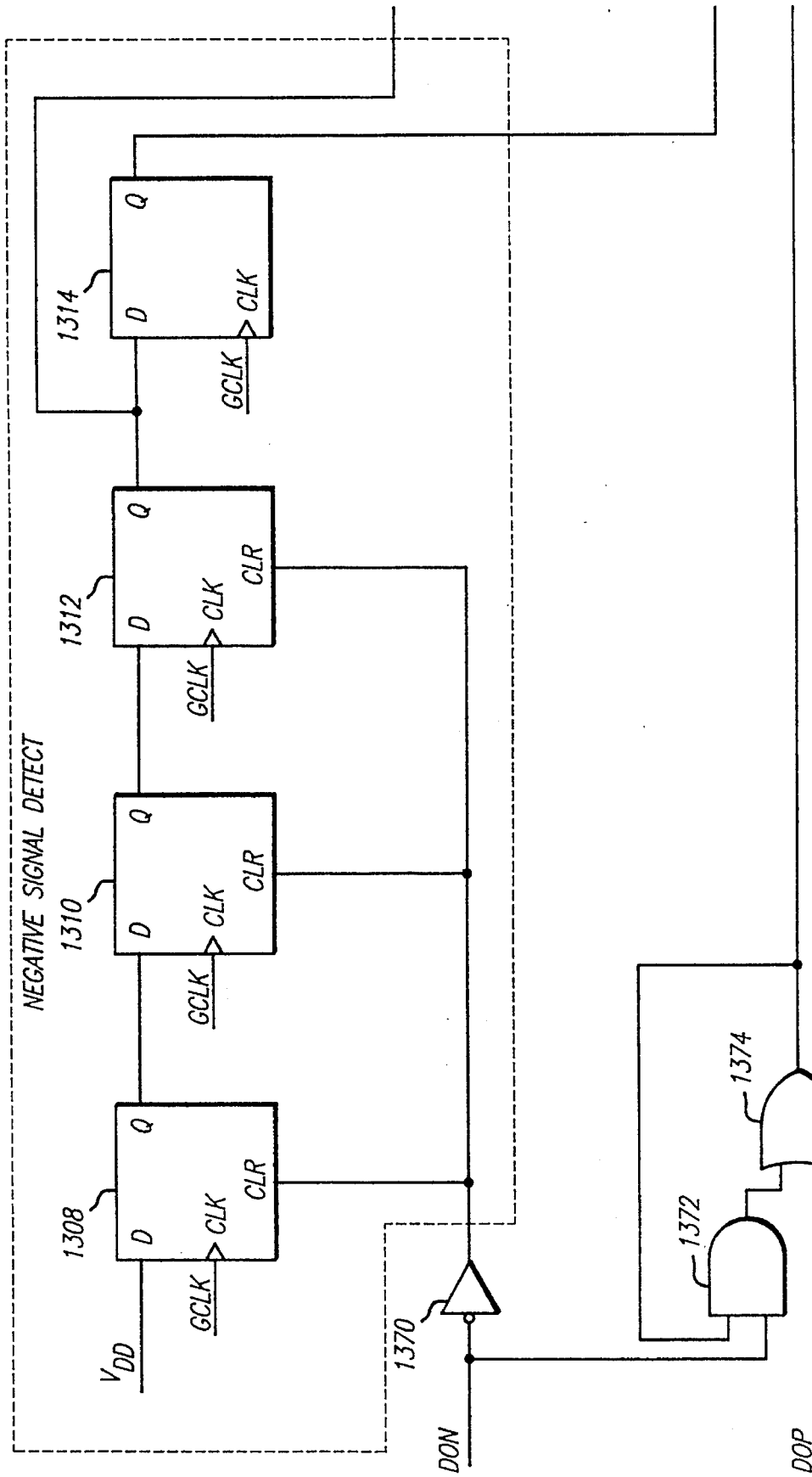
FIG. 13 is a detailed schematic of a Jabber section, a Negative Detect section and an AUI EOP Detect section implemented using a Gate Array in the preferred embodiment of the present invention for an AUI port.
Figure 13B:
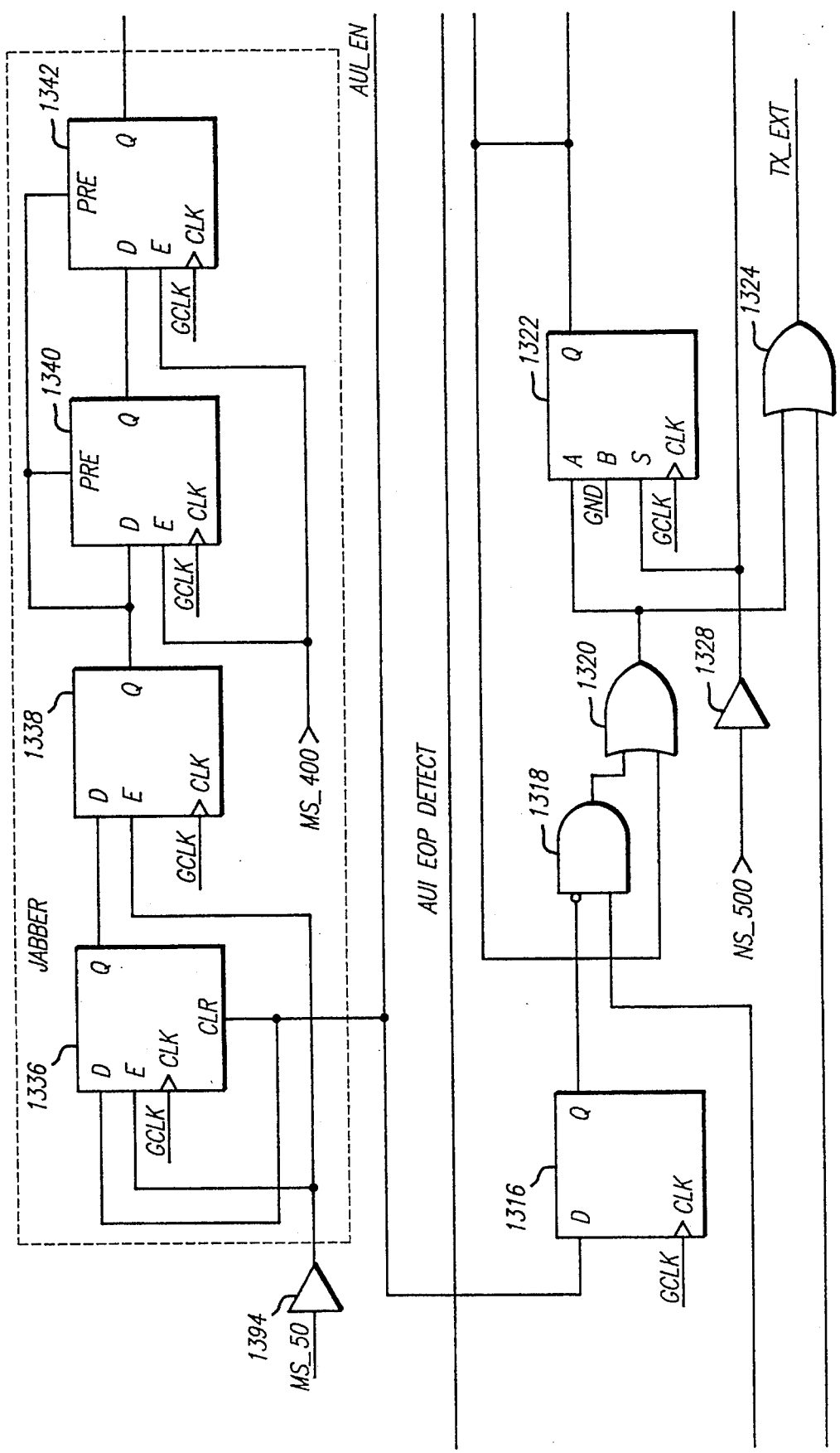
Figure 13C:
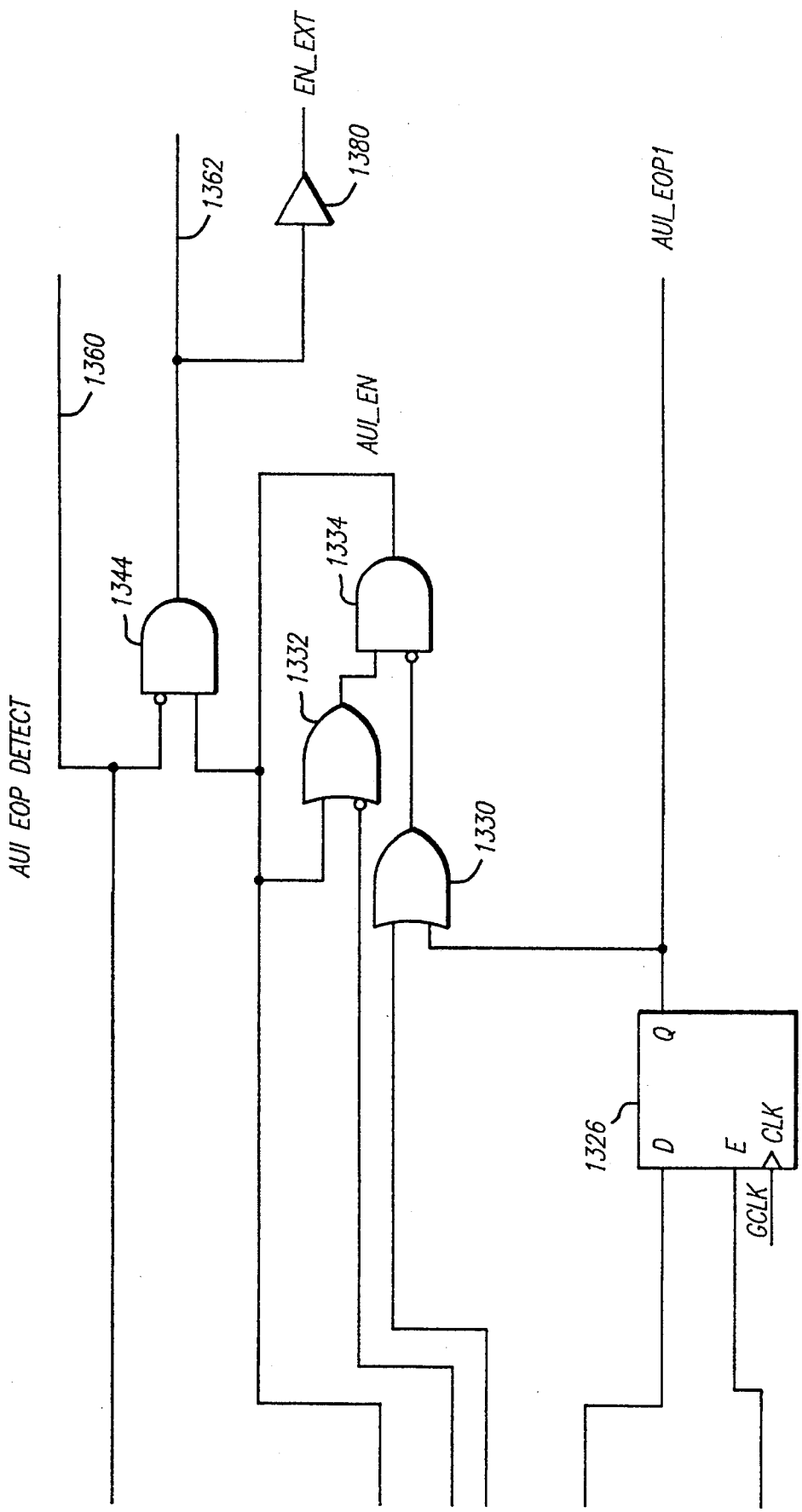
Figure 14A:
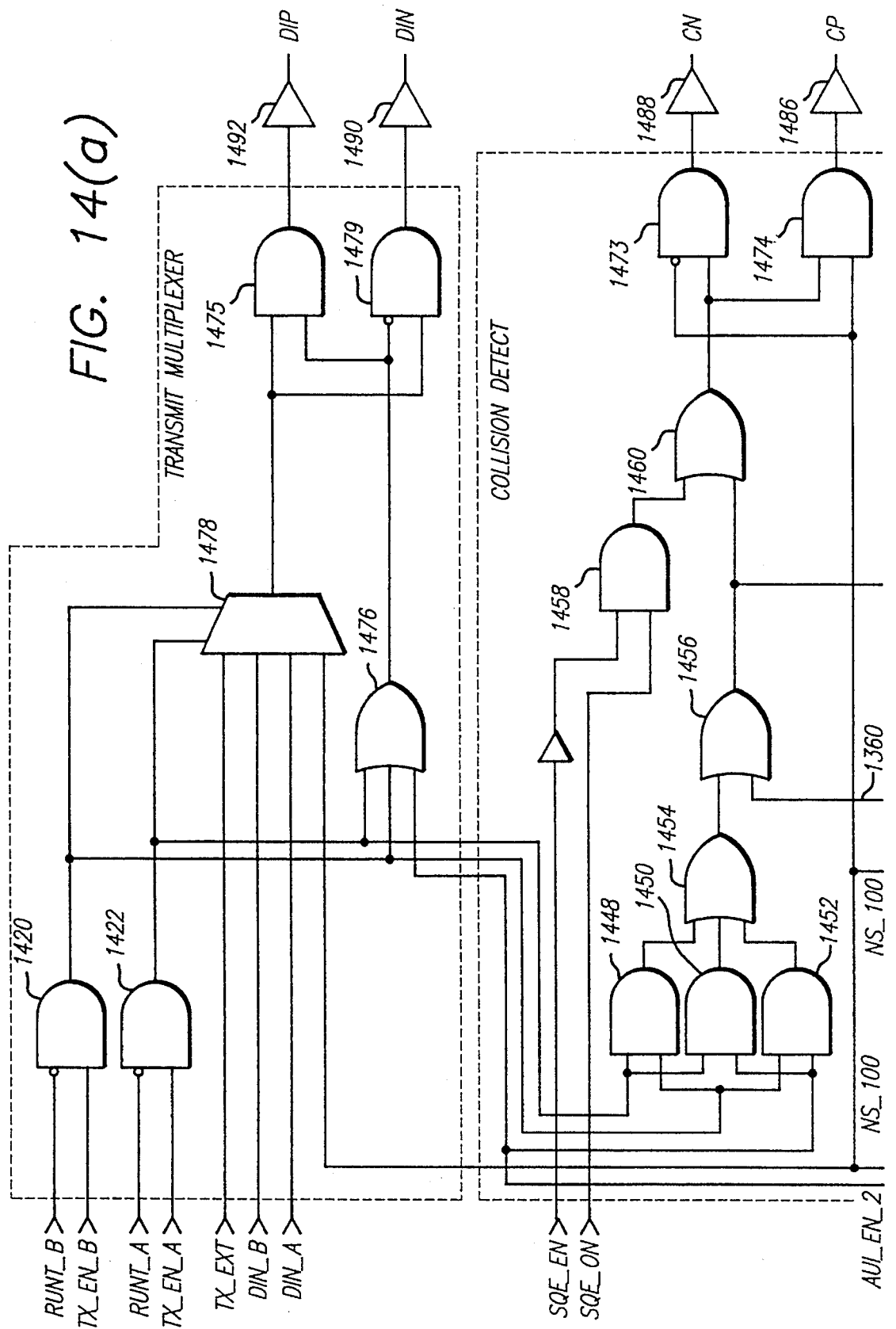
FIG. 14 is a detailed schematic of a Transmit Multiplexer, a Collision Detect section (for all ports) and an LED Timing section implemented using a Gate Array in the preferred embodiment of the present invention for an AUI port.
Figure 14B:
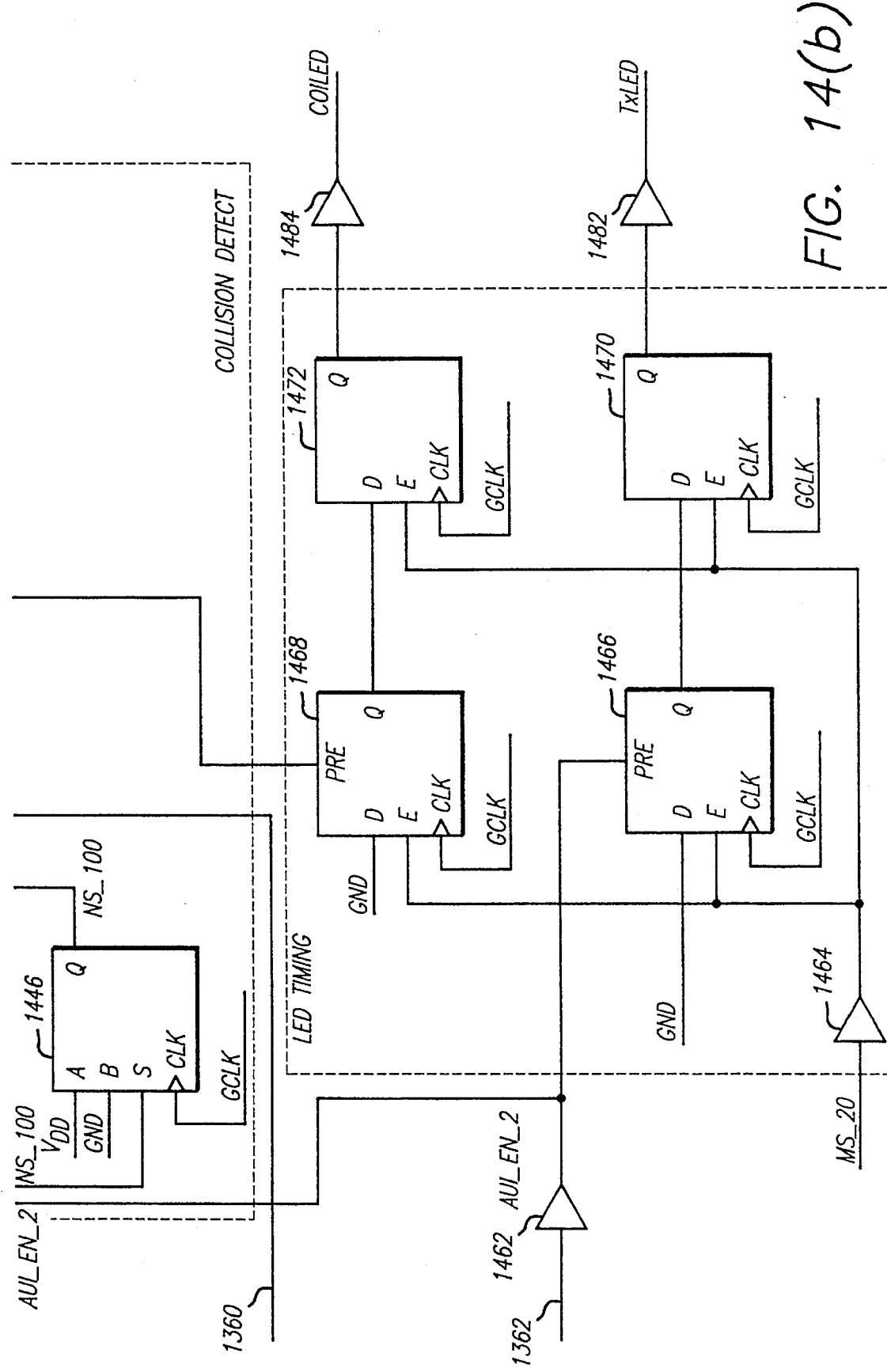

FIGS. 13–14 illustrate the functional circuitry of the AUI implemented in gate array 770 of the present invention. FIG. 13 is a detailed diagram of the Negative Signal Detect Section, AUI EOP Detect Section, and Jabber section of the present invention. The Negative Signal Detect section comprises flip-flops 1308–1314. A signal DON is coupled to an inverter 1370 and an input of AND gate 1372. The output of inverter 1370 is coupled to the CLR inputs of flip-flops 1308, 1310 and 1312. The D input of flip-flop 1308 is coupled to supply voltage $V_{DD}$. The CLK inputs of flip-flops 1308, 1310, 1312 and 1314 are coupled to clock signal GCLK. The Q output of flip-flop 1308 is coupled to the D input of flip-flop 1310. The Q output of flip-flop 1310 is coupled to the D input of flip-flop 1312. The Q output of flip-flop 1312 is coupled to the D input of flip-flop 1314 and to the negated input of OR gate 1332.

The AUI EOP Detect section illustrated in FIG. 13 comprises flip-flops 1316, 1322 and 1326 and RS latches. The Q output of flip-flop 1314 is coupled to an input of AND gate 1318. The CLK inputs of flip-flops 1316, 1322 and 1326 are coupled to clock signal GCLK. The Q output of flip-flop 1316 is coupled to an input of AND gate 1318. The output of AND gate 1318 is coupled to an input of OR gate 1320. The output of OR gate 1320 is coupled to an A input of flip-flop 1322 and to an input of OR gate 1324. A B input of flip-flop 1322 is coupled to ground.

A clock signal NS_500 is coupled to buffer 1328. The output of buffer 1328 is coupled to an S input of flip-flop 1322 and to an E input of flip-flop 1326. The Q output of flip-flop 1322 is coupled to a D input of flip-flop 1326, an input of OR gate 1330, and an input of OR gate 1320. Output AUI_EN of AND gate 1334 is coupled to an input of OR gate 1332, an input of AND gate 1344, a negated CLR input of flip-flop 1336 and a D input of flip-flop 1316. The Q output of flip-flop 1326 is coupled to an input of OR gate 1330. The Q output of flip-flop 1326 is a signal AUI_EOP1. The output of OR gate 1332 is coupled to an input of AND gate 1334.

The Jabber section illustrated in FIG. 13 comprises flip-flops 1336–1342. A clock signal MS_50 is coupled to a buffer 1394. The output of buffer 1394 is coupled to an E input of flip-flop 1336 and an E input of flip-flop 1338. The CLK inputs of flip-flops 1336, 1338, 1340 and 1342 are coupled to clock signal GCLK. The Q output of flip-flop 1336 is coupled to a D input of flip-flop 1338. The Q output of flip-flop 1338 is coupled to a D input of flip-flop 1340, a PREset input of flip-flop 1340 and a PREset input of flip-flop 1342. The Q output of flip-flop 1340 is coupled to the D input of flip-flop 1342.

The output 1360 of flip-flop 1342 is coupled to a negated input of AND gate 1344 and an input of OR gate 1456 illustrated in FIG. 14. The output 1362 of AND gate 1344 is coupled to an input of buffer 1380. The output of buffer 1362 is signal EN_EXT. A signal DOP is coupled to an input of OR gate 1374. The output of AND gate 1372 is coupled to an input of OR gate 1374. The output of OR gate 1374 is coupled to an input of OR gate 1324. The output of OR gate 1324 is a signal TX_EXT.

FIG. 14 is a detailed diagram illustrating a Transmit Multiplexer section, Collision Detect section and LED Timing section of the AUI circuitry for the present invention. The LED Timing section comprises flip-flops 1466–1472. The output 1362 of AND gate 1344 illustrated in FIG. 13 is coupled to a PREset input of flip-flop 1466, an input of OR gate 1476, an input of AND gate 1452 and an input of AND gate 1450. A clock signal MS_20 is coupled to an input of buffer 1464. The output of buffer 1464 is coupled to the E inputs of flip-flops 1466, 1468, 1470 and 1472. The CLK inputs of flip-flops 1466, 1468, 1470 and 1472 are coupled to clock signal GCLK. The D inputs of flip-flops 1466 and 1468 are coupled to ground. The Q output of flip-flop 1466 is coupled to the D input of flip-flop 1470. The Q output of flip-flop 1468 is coupled to the D input of flip-flop 1472. The Q output of flip-flop 1470 is coupled to an input of buffer 1482. The output of buffer 1482 is signal TX_LED. The Q output of flip-flop 1472 is coupled to an input of buffer 1484. The output of buffer 1484 is signal COL_LED. Signals TX_EXT, DIN_B and DIN_A are coupled to data inputs of multiplexer 1478, respectively.

A Transmit Multiplexer circuit comprises multiplexer 1478, AND gates 1420, 1422, 1475 and 1479, and OR gate 1476. Signals RUNT_B and TX_EN_B are coupled to a negated input and a second input of AND gate 1420. The output of AND gate 1420 is coupled to a select input of multiplexer 1478, an input of OR gate 1476, an input of AND gate 1448 and an input of AND gate 1452. Signals RUNT_A and TX_EN_A are coupled to a negated input and a second input of AND gate 1422. The output of AND gate 1422 is coupled to a second select input of multiplexer 1478, an input of OR gate 1476, an input of AND gate 1448 and an input of AND gate 1452. The output of multiplexer 1478 is coupled to an input of AND gate 1475 and a negated input of AND gate 1479. The output of AND gate 1475 is coupled to buffer 1492. The output of buffer 1492 is a signal DIP. The output of OR gate 1476 is coupled to an input of AND gate 1479 and a negated input of AND gate 1475. The output of AND gate 1479 is coupled to buffer 1490. The output of buffer 1490 is a signal DIN.

A Collision Detect section for the AUI circuitry of the present invention illustrated in FIG. 14 comprises flip-flop 1446, AND gates 1450, 1452, 1454, 1458, 1473 and 1474, and OR gates 1454 and 1460. An A input of flip-flop 1446 is coupled to supply voltage $V_{DD}$ and a B input of flip-flop 1446 is coupled to ground. The CLK input of flip-flop 1446 is coupled to clock signal GCLK. The Q output of flip-flop 1446 is coupled to an input of AND gate 1474, a negated input of AND gate 1473, a data input of multiplexer 1478 and an S input of flip-flop 1446. The outputs of AND gates 1448, 1450 and 1452 are coupled to inputs of OR gate 1454, respectively. The output of OR gate 1454 is coupled to an input of OR gate 1456. The output of OR gate 1456 is coupled to an input of OR gate 1460 and a PREset input of flip-flop 1468. Signals SQE_EN and SQE_ON are coupled to inputs of AND gate 1458, respectively. The output of AND gate 1458 is coupled to an input of OR gate 1460. The output of OR gate 1460 is coupled to an input of AND gate 1474 and 1473. The output of AND gate 1473 is coupled to buffer 1488. The output of buffer 1488 is a signal CN. The output of AND gate 1474 is coupled to buffer 1486. The output of buffer 1486 is a signal CP.

Referring to FIG. 13, if AUI_EN is HIGH, the following are enabled: both twisted pair line drivers by setting the output EN_EXT of buffer 1380 to HIGH, the AUI line driver for loopback by setting the output AUI_EN2 of buffer 1462 shown in FIG. 14 to HIGH, the data path from AUI data in to data out, and the timer comprising flip-flops 1466 and 1470 for the Transmit LED shown in FIG. 14.

Detection of the end of packet from the AUI connection is similar to that of the EOP detect for the twisted pair section. Referring to FIG. 13, when idle, DON is HIGH and the output of invert 1370 stays LOW and flip-flops 1308, 1310, 1312 and 1314 all constantly clock through a "1". When data comes in on the AUI pair, the output of inverter 1370 becomes HIGH at least every 100 nS thereby clearing flip-flops 1308, 1310 and 1312. After a clock, the Q output of flip-flop 1314 also goes LOW and remains LOW. The output of flip-flop 1314 going LOW thereby removing the reset signal from the RS latch comprising AND gate 1318 and OR gate 1320.

Flip-flop 1314 remains LOW until the signal from the AUI stays above −400 mV (the output of buffer 1370 is HIGH) for at least 150 nS. When the output of flip-flop 1314 becomes HIGH, it sets the RS latch comprising AND gate 1318 and OR gate 1320 which forces the data out to be a "1" thereby extending the EOP sequence on the data. After the next clock, the Q output of flip-flop 1322 is HIGH which holds the data out HIGH and resets the RS latch comprising AND gate 1334 and OR gates 1330 and 1332. This disables the output enables of twisted pair and AUI line drivers. The AUI port is now in a wait state and remains in this condition for 500 to 1000 nS.

NS_500 is a 500 nS clock having a 50 nS pulse per interval for timing the wait period after a packet on the AUI. The first NS_500 pulse after the end of packet (any time from 0–500 nS) clears the Q output of flip-flop 1322 to LOW and set the Q output of flip-flop 1326 to HIGH. The second NS_500 pulse (500 nS later) clears the output AUI_EOP1 of flip-flop 1326 and removes the reset signal from the RS latch comprising AND gate 1334 and OR gates 1330 and 1332, thereby exiting the wait state.

When logic detects a packet on the AUI lines DOP and DON, the signal AUI_EN2 output by buffer 1462 shown in FIG. 14 sets flip-flop 1466. Anytime from 0–20 mS later a pulse on MS_20 passes through buffer 1464 to the E inputs of flip-flops 1466 and 1470 and clocks the HIGH state on the Q output of flip-flop 1466 into flip-flop 1470. The HIGH state on the Q output of flip-flop 1470 passes through buffer 1482 to light the transmit LED. This transmit LED remains lighted for the duration of the packet. When the packet ends, the signal AUI_EN2 output by buffer 1462 goes LOW removing the PREset signal from flip-flop 1466 by clocking in a LOW from the D input of flip-flop 1466. Twenty milliseconds later, another pulse clocks this LOW signal into flip-flop 1470 thereby extinguishing the transmit LED. Thus the transmit LED is lighted from anywhere from between 20 mS and the duration of the packet plus 20 mS.

A collision is detected anytime two or more ports of the gate array logic are active at the same time. The majority gate shown in FIG. 14 comprising OR gate 1454 and AND gates 1448, 1450 and 1452 checks the enables TX_EN_A, TX_EN_B and AUI_EN2 for the three ports and, if more than one is active, the output of OR gate 1454 goes HIGH, passes through OR gates 1456 and 1460, enabling AND gates 1473 and 1474. This condition gates a 10 MHz square wave onto the collision pair at output CN of buffer 1488 and output CP of buffer 1486 and sets flip-flop 1468. Twenty milliseconds later, flip-flop 1468 sets flip-flop 1472 controlling the collision LED to HIGH and thereby lighting the LED using output Col_LED of buffer 1484. The collision LED turns off 20 mS after the end of a collision.

Automatic Network Connector Configuration

The present invention provides a connection between the signal lines in a network and device to be connected as a network node. The device may be a computer, a terminal, a server, a communications device, a storage device or any other device suitable for connection to a network. The network may be a 10Base-T network or another suitable network. The signal lines include transmit lines and receive lines.

Figure 17:
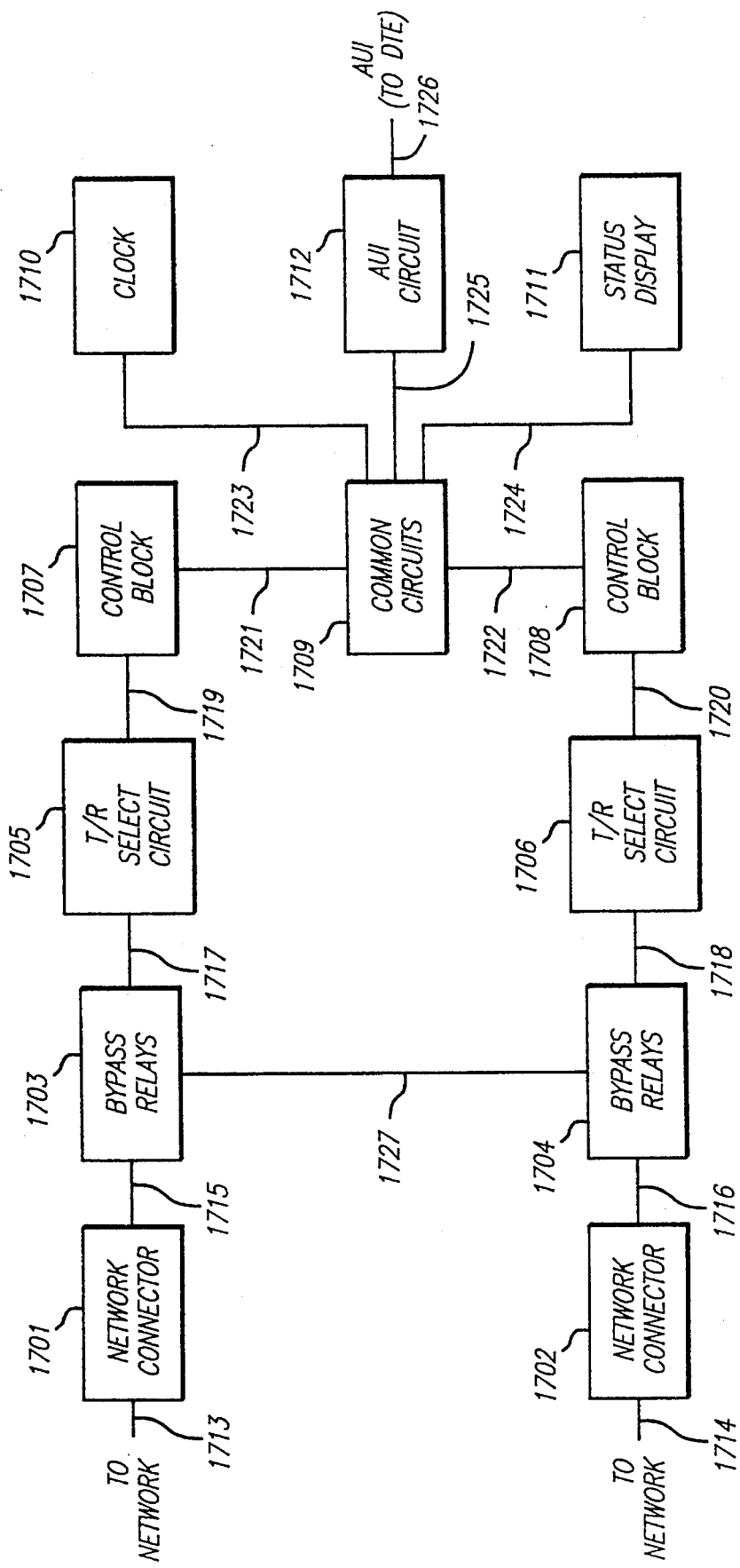
FIG. 17 is a block diagram illustrating an alternate embodiment of the present invention.

FIG. 17 is a block diagram illustrating an alternate embodiment of the present invention. Network connector 1701 is coupled to the signal lines of a network through coupling 1713 and to bypass relays 1703 through coupling 1715. Bypass relays 1703 are coupled to T/R select circuit 1705 through coupling 1717 and to bypass relays 1704 through coupling 1727. T/R select circuit 1705 is coupled to control block 1707 through coupling 1719. Control block 1707 is coupled to common circuits 1709 through coupling 1721.

Network connector 1702 is coupled to the signal links of a network through coupling 1714 and to bypass relays 1704 through coupling 1716. Bypass relays 1704 are coupled to T/R select circuit 1706 through coupling 1718. T/R select circuit 1706 is coupled to control block 1708 through coupling 1720. Control block 1708 is coupled to common circuits 1709 through coupling 1722.

Clock 1710 is coupled to common circuits 1709 through coupling 1723. Common circuits 1709 are coupled to status display 1711 through coupling 1724 and to AUI circuit 1712 through coupling 1725. AUI circuit 1712 is coupled to AUI through coupling 1726.

Network connector 1701 provides a physical connection to a network. The network comprises network equipment, such as one or more computers or computer-related apparatus, and means for connecting the network equipment to network connector 1701. Preferably, the network is a 10Base-T ethernet network and the physical connection is provided by RJ45-type modular connectors, in which case the means for connecting network equipment to network connector 1701 includes an appropriate 10Base-T interface and associated cabling coupled to the network equipment.

Signals to and from the network coupled to coupling 1713 pass through coupling 1713, network connector 1701, and coupling 1715. When bypass relays 1703 are deenergized, they couple signals from coupling 1715 through coupling 1727 to bypass relays 1704. When bypass relays 1703 are energized, they couple signals from coupling 1715 through coupling 1717 to T/R select circuit 1705 and signals from T/R select circuit 1705 through coupling 1717 to coupling 1715. Signals to and from the network coupled to coupling 1714 pass through coupling 1714, network connector 1702, and coupling 1716. When bypass relays 1704 are deenergized, they couple signals from coupling 1716 through coupling 1727 to bypass relays 1703. When bypass relays 1704 are energized, they couple signals from coupling 1716 through coupling 1718 to T/R select circuit 1706 and signals from T/R select circuit 1706 through coupling 1718 to coupling 1716. Bypass relays 1703 and 1704 provide network continuity even when power is removed from the circuits of the present invention. The present invention may be practiced with or without bypass relays 1703 and 1704 and coupling 1727.

Couplings 1715 and 1717 each include two unidirectional paths (a transmit path and a receive path). T/R select circuit 1705 selectively couples the transmit path of coupling 1717 to the transmit path of coupling 1719 and the receive path of coupling 1717 to the receive path of coupling 1719. T/R select circuit 1705 allows cross-connection of the transmit path of coupling 1717 to the receive path of coupling 1719 and the receive path of coupling 1717 to the transmit path of coupling 1719 to assure proper network connection regardless of whether a device of a hub-type configuration or of a MAU-type configuration is connected to network connector 1701.

Couplings 1716 and 1718 each include two unidirectional paths (a transmit path and a receive path). T/R select circuit 1706 selectively couples the transmit path of coupling 1718 to the transmit path of coupling 1720 and the receive path of coupling 1718 to the receive path of coupling 1720. T/R select circuit 1706 allows cross-connection of the transmit path of coupling 1718 to the receive path of coupling 1720 and the receive path of coupling 1718 to the transmit path of coupling 1720 to assure proper network connection regardless of whether a device of a hub-type configuration or of a MAU-type configuration is connected to network connector 1702.

Signals are passed from T/R select circuit 1705 through coupling 1719 to control block 1707. Control block 1707 analyzes signals from coupling 1719 and detects valid link integrity pulses. Control block 1707 includes a control circuit to control the status of T/R select circuit 1705. By setting T/R select circuit 1705 to a known state, control block 1707 monitors a selected unidirectional communications path and senses whether link integrity pulses, which are a type of network status signal, from the network are present on the receive path of coupling 1717 or on the transmit path of coupling 1717. If link integrity pulses are received on the receive path of coupling 1717, control block 1707 sets T/R select circuit 1705 to a straight through mode that couples the transmit path of coupling 1717 to the transmit path of coupling 1719 and the receive path of coupling 1717 to the receive path of coupling 1719. If, however, link integrity pulses are received on the transmit path of coupling 1717, control block 1707 sets T/R select circuit 1705 to a cross-connect mode that couples the transmit path of coupling 1717 to the receive path of coupling 1719 and the receive path of coupling 1717 to the transmit path of coupling 1719.

Control block 1707 includes circuits to provide a time delay and to change T/R path selection after the time delay has passed. Thus, control block 1707 causes T/R select circuit 1705 to periodically alternate between selecting the configuration of the unidirectional communication paths. For some portion of time, a first unidirectional communication path is selected as the receive path and a second unidirectional communication path is selected as the transmit path. For another portion of time, the first unidirectional communication path is selected as the transmit path and the second communication path is selected as the receive path.

Control block 1707 also contains circuitry to generate link integrity pulses to be transmitted over the network. After T/R select circuit 1705 changes the selection of the transmit and receive paths, a link integrity pulse is generated and transmitted to the network. After a received link integrity pulse is sensed, another link integrity pulse is generated and transmitted to the network.

Control block 1707 also includes circuits to receive and transmit user data. Data provided by the network is received and provided through the AUI to the device connected to the network. Data provided by the device connected to the network is provided through the AUI and transmitted over the network.

Signals are passed from T/R select circuit 1706 through coupling 1720 to control block 1708. Control block 1708 analyzes signals from coupling 1720 and detects valid link integrity pulses. Control block 1708 includes a control circuit to control the status of T/R select circuit 1706. By setting T/R select circuit 1706 to a known state, control block 1708 monitors a selected unidirectional communication path and senses whether link integrity pulses, which are a type of network status signal, from the network are present on the receive path of coupling 1718 or on the transmit path of coupling 1718. If link integrity pulses are received on the receive path of coupling 1718, control block 1708 sets T/R select circuit 1706 to a straight through mode that couples the transmit path of coupling 1718 to the transmit path of coupling 1720 and the receive path of coupling 1718 to the receive path of coupling 1720. If, however, link integrity pulses are received on the transmit path of coupling 1718, control block 1708 sets T/R select circuit 1706 to a cross-connect mode that couples the transmit path of coupling 1718 to the receive path of coupling 1720 and the receive path of coupling 1718 to the transmit path of coupling 1720.

Control block 1708 includes circuits to provide a time delay and to change T/R path selection after the time delay has passed. Thus, control block 1708 causes T/R select circuit 1706 to periodically alternate between selecting the configuration of the unidirectional communication paths. For some portion of time, a first unidirectional communication path is selected as the receive path and a second unidirectional communication path is selected as the transmit path. For another portion of time, the first unidirectional communication path is selected as the transmit path and the second communication path is selected as the receive path.

Control block 1708 also contains circuitry to generate link integrity pulses to be transmitted over the network. After T/R select circuit 1706 changes the selection of the transmit and receive paths, a link integrity pulse is generated and transmitted to the network. After a received link integrity pulse is sensed, another link integrity pulse is generated and transmitted to the network.

Control block 1708 also includes circuits to receive and transmit user data. Data provided by the network is received and provided through the AUI to the device connected to the network. Data provided by the device connected to the network is provided through the AUI and transmitted over the network.

Common circuits 1709 includes circuits such as timing circuits, circuits for communicating with AUI circuit 1712 and status indication circuits. Common circuits 1709 provides functions which are used by both control block 1707 and control block 1708. Signals from control block 1707 are passed to common circuits 1709 through coupling 1721. Signals from control block 1708 are passed to common circuits 1709 through coupling 1722.

A system clock signal is provided by clock 1710 to common circuits 1709. Common circuits 1709 produce additional timing signals derived from the system clock signal of clock 1710. Common circuits 1709 also produce status signals that are provided through coupling 1724 to status display 1711. Status display 1711 provides status outputs to the user, preferably by illuminating appropriate LED indicators visible to the user.

Common circuits 1709 pass network signals through coupling 1725 to AUI circuit 1712. Signals from AUI circuit 1712 are likewise passed from AUI circuit 1712 through coupling 1725 to common circuits 1709. For 10Base-T applications, AUI circuit 1712 provides an AUI connection compatible with ANSI/IEEE Standard 802.3. AUI circuit 1712 may include transformers to provide isolation and coupling of AUI signals. AUI signals are passed bidirectionally through coupling 1726. Coupling 1726 provides an interface to a device to be connected with the network.

Figure 18:
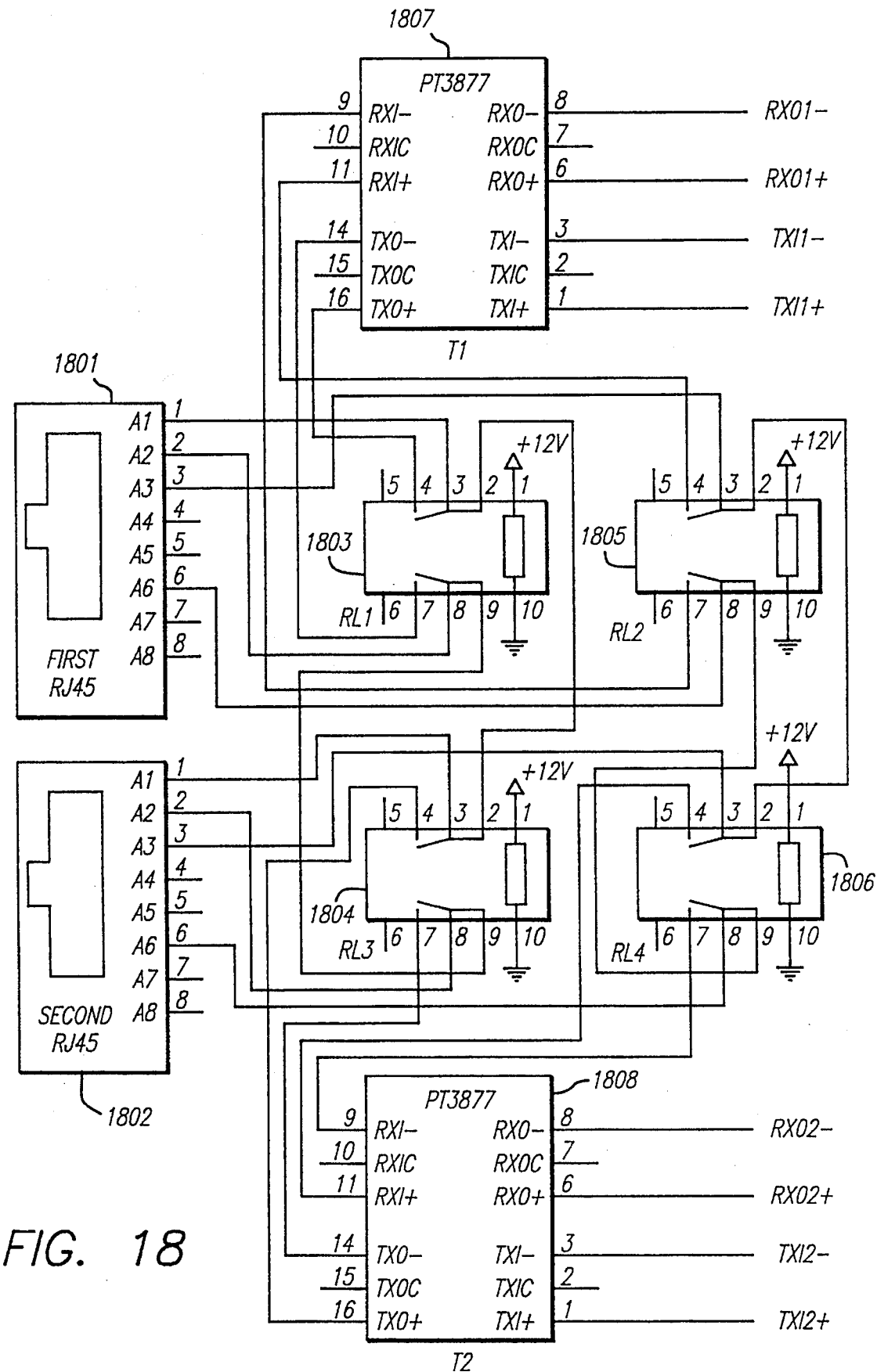
FIG. 18 is a schematic diagram illustrating the first and second network connectors and the first and second bypass relays of FIG. 17.

FIG. 18 is a schematic diagram illustrating network connectors 1701 and 1702 and bypass relays 1703 and 1704. Connector 1801 is preferably an RJ45-type modular jack, although other connectors may be used. Pin 1 of connector 1801 is coupled to the common terminal of the first pole of bypass relay 1803. Pin 2 of connector 1801 is coupled to the common terminal of the second pole of bypass relay 1803. Pin 3 of connector 1801 is coupled to the common terminal of the first pole of bypass relay 1805. Pin 6 of connector 1801 is coupled to the common terminal of the second pole of bypass relay 1805.

Pin 1 of connector 1802 is coupled to the common terminal of the first pole of bypass relay 1804. Pin 2 of connector 1802 is coupled to the common terminal of the second pole of bypass relay 1804. Pin 3 of connector 1802 is coupled to the common terminal of the first pole of bypass relay 1806. Pin 6 of connector 1802 is coupled to the common terminal of the second pole of bypass relay 1806.

The normally closed terminal of the first pole of bypass relay 1803 is coupled to the normally closed terminal of the first pole of bypass relay 1804. The normally closed terminal of the second pole of bypass relay 1803 is coupled to the normally closed terminal of the second pole of bypass relay 1804. The normally closed terminal of the first pole of bypass relay 1805 is coupled to the normally closed terminal of the first pole of bypass relay 1806. The normally closed terminal of the second pole of bypass relay 1805 is coupled to the normally closed terminal of the second pole of bypass relay 1806.

The normally open terminal of the first pole of bypass relay 1803 is coupled to the TXO+ terminal (pin 16) of PT3877 transformer 1807. The normally open terminal of the second pole of bypass relay 1803 is coupled to the TXO− terminal (pin 14) of PT3877 transformer 1807. The normally open terminal of the first pole of bypass relay 1805 is coupled to the RXI+ terminal (pin 11) of PT3877 transformer 1807. The normally open terminal of the second pole of bypass relay 1805 is coupled to the RXI− terminal (pin 9) of PT3877 transformer 1807. The normally open terminal of the first pole of bypass relay 1804 is coupled to the TXO+ terminal (pin 16) of PT3877 transformer 1808. The normally open terminal of the second pole of bypass relay 1804 is coupled to the TXO− terminal (pin 14) of PT3877 transformer 1808. The normally open terminal of the first pole of bypass relay 1806 is coupled to the RXI+ terminal (pin 11) of PT3877 transformer 1808. The normally open terminal of the second pole of bypass relay 1806 is coupled to the RXI− terminal (pin 9) of PT3877 transformer 1808.

One terminal of the coil in each of bypass relays 1803, 1804, 1805 and 1806 is coupled to the +12 volt power supply. The second terminal of the coil of each of bypass relays 1803, 1804, 1805 and 1806 is coupled to ground.

Signal RXO1− is present at the RXO− terminal (pin 8) of PT3877 transformer 1807. Signal RXO1+ is present at the RXO+ terminal (pin 6) of PT3877 transformer 1807. Signal TXI1− is present at the TXI− terminal (pin 3) of PT3877 transformer 1807. Signal TXI1+ is present at the TXI+ terminal (pin 1) of PT3877 transformer 1807.

Signal RXO2− is present at the RXO− terminal (pin 8) of PT3877 transformer 1808. Signal RXO2+ is present at the RXO+ terminal (pin 6) of PT3877 transformer 1808. Signal TXI2− is present at the TXI− terminal (pin 3) of PT3877 transformer 1808. Signal TXI2+ is present at the TXI+ terminal (pin 1) of PT3877 transformer 1808.

Connectors 1801 and 1802 provide a physical connection with a network or networks. Each network connection comprises a transmit path and a receive path. The preferred embodiment of the present invention uses RJ45 connectors to provide a physical network connection. The transmit and receive paths of the preferred embodiment of the present invention each comprise a pair of conductors. One pair uses pins 1 and 2 of the RJ45 connector, while the other pair uses pins 3 and 6 of the RJ45 connector.

Bypass relays 1803, 1804, 1805 and 1806 provide network continuity even when no power is applied to the circuits of the present invention. The coils of bypass relays 1803, 1804, 1805 and 1806 are coupled across the +12 volt power supply of the media attachment unit (MAU). When power is applied to the MAU, the coils are energized and the relay contacts connect the common terminals to their respective normally open terminals. The normally open terminals are coupled to PT3877 transformers 1807 and 1808, which couple signals to and from the other MAU circuits. When power is removed from the MAU, the coils are deenergized and the relay contacts connect the common terminals to their respective normally closed terminals. The normally closed terminals of bypass relays 1803 and 1085 are coupled to the normally closed terminals of bypass relays 1804 and 1806, respectively. Thus, when power is removed from the MAU, continuity is provided between connectors 1801 and 1802 and signals can pass through the network unimpaired by the unpowered MAU.

During MAU operation, PT3877 transformers 1807 and 1808 provide isolation of the remainder of the MAU circuitry from DC voltages and undesirable signals present at connectors 1801 and 1802. However, PT3877 transformers 1807 and 1808 provide coupling of desired signals between connectors 1801 and 1802 and the remainder of the MAU circuitry. PT3877 transformers 1807 and 1808 also provide low-pass filtering to eliminate undesirable high frequency noise from being transmitted to or received from the network or networks coupled to network connectors 1801 and 1802. Although PT3877-type transformers are used in the preferred embodiment of the present invention, other suitable transformers may be substituted for PT3877-type transformers. If other isolation means are provided or if isolation is adequate without transformers 1807 and 1808, transformers 1807 and 1808 may be omitted.

Figure 19:
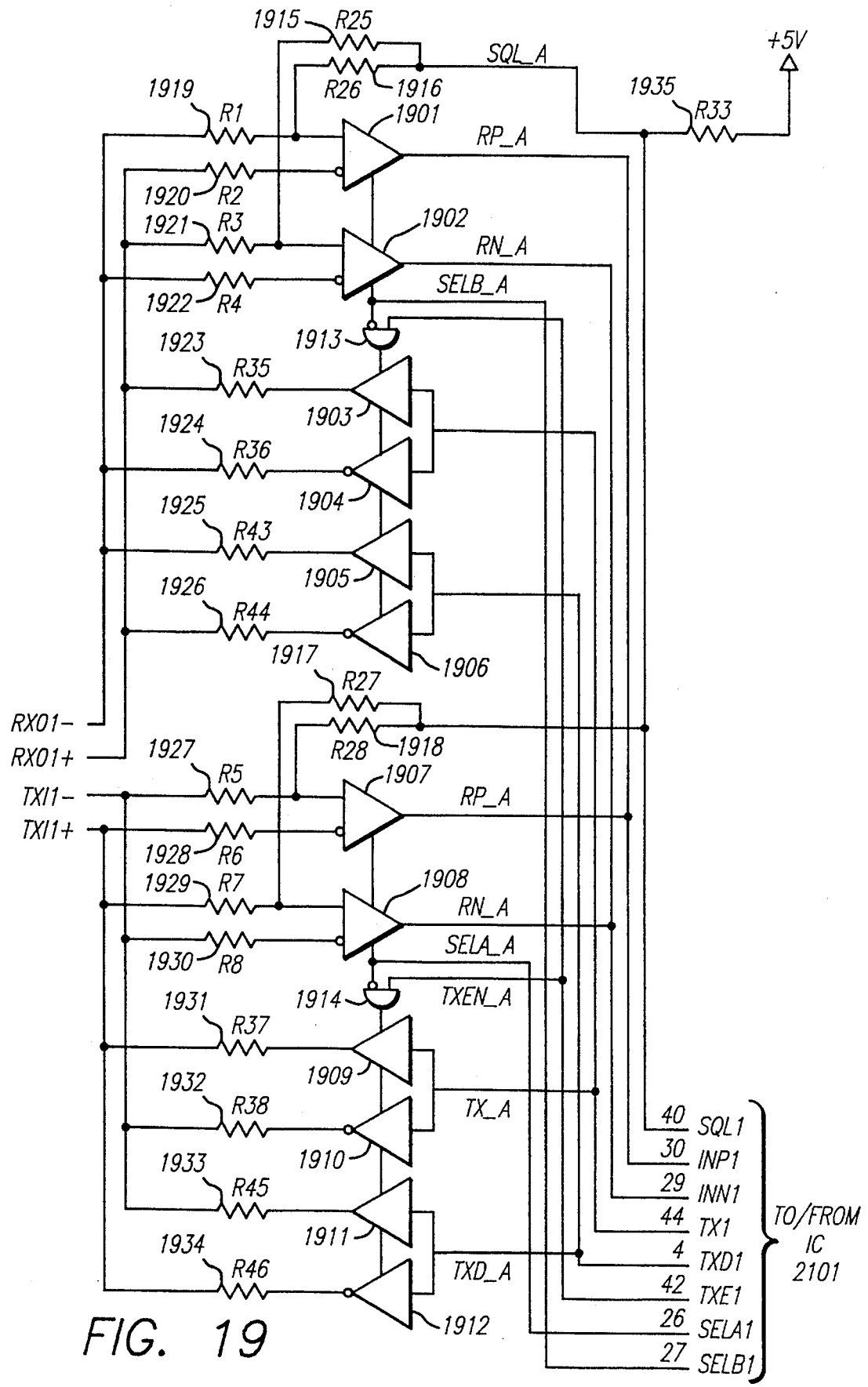
FIG. 19 is a schematic diagram illustrating the first T/R select circuit of FIG. 17.

FIG. 19 is a schematic diagram illustrating T/R select circuit 1705. Signal RXO1− is present at the first terminal of each of resistors 1919, 1922, 1924 and 1925. Signal RXO1+ is present at the first terminal of each of resistors 1920, 1921, 1923 and 1926. Signal TXI1− is present at the first terminal of each of resistors 1927, 1930, 1932 and 1933. Signal TXI1+ is present at the first terminal of each of resistors 1928, 1929, 1931 and 1934.

The second terminal of resistor 1919 is coupled to the first terminal of resistor 1916 and to the non-inverting input of comparator 1901. The second terminal of resistor 1920 is coupled to the inverting input of comparator 1901. The second terminal of resistor 1921 is coupled to the first terminal of resistor 1915 and to the non-inverting input of comparator 1902. The second terminal of resistor 1922 is coupled to the inverting input of comparator 1902. The second terminal of resistor 1927 is coupled to the first terminal of resistor 1918 and to the non-inverting input of comparator 1907. The second terminal of resistor 1928 is coupled to the inverting input of comparator 1907. The second terminal of resistor 1929 is coupled to the first terminal of resistor 1917 and to the non-inverting input of comparator 1908. The second terminal of resistor 1930 is coupled to the inverting input of comparator 1908. The second terminal of resistor 1915 is coupled to the second terminal of resistor 1916, to the second terminal of resistor 1917, to the second terminal of resistor 1918, to the first terminal of resistor 1935 and to coupling SQL__A. Signal SQL1 is present at coupling SQL__A. The second terminal of resistor 1935 is coupled to +5 volts.

The output of comparator 1901 is coupled to the output of comparator 1907 and to coupling RP__A. Coupling RP__A provides signal INP1. The output of comparator 1902 is coupled to the output of comparator 1908 and to coupling RN__A. Coupling RN__A provides signal INN1. Signal TX1 is provided to the input of each of non-inverting buffer 1903, inverting buffer 1904, non-inverting buffer 1909, inverting buffer 1910 and coupling TX__A. Signal TXD1 is provided to the input of each of non-inverting buffer 1905, inverting buffer 1906, non-inverting buffer 1911, inverting buffer 1912 and coupling TXD__A. Signal TXE1 is provided to the non-inverting input of AND gate 1913, to the non-inverting input of AND gate 1914 and to coupling TXEN__A. Signal SELA1 is provided to the enable terminal of each of comparators 1907 and 1908, to the inverting input of AND gate 1914 and to coupling SELA__A. Signal SELB1 is provided to the enable terminal of each of comparators 1901 and 1902, to the inverting terminal of AND gate 1913 and to coupling SELB__A. The output of AND gate 1913 is coupled to the enable terminal of each of non-inverting buffer 1903, inverting buffer 1904, non-inverting buffer 1905 and inverting buffer 1906. The output of AND gate 1914 is coupled to the enable terminal of each of non-inverting buffer 1909, inverting buffer 1910, non-inverting buffer 1911 and inverting buffer 1912.

The output of non-inverting buffer 1903 is coupled to the second terminal of resistor 1923. The output of inverting buffer 1904 is coupled to the second terminal of resistor 1924. The output of non-inverting buffer 1905 is coupled to the second terminal of resistor 1925. The output of inverting buffer 1906 is coupled to the second terminal of resistor 1926. The output of non-inverting buffer 1909 is coupled to the second terminal of resistor 1931. The output of inverting buffer 1910 is coupled to the second terminal of resistor 1932. The output of non-inverting buffer 1911 is coupled to the second terminal of resistor 1933. The output of inverting buffer 1912 is coupled to the second terminal of resistor 1934.

The circuit of FIG. 19 provides a plurality of tri-state devices for selectively coupling the receive and transmit paths from PT3877 transformer 1807 to integrated circuit 2101. Tri-state comparators 1901 and 1902 selectively provide signals INP1 and INN1 at couplings RP__A and RN__A to integrated circuit 2101 based on signals RXO1− and RXO1+. Tri-state buffers 1903, 1904, 1905 and 1906 selectively provide signals RXO1− and RXO1+ based on signals TX1 and TXD1 from integrated circuit 2101. Tri-state comparators 1907 and 1908 selectively provide signals INP1 and INN1 at couplings RP__A and RN__A to integrated circuit 2101 based on signals TXI1− and TXI1+. Tri-state buffers 1909, 1910, 1911 and 1912 selectively provide signals TXI1− and TXI1+ based on signals TX1 and TXD1 from integrated circuit 2101. Resistors 1919 through 1934 provide impedance matching between the inputs and outputs of the tri-state devices and PT3877 transformer 1807.

Signals TXE1, SELA1 and SELB1, which are provided by integrated circuit 2101, are used to select the tri-state devices intended to be active. Signal SELB1 is asserted to enable comparators 1901 and 1902, while a combination of signals SELB1 and TXE1 must be asserted to enable buffers 1903, 1904, 1905 and 1906. Signal SELA1 is asserted to enable comparators 1907 and 1908, while a combination of signals SELA1 and TXE1 must be asserted to enable buffers 1909, 1910, 1911 and 1912.

Signal SQL1, which is provided by integrated circuit 2101, is used to decrease the sensitivity of the receive path to spurious signals when no data signals are being received, thereby providing a squelch function.

Figure 20:
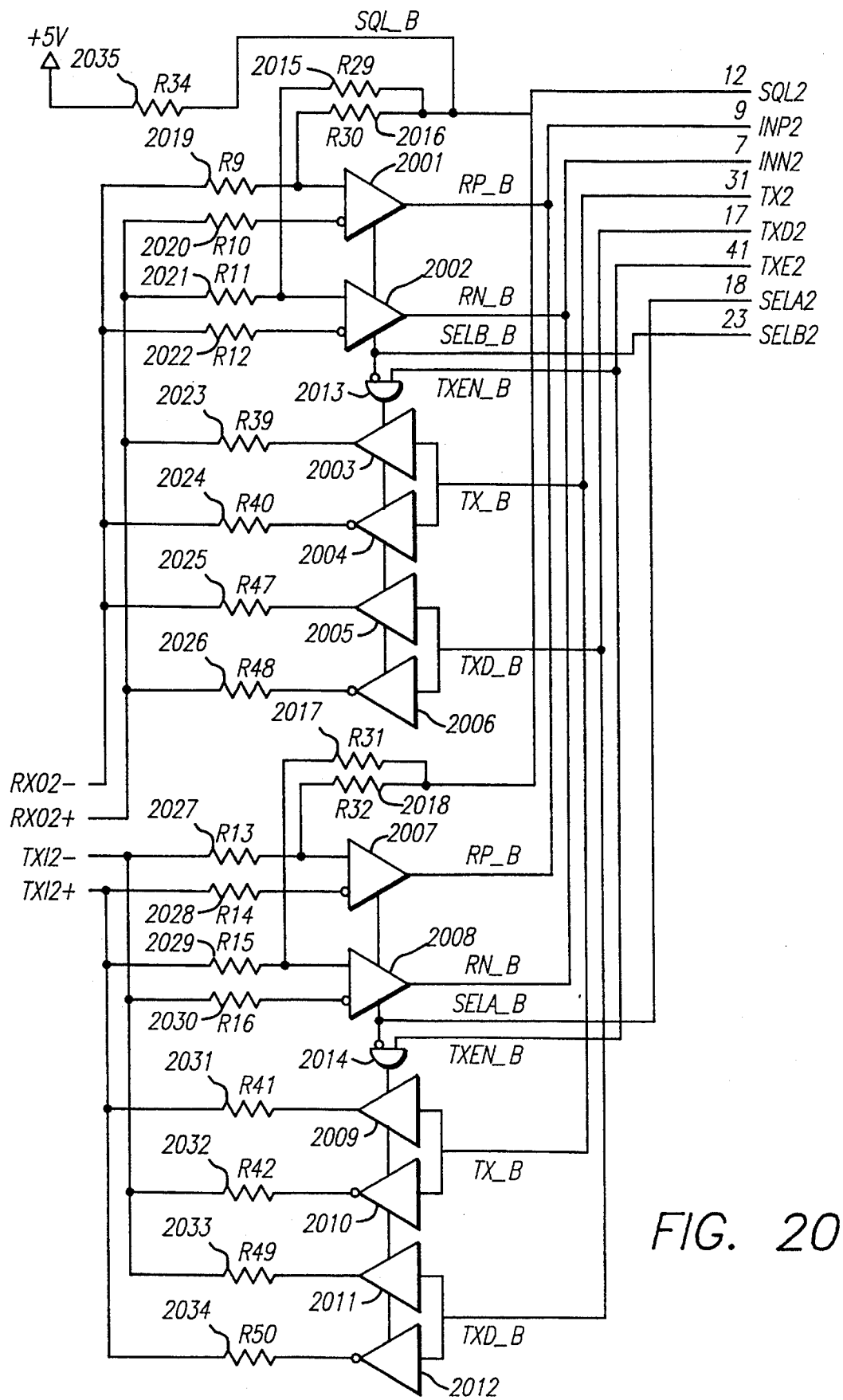
FIG. 20 is a schematic diagram illustrating the second T/R select circuit of FIG. 17.

FIG. 20 illustrates a schematic diagram of transmit/ receive (T/R) select circuit 1706. Signal RXO2– is present at the first terminal of each of resistors 2019, 2022, 2024 and 2025. Signal RXO2+ is present at the first terminal of each of resistors 2020, 2021, 2023 and 2026. Signal TXI2– is present at the first terminal of each of resistors 2027, 2030, 2032 and 2033. Signal TXI2+ is present at the first terminal of each of resistors 2028, 2029, 2031 and 2034. The second terminal of resistor 2019 is present at the first terminal of resistor 2016 and to the non-inverting input of comparator 2001. The second terminal of resistor 2020 is present at the inverting input of comparator 2001. The second terminal of resistor 2021 is present at the first terminal of resistor 2015 and to the non-inverting input of comparator 2002. The second terminal of resistor 2022 is present at the inverting input of comparator 2002.

The second terminal of resistor 2027 is coupled to the first terminal of resistor 2018 and to the non-inverting input of comparator 2007. The second terminal of resistor 2028 is coupled to the inverting input of comparator 2007. The second terminal of resistor 2029 is coupled to the first terminal of resistor 2017 and to the non-inverting input of comparator 2008. The second terminal of resistor 2030 is coupled to the inverting input of comparator 2008.

The second terminal of resistor 2015 is coupled to the second terminal of resistor 2016, to the second terminal of resistor 2017, to the second terminal of resistor 2018, to the first terminal of resistor 2035, and to coupling SQL__B. Signal SQL2 is present at coupling SQL__B. The output of comparator 2001 is coupled to the output of comparator 2007 and to coupling RP__B. Signal INP2 is present at coupling RP__B. The output of comparator 2002 is coupled to the output of comparator 2008 and to coupling RN__B. Signal INN2 is present at coupling RN__B. Signal TX2 is provided at coupling TX__B and to the input of each of non-inverting buffer 2003, inverting buffer 2004, non-inverting buffer 2009 and inverting buffer 2010. Signal TXD2 is provided at coupling TXD__B and to the input of each of non-inverting buffer 2005, inverting buffer 2006, non-inverting buffer 2011 and inverting buffer 2012. The second terminal of resistor 2035 is coupled to +5 volts.

The output of non-inverting buffer 2003 is coupled to the second terminal of resistor 2023. The output of inverting buffer 2004 is coupled to the second terminal of resistor 2024. The output of non-inverting buffer 2005 is coupled to the second terminal of resistor 2025. The output of inverting buffer 2006 is coupled to the second terminal of resistor 2026. The output of non-inverting buffer 2009 is coupled to the second terminal of resistor 2031. The output of inverting buffer 2010 is coupled to the second terminal of resistor 2032. The output of non-inverting buffer 2011 is coupled to the second terminal of resistor 2033. The output of inverting buffer 2012 is coupled to the second terminal of resistor 2034.

Signal TXE2 is provided at coupling TXEN__B, which is coupled to the non-inverting input of AND gate 2013 and to the non-inverting input of AND gate 2014. Signal SELA2 is provided at coupling SELA__B, which is coupled to the enable input of each of comparators 2007 and 2008, and to the non-inverting input of AND gate 2014. Signal SELB2 is provided at coupling SELB__B, which is coupled to the enable input of each of comparators 2001 and 2002, and to the inverting input of AND gate 2013. The output of AND gate 2013 is coupled to the enable input of each of non-inverting buffer 2003, inverting buffer 2004, non-inverting buffer 2005 and inverting buffer 2006. The output of AND gate 2014 is coupled to the enable input of each non-inverting buffer 2009, inverting buffer 2010, non-inverting buffer 2011 and inverting buffer 2012.

The circuit of FIG. 20 provides a plurality of tri-state devices for selectively coupling the receive and transmit paths from PT3877 transformer 1808 to integrated circuit 2101. Tri-state comparators 2001 and 2002 selectively provide signals INP2 and INN2 at couplings RP__B and RN__B to integrated circuit 2101 based on signals RXO2– and RXO2+. Tri-state buffers 2003, 2004, 2005 and 2006 selectively provide signals RXO2– and RXO2+ based on signals TX2 and TXD2 from integrated circuit 2101. Tri-state comparators 2007 and 2008 selectively provide signals INP2 and INN2 at couplings RP__B and RN__B to integrated circuit 2101 based on signals TXI2– and TXI2+. Tri-state buffers 2009, 2010, 2011 and 2012 selectively provide signals TXI2– and TXI2+ based on signals TX2 and TXD2 from integrated circuit 2101. Resistors 2019 through 2034 provide impedance matching between the inputs and outputs of the tri-state devices and PT3877 transformer 1808.

Signals TXE2, SELA2 and SELB2, which are provided by integrated circuit 2101, are used to select the tri-state devices intended to be active. Signal SELB2 is asserted to enable comparators 2001 and 2002, while a combination of signals SELB2 and TXE2 must be asserted to enable buffers 2003, 2004, 2005 and 2006. Signal SELA2 is asserted to enable comparators 2007 and 2008, while a combination of signals SELA2 and TXE2 must be asserted to enable buffers 2009, 2010, 2011 and 2012.

Signal SQL2, which is provided by integrated circuit 2101, is used to decrease the sensitivity of the receive path to spurious signals when no data signals are being received, thereby providing a squelch function.

Figure 21:
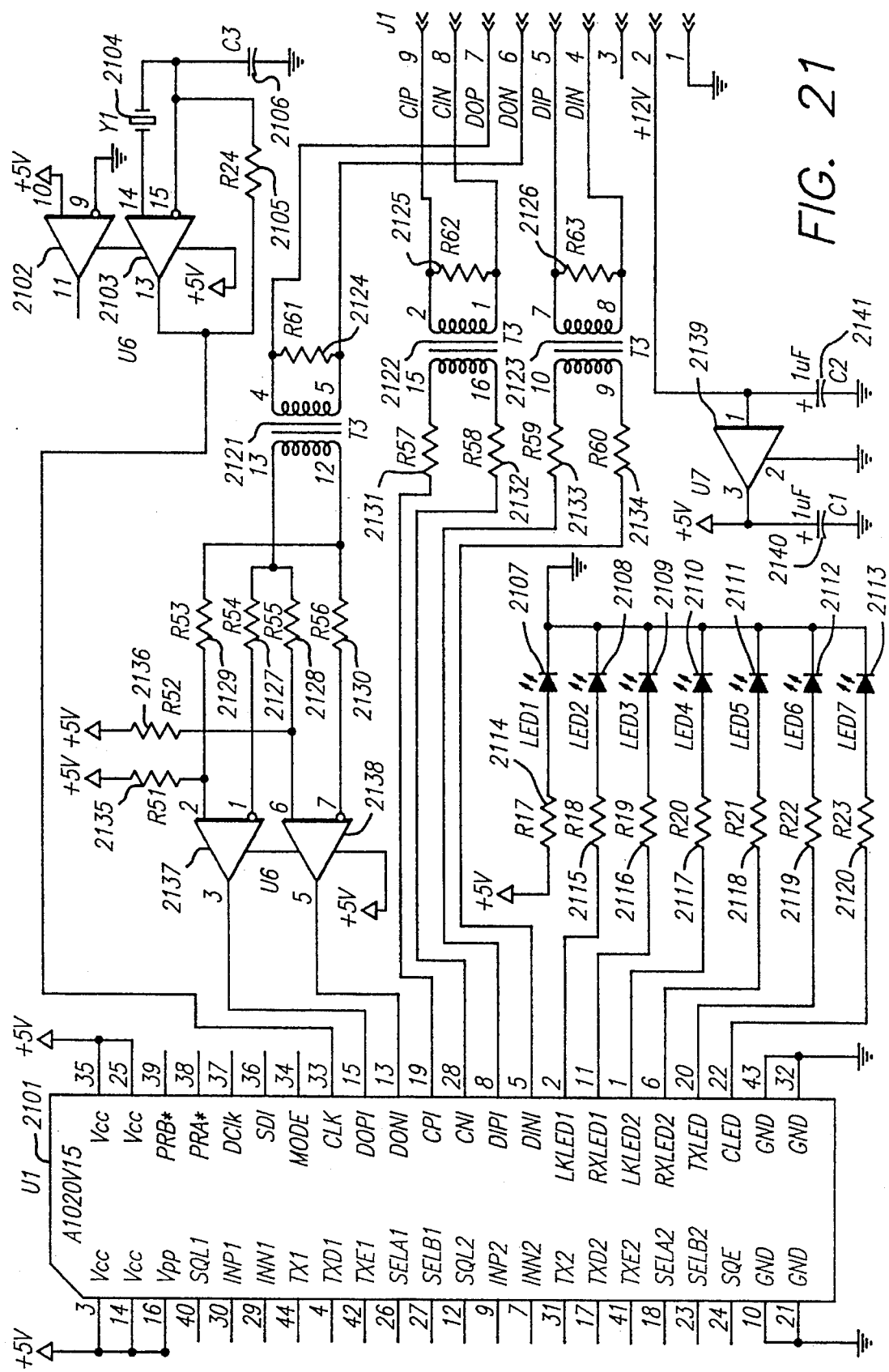
FIG. 21 is a schematic diagram illustrating the control circuit for the first network connector, the control circuit for the second network connector, the common circuitry, the clock, the status display, the AUI circuit and the AUI of FIG. 17.

FIG. 21 is a schematic diagram illustrating control block 1707, control block 1708, common circuits 1709, clock 1710, AUI circuit 1712 and status display 1711. Signals SQL1, INP1, INN1, TX1, TXD1, TXE1, SELA1, SELB1, SQL2, INP2, INN2, TX2, TXD2, TXE2, SELA2 and SELB2 appear at terminals of integrated circuit 2101. Other terminals of integrated circuit 2101 are coupled to +5 volts or ground. Although the circuitry of integrated circuit 2101 is preferably implemented in the form of an integrated circuit, the circuitry may be implemented in a discrete, hybrid or other form or some combination thereof, or other circuitry may be included in an integrated circuit.

The first terminal of crystal 2104 is coupled to the non-inverting input of comparator 2103. The second terminal of crystal 2104 is coupled to the inverting input of comparator 2103, to the first terminal of resistor 2105 and to the first terminal of capacitor 2106. The second terminal of capacitor 2106 is coupled to ground. The second terminal of resistor 2105 is coupled to the output of comparator 2103, which provides signal Clk to integrated circuit 2101.

The non-inverting input to comparator 2102 is coupled to +5 volts. The inverting input of comparator 2102 is coupled to ground. The enable input, if present, of each of comparators 2102 and 2103 is coupled to +5 volts.

The signal DOP is applied to the first terminal of resistor 2124 and the first terminal of the first winding of transformer 2121. Signal DON is applied to the second terminal of resistor 2124 and to the second terminal of the first winding of transformer 2121. The first terminal of the second winding of transformer 2121 is coupled to the first terminal of resistor 2127 and to the first terminal of resistor 2128. The second terminal of the second winding of transformer 2121 is coupled to the first terminal of resistor 2129 and to the first terminal of resistor 2130. The second terminal of resistor 2129 is coupled to the non-inverting input of comparator 2137 and to the first terminal of resistor 2135. The second terminal of resistor 2127 is coupled to the inverting input of comparator 2137. The second terminal of resistor 2128 is coupled to the non-inverting input of comparator 2138 and to the first terminal of resistor 2136. The second terminal of resistor 2130 is coupled to the inverting input of comparator 2138. The second terminal of each of resistors 2135 and 2136 is coupled to +5 volts. The enable terminal, if present, of each of comparators 2137 and 2138 is coupled to +5 volts.

The output of comparator 2137 provides signal DOPI to integrated circuit 2101. The output of comparator 2138 provides signal DONI to integrated circuit 2101.

The CNI signal from integrated circuit 2101 is provided to the first terminal of resistor 2131. The CPI signal from integrated circuit 2101 is provided to the first terminal of resistor 2132. The second terminal of resistor 2131 is coupled to the first terminal of the first winding of transformer 2122. The second terminal of resistor 2132 is coupled to the second terminal of the first winding of transformer 2122. The first terminal of the second winding of transformer 2122 is coupled to the first terminal of resistor 2125 and provides AUI signal CIP. The second terminal of the second winding of transformer 2122 is coupled to the second terminal of resistor 2125 and provides AUI signal CIN. Signal DIPI is provided to the first terminal of resistor 2133. Signal DINI is provided to the first terminal of resistor 2134. The second terminal of resistor 2133 is coupled to the first terminal of the first winding of transformer 2123. The second terminal of resistor 2134 is coupled to the second terminal of the first winding of transformer 2123. The first terminal of the second winding of transformer 2123 is coupled to the first terminal of resistor 2126 and provides AUI signal DIP. The second terminal of the second winding of transformer 2123 is coupled to the second terminal of resistor 2126 and provides AUI signal DIN.

+5 volts is coupled to the first terminal of resistor 2114. The second terminal of resistor 2114 is coupled to the anode of LED 2107. The cathode of LED 2107 is coupled to ground. Signal LKLED1 from integrated circuit 2101 is provided to the first terminal of resistor 2115. The second terminal of resistor 2115 is coupled to the anode of LED 2108. The cathode of LED 2108 is coupled to ground. Signal RXLED1 from integrated circuit 2101 is provided to the first terminal of resistor 2116. The second terminal of resistor 2116 is coupled to the anode of LED 2109. The cathode of LED 2109 is coupled to ground. Signal LKLED2 of integrated circuit 2101 is provided to the first terminal of resistor 2117. The second terminal of resistor 2117 is coupled to the anode of LED 2110. The cathode of LED 2110 is coupled to ground. Signal RXLED2 of integrated circuit 2101 is provided to the first terminal of resistor 2118. The second terminal of resistor 2118 is coupled to the anode of LED 2111. The cathode of LED 2111 is coupled to ground. Signal TXLED is provided to the first terminal of resistor 2119. The second terminal of resistor 2119 is coupled to the anode of LED 2112. The cathode of LED 2112 is coupled to ground. Signal CLED of integrated circuit 2101 is coupled to the first terminal of resistor 2120. The second terminal of resistor 2120 is coupled to the anode of LED 2113. The cathode of LED 2113 is coupled to ground.

A +12 volt input is provided on pin 2 of the AUI connector. The +12 volt input is coupled to the input terminal of LM7805 regulator 2139 and to the positive terminal of capacitor 2141. The negative terminal of capacitor 2141 is coupled to ground. The ground terminal of LM7805 regulator 2139 is coupled to ground. The output terminal of LM7805 regulator 2139 is coupled to the positive terminal of capacitor 2140 and to the +5 volt bus so as to provide a +5 volt source. The negative terminal of capacitor 2140 is coupled to ground.

In the preferred embodiment of the present invention, integrated circuit 2101 is application-specific integrated circuit (ASIC). However, discrete circuitry and/or generic integrated circuits may be used in place of or in combination with an ASIC. Signals SQL1, INP1, INN1, TX1, TXD1, TXE1, SELA1, SELB1, SQL2, INP2, INN2, TX2, TXD2, TXE2, SELA2, SELB2, Clk, DOPI, DONI, CPI, CNI, DIPI, DINI, LKLED1, RXLED1, LKLED2, RXLED2, TXLED and CLED appear at the terminals of integrated circuit 2101.

Crystal 2104, capacitor 2106, resistor 2105 and comparator 2103 form a clock oscillator for providing the signal Clk to integrated circuit 2101. The frequency of clock signal Clk is dependent upon the resonant frequency of crystal 2104.

Data out AUI signals DOP and DON are used to transmit data from the data terminal equipment (DTE) to the MAU along the AUI. Signals DOP and DON are applied across resistor 2124 and across the first winding of transformer 2121. Signals DOP and DON are coupled through transformer 2121 and through resistors 2127, 2128, 2129 and 2130 to comparators 2137. Resistors 2135 and 2136 are coupled to +5 volts to act as pullup resistors and to set the appropriate DC levels. Comparators 2137 and 2138 provide signals DOPI and DONI to integrated circuit 2101.

Control in signals CPI and CNI are provided by integrated circuit 2101 and are applied through resistors 2131 and 2132 to the first winding of transformer 2122. Signals CPI and CNI are coupled through transformer 2122 and appear across resistor 2125, which ensures proper impedance matching with the AUI. Signals CPI and CNI are transmitted via the AUI to the DTE and pass control information from the MAU to the DTE.

Data in signals DIPI and DINI are provided by integrated circuit 2101 and are applied through resistors 2133 and 2134 to the first winding of transformer 2123. Signals DIPI and DINI are coupled through transformer 2123 and appear across resistor 2126, which ensures proper impedance matching with the AUI. Signals DIPI and DINI are transmitted via the AUI to the DTE and pass data from the MAU to the DTE.

Although transformers 2121, 2122 and 2123 and resistors 2124, 2125, 2126, 2127, 2128, 2129, 2130, 2131, 2132, 2133, 2134, 2135 and 2136 are illustrated in FIG. 21 for coupling data out signals DOP and DON, control in signals CPI and CNI, and data in signals DIPI and DINI to assure compliance with standards, the present invention may be practiced without these components or with other coupling components, depending upon the type of interface to be provided.

LEDs 2107, 2108, 2109, 2110, 2111, 2112 and 2113 provide visual indication of the status of the MAU. These LEDs are controlled by the +5 volt power supply voltage and signals LKLED1, RXLED1, LKLED2, RXLED2, TXLED and CLED, respectively. Current to the LEDs is limited by resistors 2114, 2115, 2116, 2117, 2118, 2119 and 2120, respectively.

A +5 volt power supply is provided and is based on LM7805 voltage regulator 2139. +12 volts from the AUI is applied to the input of the voltage regulator and +5 volts is taken from the output of the voltage regulator. Filter capacitors 2141 and 2140 are provided on the input and output of the voltage regulator, respectively.

Figure 22:
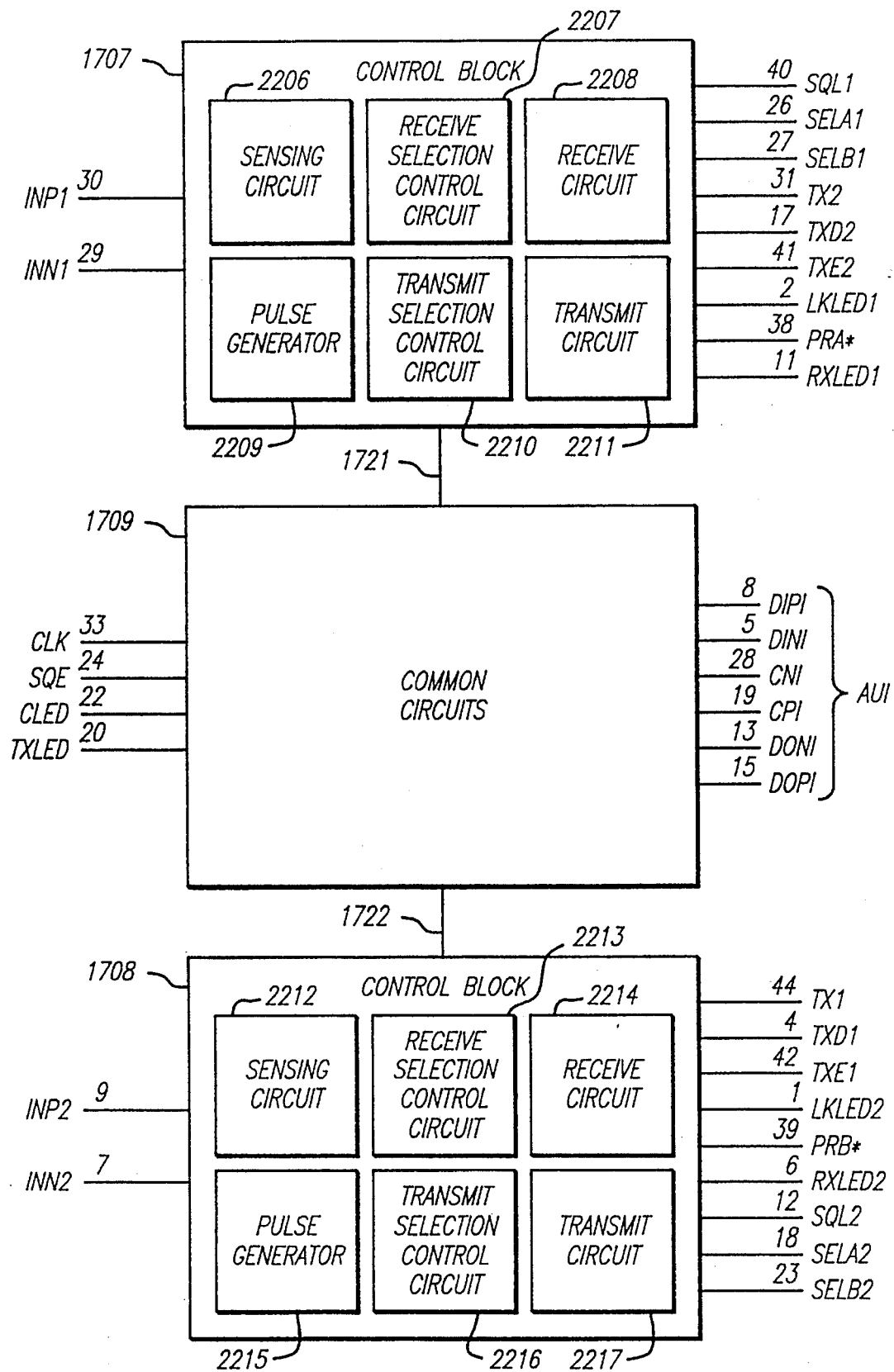
FIG. 22 is a block diagram illustrating the control circuit for the first network connector, the control circuit for the second network connector, the common circuitry and AUI connection and the signals associated therewith.

FIG. 22 is a block diagram illustrating control block 1707, control block 1708, common circuits 1709 and the signals associated therewith. Control block 1707 comprises sensing circuit 2206, receive selection control circuit 2207, receive circuit 2208, pulse generator 2209, transmit selection control circuit 2210 and transmit circuit 2211. Signals INP1, INN1, SQL1, SELA1, SELB1, TX2, TXD2, TXE2, LKLED1, PRA* and RXLED1 are present at control block 1707. Signals Clk, SQE, CLED, TXLED, DIPI, DINI, CNI, CPI, DONI and DOPI are present at common circuits 1709. Control block 1708 comprises sensing circuit 2212, receive selection control circuit 2213, receive circuit 2214, pulse generator 2215, transmit selection control circuit 2216 and transmit circuit 2217. Signals INP2, INN2, TX1, TXD1, TXE1, LKLED2, PRB*, RXLED2, SQL2, SELA2 and SELB2 are present at control block 1708. Control block 1707 is coupled to common circuits 1709 through coupling 1721. Coupling 1721 need not represent merely a single connection, but may represent a plurality of connections. Common circuits 1709 are coupled to control circuit 1708 through coupling 1722. Coupling 1722 need not represent merely a single connection, but may represent a plurality of connections.

Figure 23:
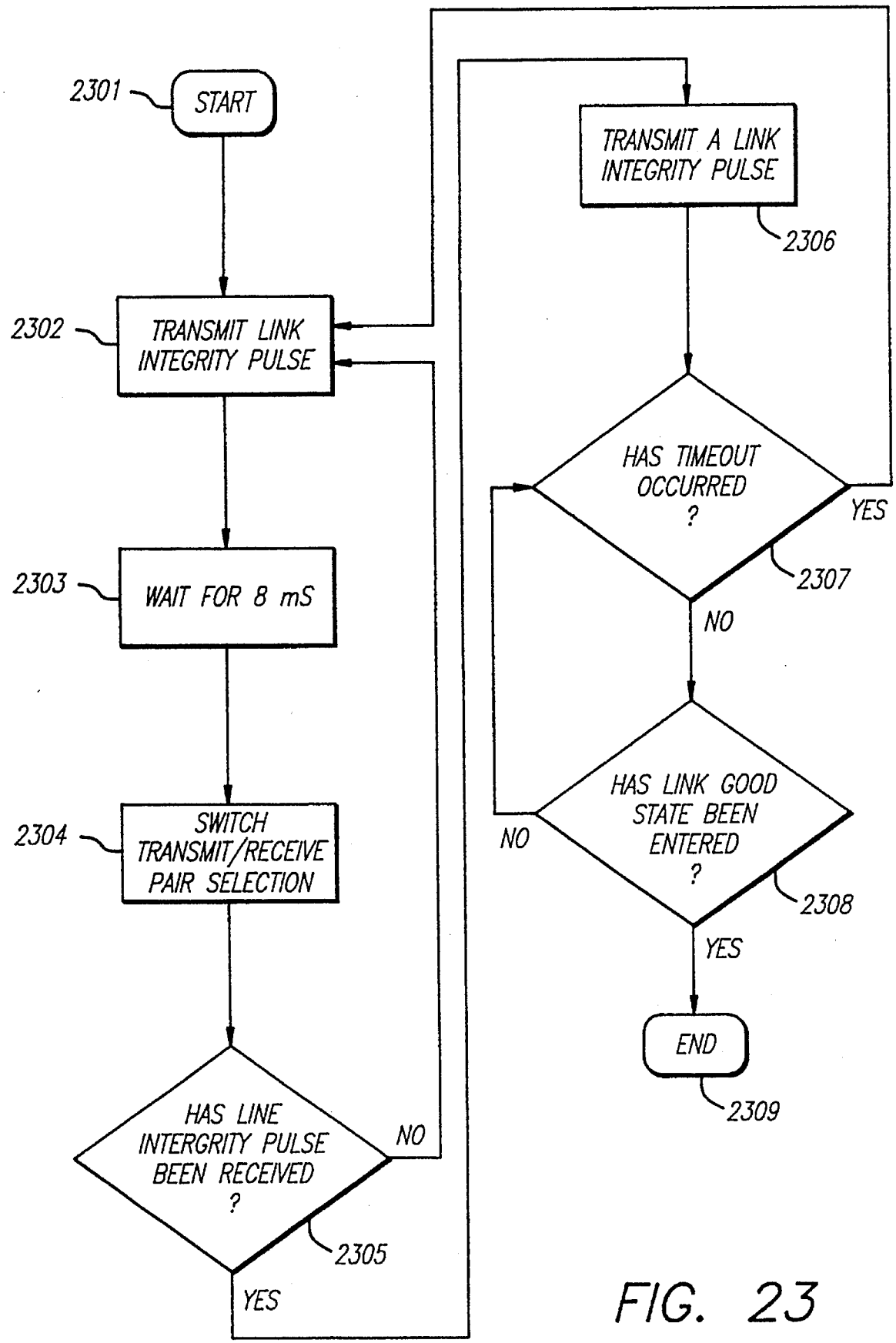
FIG. 23 is a flow chart illustrating one embodiment of the crossover method of the present invention.

FIG. 23 is a flow chart illustrating one embodiment of the crossover method of the present invention. The method begins at step 2301 and proceeds to step 2302, where a link integrity pulse is transmitted. After the link integrity pulse is transmitted in step 2302, an 8 millisecond delay occurs at step 2303. After the delay, the transmit/receive pair selection is switched in step 2304. What had been the transmit pair becomes the receive pair, and what had been the receive pair becomes the transmit pair. The next step is decision block 2305. If no link integrity pulse has yet been received, a return is made to step 2302, where another link integrity pulse is transmitted. If a link integrity pulse has been received, step 2306 occurs. In step 2306, a link integrity pulse is transmitted. Then, the decision of decision block 2307 is performed. If a timeout has occurred, a return is made to step 2302, where a link integrity pulse is transmitted. If no timeout has occurred, the decision of block 2308 is performed. If the link good state has not been entered, a return is made to step 2307. If the link good state has been entered, the end is reached in step 2309. When the link good state has been entered, successful network communication may occur.

Figure 24:
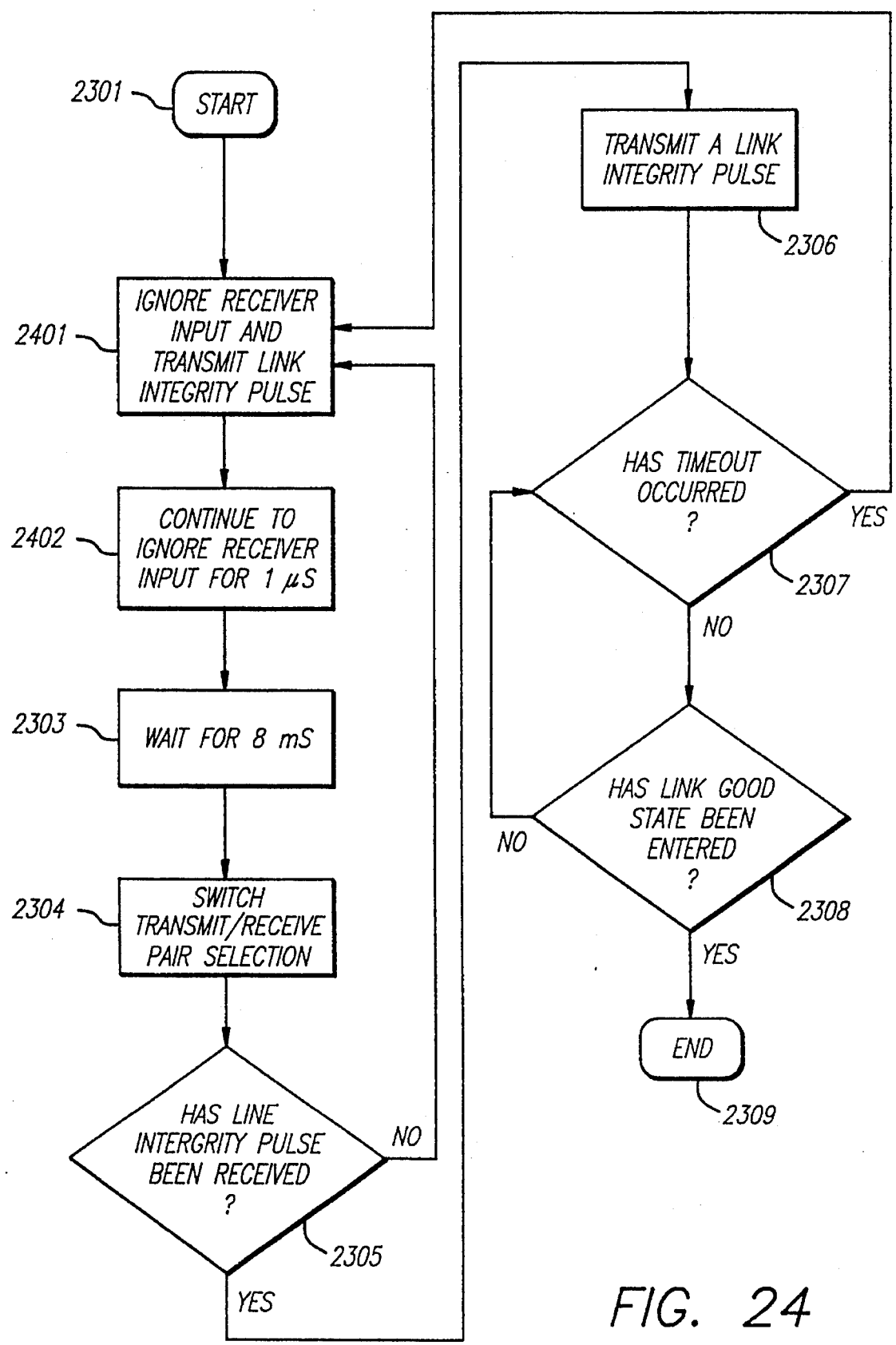
FIG. 24 is a flow chart illustrating the enhanced crossover method of an alternate embodiment of the present invention.

FIG. 24 is a flow chart illustrating the enhanced crossover method of an alternate embodiment of the present invention. The method begins in step 2301 and proceeds to step 2401, where the receiver input is temporarily ignored and a link integrity pulse is transmitted. Then, in step 2402, the receiver input is ignored for 1 microsecond. Then, in step 2303, an 8 millisecond delay occurs. After the delay, the transmit/receive pair selection is switched in step 2304. Then, the decision of decision block 2305 is made. If no link integrity pulse has been received, a return is made to step 2401. If, however, a link integrity pulse has been received, step 2306 occurs. In step 2306, a link integrity pulse is transmitted. After step 2306, the decision of decision block 2307 occurs. If a timeout has occurred, a return is made to step 2401. If no timeout has occurred, the decision of decision block 2308 is made. If the link good state has not been entered, a return is made to block 2307. If the link good state has been entered, the end is reached in step 2309. After reaching the end in step 2309, successful network communication may be performed.

Figure 25:
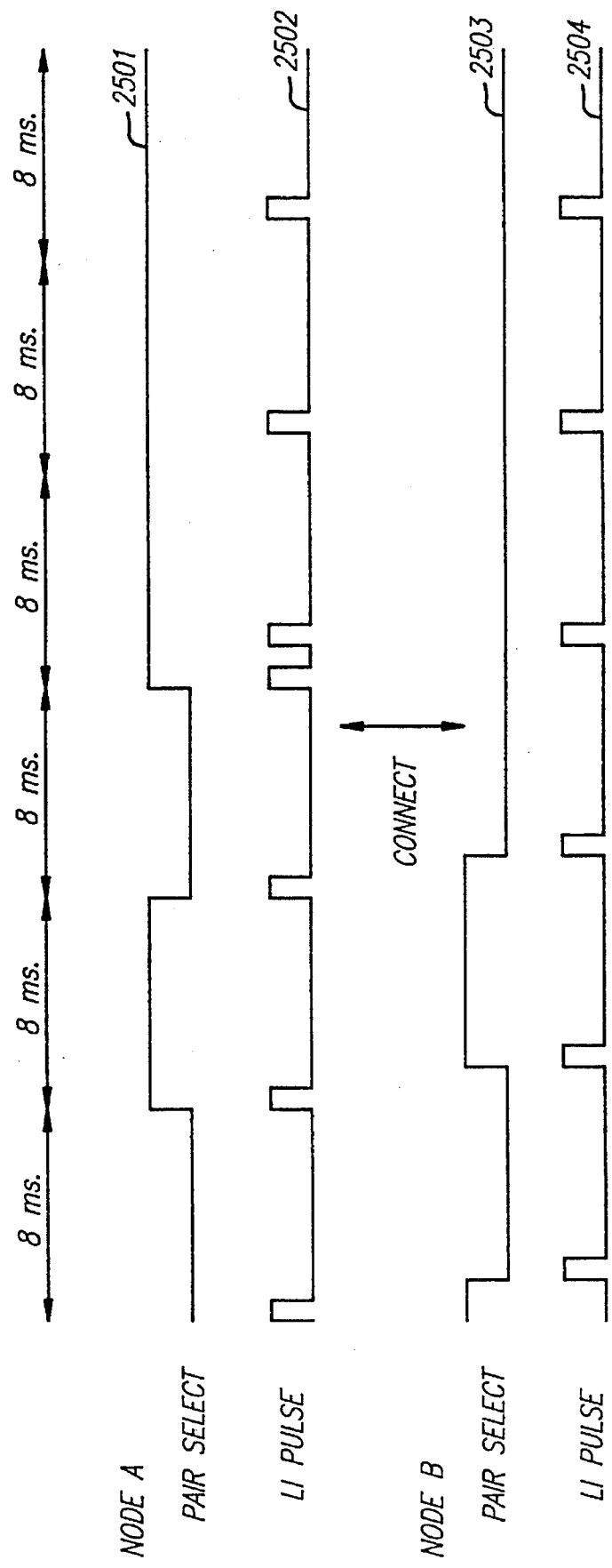
FIG. 25 is a timing diagram illustrating an example of the establishment of a network connection according to the present invention.

FIG. 25 illustrates a timing diagram of the establishment of a network connection according to one embodiment of the present invention. A timing signal representing the pair selection states for each of nodes A and B is illustrated in FIG. 25. Timing signal 2501 represents the pair select state for node A and timing signal 2503 represents the pair select state for node B. A low level of timing signals 2501 or 2503 represents one configuration of T/R select circuit 1705 or T/R select circuit 1706, while a high level of timing signals 2501 or 2503 represents the opposite configuration of T/R select circuit 1705 or T/R select circuit 1706. In an attempt to establish a network connection, each network node equipped with the auto-crossover feature of the present invention will swap transmit and receive paths every 8 milliseconds in an attempt to determine which path will be used as the actual transmit path and which will be used as the actual receive path. After swapping transmit and receive paths, each node will transmit a link integrity pulse, as illustrated by timing signals 2502 and 2504, for nodes A and B, respectively.

When one of the nodes switches to a transmit/receive pair configuration that is the opposite of the other node and transmits a link integrity pulse, the link integrity pulse will be received by the other node. The other node will then transmit a link integrity pulse that will be received by the first node. When the first node receives a valid link integrity pulse, it will suspend its transmit/receive pair selection switching and, after additional link integrity pulses are received, will establish a link good status.

Figure 26:
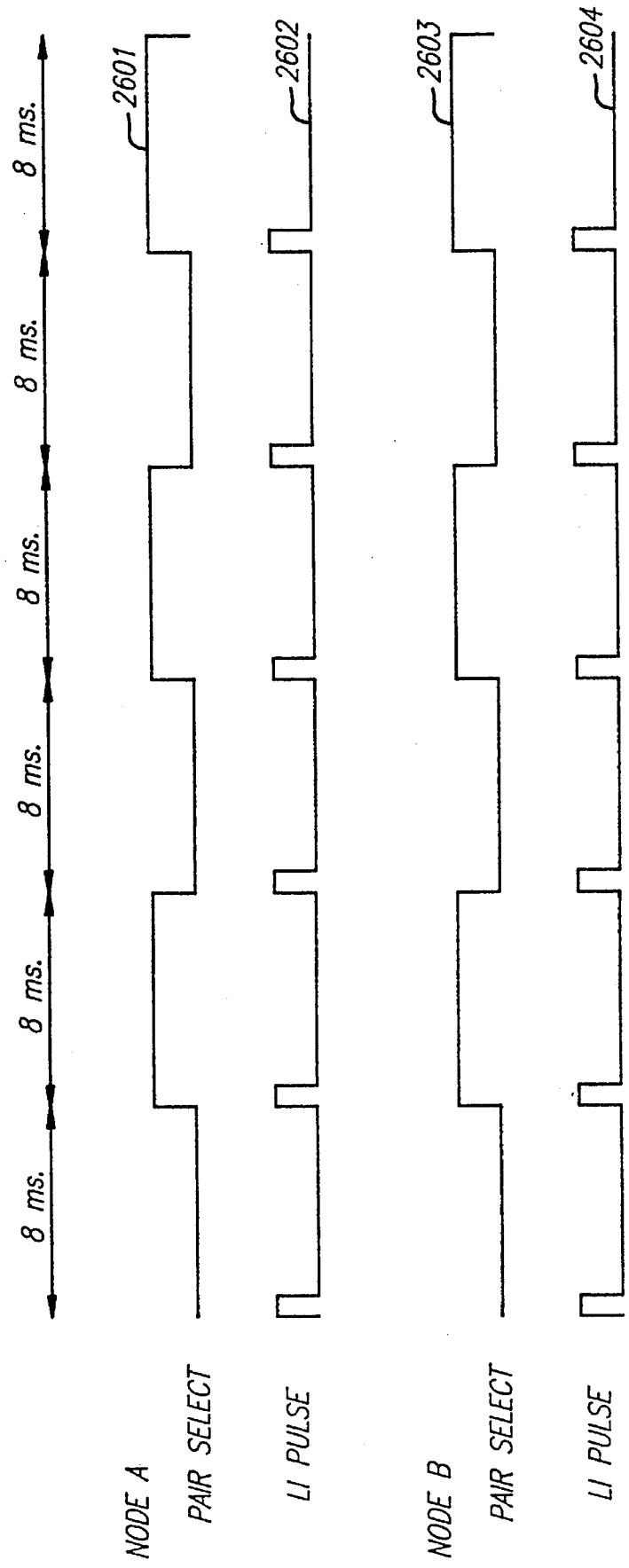
FIG. 26 is a timing diagram illustrating an example of a pathological case of identical switching patterns and timing between two network nodes, each using the auto-crossover method of the present invention.

FIG. 26 illustrates a timing diagram of a pathological state where nodes A and B are synchronized within approximately 100 nanoseconds of each other. Timing signal 2601 and timing signal 2603 represent the pair select states of node A and node B, respectively. A low level of timing signals 2601 and 2603 represents one configuration of T/R select circuits 1705 and 1706, while a high level of timing signals 2601 and 2603 represents the opposite transmit/receive path configuration of T/R select circuits 1705 and 1706. Timing signals 2602 and 2604 represent the link integrity pulses of node A and node B, respectively. The link integrity pulses are transmitted immediately subsequent to the switching of transmit and receive path states.

If node A and node B switch from the same state to the same state within approximately 100 nanoseconds of each other, the link integrity pulses transmitted by the opposite node will not be received as valid pulses. Thus, one node will not recognize the presence and configuration of the other node and the auto-crossover method will continue. However, for this problem to occur, the two nodes must switch transmit and receive paths within 100 nanoseconds of each other over an 8 millisecond cycle, resulting in a 0.00125 percent chance of a failure to establish a link good state. Thus, there is a 99.875 percent chance that a valid network connection may be established. Even if the network nodes are unable to establish a valid connection because of close clock synchronization, the clock circuit of one network node may be easily reset to produce timing signals randomly related to the signals of the other node, allowing the establishment of a valid network connection rapidly and without difficulty.

Figure 27:
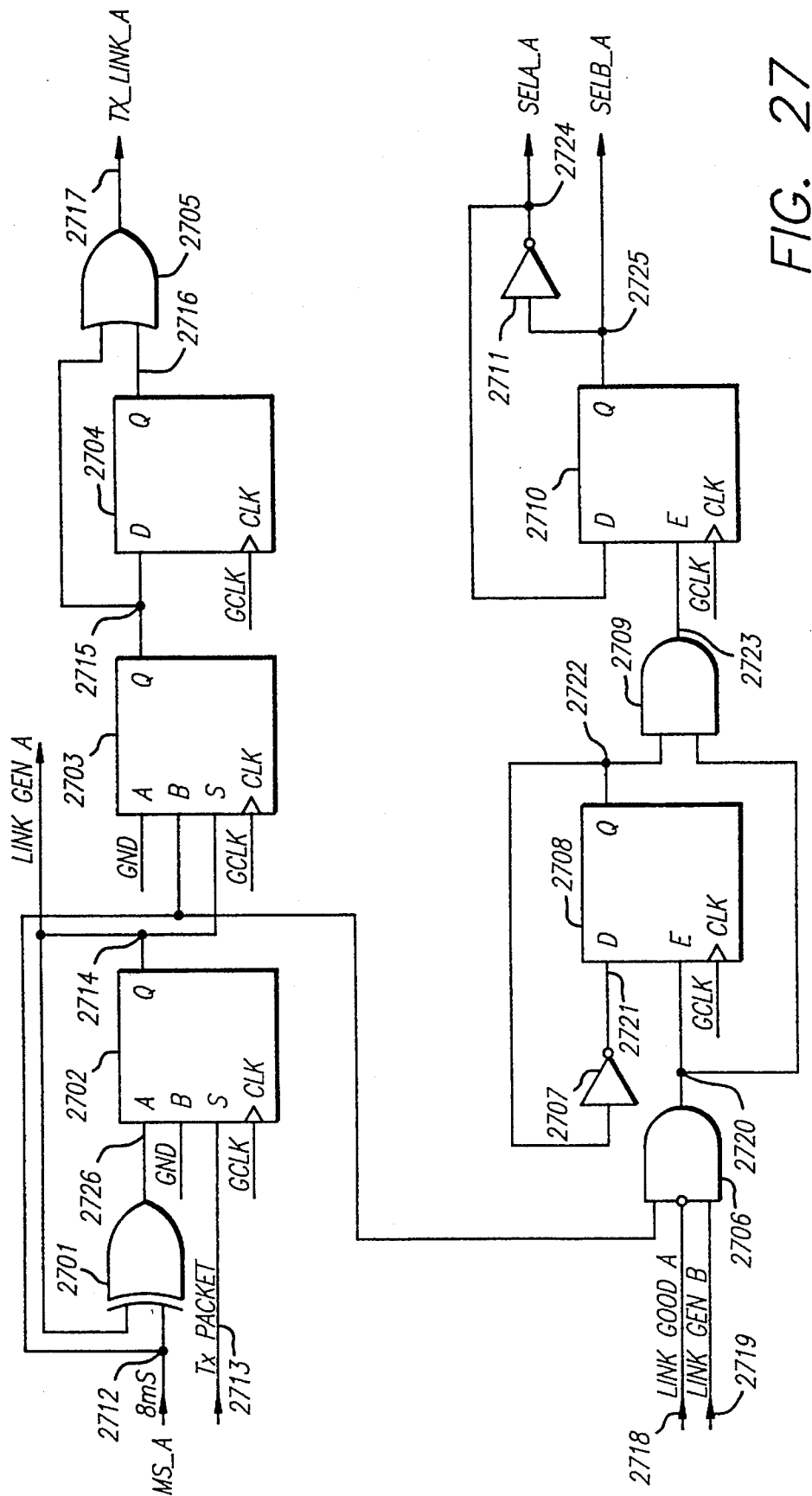
FIG. 27 is a schematic diagram of one embodiment of a portion of control block 1707.

FIG. 27 is a schematic diagram of one embodiment of a portion of control block 1707. FIG. 27 is also representative of a portion of control block 1708. Signal MS_7 is applied to node 2712, which is coupled to an input of XOR gate 2701, to the B input of selectable input D flip-flop 2703 and a non-inverting input of AND gate 2706. Signal Tx_Packet is applied to node 2713, which is coupled to the S input of selectable input D flip-flop 2702. The Q output of selectable input D flip-flop 2702 is coupled to node 2714, which is coupled to an input of XOR gate 2701, to the S input of selectable input D flip-flop 2703 and which provides the signal Link_Gen_A. The output of XOR gate 2701 is coupled to the A input of selectable input D flip-flop 2702. The B input of selectable input D flip-flop 2702 is coupled to ground. The clock input of selectable input D flip-flop 2702 is coupled to signal GClk.

The A input of selectable input D flip-flop 2703 is coupled to ground. The clock input of selectable input D flip-flop 2703 is coupled to signal GClk. The Q output of selectable input D flip-flop 2703 is coupled to node 2715, which is coupled to the D input of D flip-flop 2704 and to an input of OR gate 2705. The clock input of D flip-flop 2704 is coupled to signal GClk. The Q output of D flip-flop 2704 is coupled to an input of OR gate 2705. The output of OR gate 2705 provides signal TX_LINK_A at node 2717.

Signal Link_Good_A is provided to node 2718, which is coupled to an inverting input of AND gate 2706. Signal Link_Gen_B is provided to node 2719, which is coupled to a non-inverting input of AND gate 2706. The output of AND gate 2706 is coupled to node 2720, which is coupled to the E input of D flip-flop 2708 and to an input of AND gate 2709. The Q output of D flip-flop 2708 is coupled to node 2722, which is coupled to the input of inverter 2707 and to an input of AND gate 2709. The output of inverter 2707 is coupled to node 2721, which is coupled to the D input of D flip-flop 2708. The output of AND gate 2709 is coupled to node 2723, which is coupled to the E input of D flip-flop 2710. Signal GClk is coupled to the clock input of D flip-flop 2710. The Q output of D flip-flop 2710 is coupled to the input of inverter 2711 and to node 2725, which provides signal SELB_A. The output of inverter 2711 is coupled to the D input of D flip-flop 2710 and to node 2724, which provides signal SELA_A.

XOR gate 2701 and selectable input D flip-flop 2702 provide a link pulse timer function, determining when link integrity pulses should be transmitted. Selectable input D flip-flop 2703, D flip-flop 2704 and OR gate 2705 provide a link generator function, producing link integrity pulses at the appropriate times for transmission. These components also provide a counting function. Every 8 mS, a pulse from signal MS_A arrives at node 2712, incrementing a counter. If a packet is sent, signal Tx_Packet at node 2713 causes the counter to be reset. When the counter reaches a value of 2, a 2 clock period long pulse is output on signal TX_LINK_A on node 2717 to transmit a link integrity pulse on the currently selected transmit pair. AND gate 2706, inverter 2707, D flip-flop 2708, AND gate 2709, D flip-flop 2710 and inverter 2711 provide a cross connect function, determining which communication path should be selected for transmission and which communication path should be selected for reception. If a valid link is not yet established, the cross connect circuit is enabled using AND gate 2706. When the cross connect circuit is enabled, a counter is incremented when the opposite port's link pulse generator (associated with the other control block, such as control block 1708) sends a link integrity pulse. When this counter reaches a value of 2, the transmit and receive communication paths are swapped. Thus, the paths are swapped every other link integrity pulse until the link pulse state machine indicates that a good link integrity pulse has been received. When a good link integrity pulse has been received, the Link_Good_A line goes high, the autocrossover state machine stops swapping the paths, and a good link is established.

Figure 28:
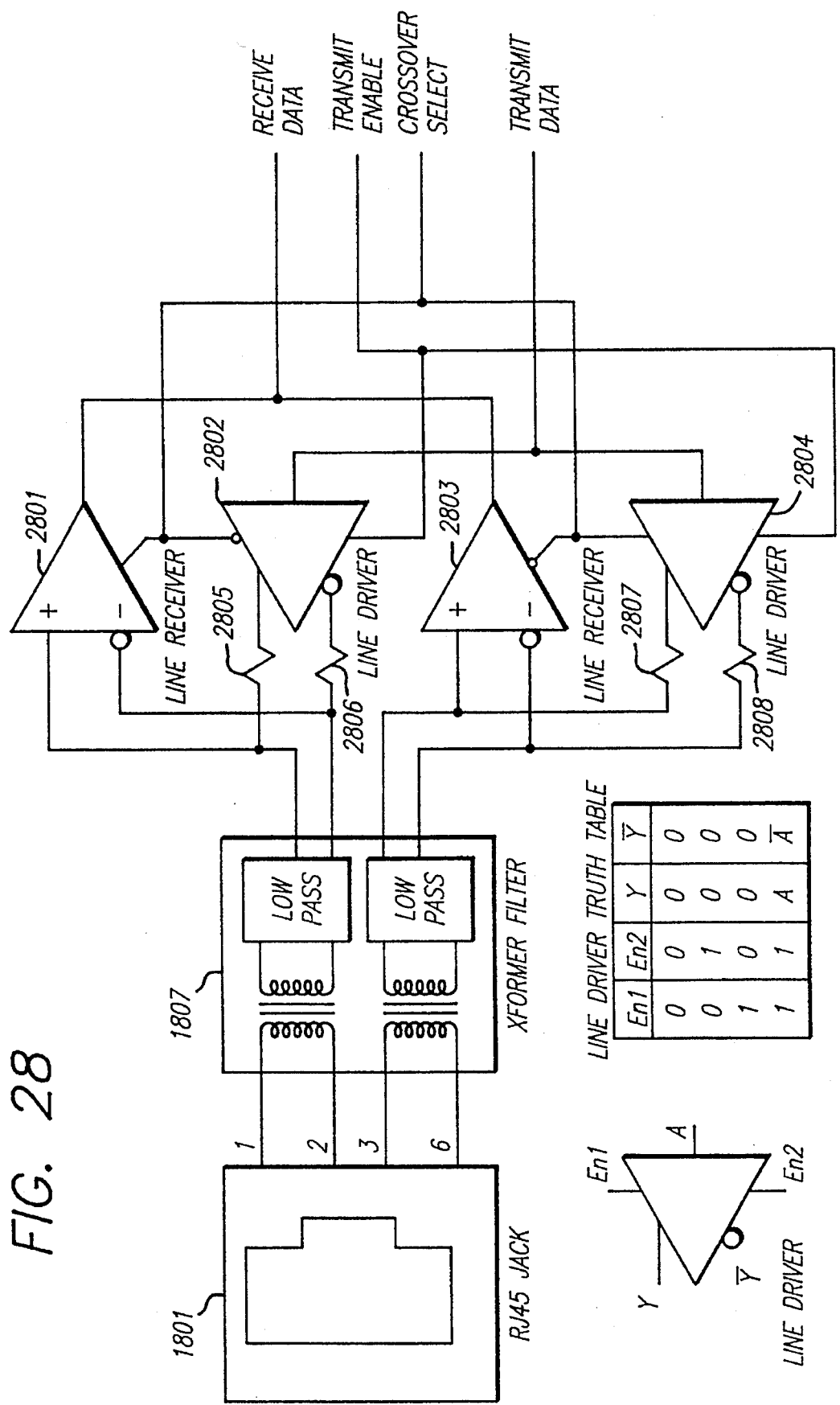
FIG. 28 is a schematic diagram of an alternate embodiment of network connector 1701 and T/R select circuit 1705.

FIG. 28 is a schematic diagram of an alternate embodiment of network connector 1701 and T/R select circuit 1705. Bypass relays 1703 have been omitted to avoid unnecessarily complicating the diagram and may be used with the circuits of this diagram if desired. The circuits of this diagram may also be used to implement network connector 1702 and T/R select circuit 1706.

In this embodiment, the two pairs of conductors from network connector 1801 are coupled to transformer/filter 1807. A first conductor of a first pair of conductors of transformer/filter 1807 is coupled to a non-inverting input of line receiver 2801 and to a first terminal of resistor 2805. A second terminal of resistor 2805 is coupled to a non-inverting output of line driver 2802. A second conductor of a first pair of conductors of transformer/filter 1807 is coupled to an inverting input of line receiver 2801 and to a first terminal of resistor 2806. A second terminal of resistor 2806 is coupled an inverting output of line driver 2802.

A first conductor of a second pair of conductors of transformer/filter 1807 is coupled to a non-inverting input of line receiver 2803 and to a first terminal of resistor 2807. A second terminal of resistor 2807 is coupled to a non-inverting output of line driver 2804. A second conductor of a second pair of conductors of transformer/filter 1807 is coupled to an inverting input of line receiver 2803 and to a first terminal of resistor 2808. A second terminal of resistor 2808 is coupled an inverting output of line driver 2804.

The output of line receivers 2801 and 2803 are coupled together and provide a receive data signal. A transmit data signal is provided to line drivers 2802 and 2804. Line receivers 2801 and 2803 each have an enable terminal to allow their outputs to be enabled or disabled. A crossover select signal is applied to the enable terminals of line receivers 2801 and 2803. However, the crossover select signal is inverted before it is applied to line receiver 2803. Thus, only one of line receivers 2801 and 2803 will be enabled at any given time. Line driver 2802 and 2804 each have two enable terminals to allow their outputs to be enabled or disabled. The crossover select signal is applied to a first enable terminal of each of line drivers 2802 and 2804. However, the crossover select signal is inverted before it is applied to line driver 2802. Thus, line drivers 2802 and 2804 are prevented from being enabled at the same time. A transmit data signal is applied to each of line drivers 2802 and 2804. The transmit data signal allows line drivers 2802 and 2804 to be disabled when no signals are to be transmitted. Line driver 2802 or 2804 provides differential output signals across the selected transmit pair when both of the enable signals are asserted. When either or both of the enable signals is not asserted, line drivers 2802 and 2804 provide a grounded or low output. With its outputs grounded, line driver 2802 in conjunction with resistors 2805 and 2806 provides a line termination equal to the sum of the resistances of resistors 2805 and 2806 across the inputs of line receiver 2801. With it outputs grounded, line driver 2804 in conjunction with resistors 2807 and 2808 provides a line termination equal to the sum of the resistances of resistors 2807 and 2808 across the inputs of line receiver 2803. When transmitting from line driver 2802, resistors 2805 and 2806 match the impedance of line driver 2802 to the impedance of the transmission line coupled to connector 1801. When transmitting from line driver 2804, resistors 2807 and 2808 match the impedance of line driver 2804 to the impedance of the transmission line coupled to connector 1801.

Figure 29:
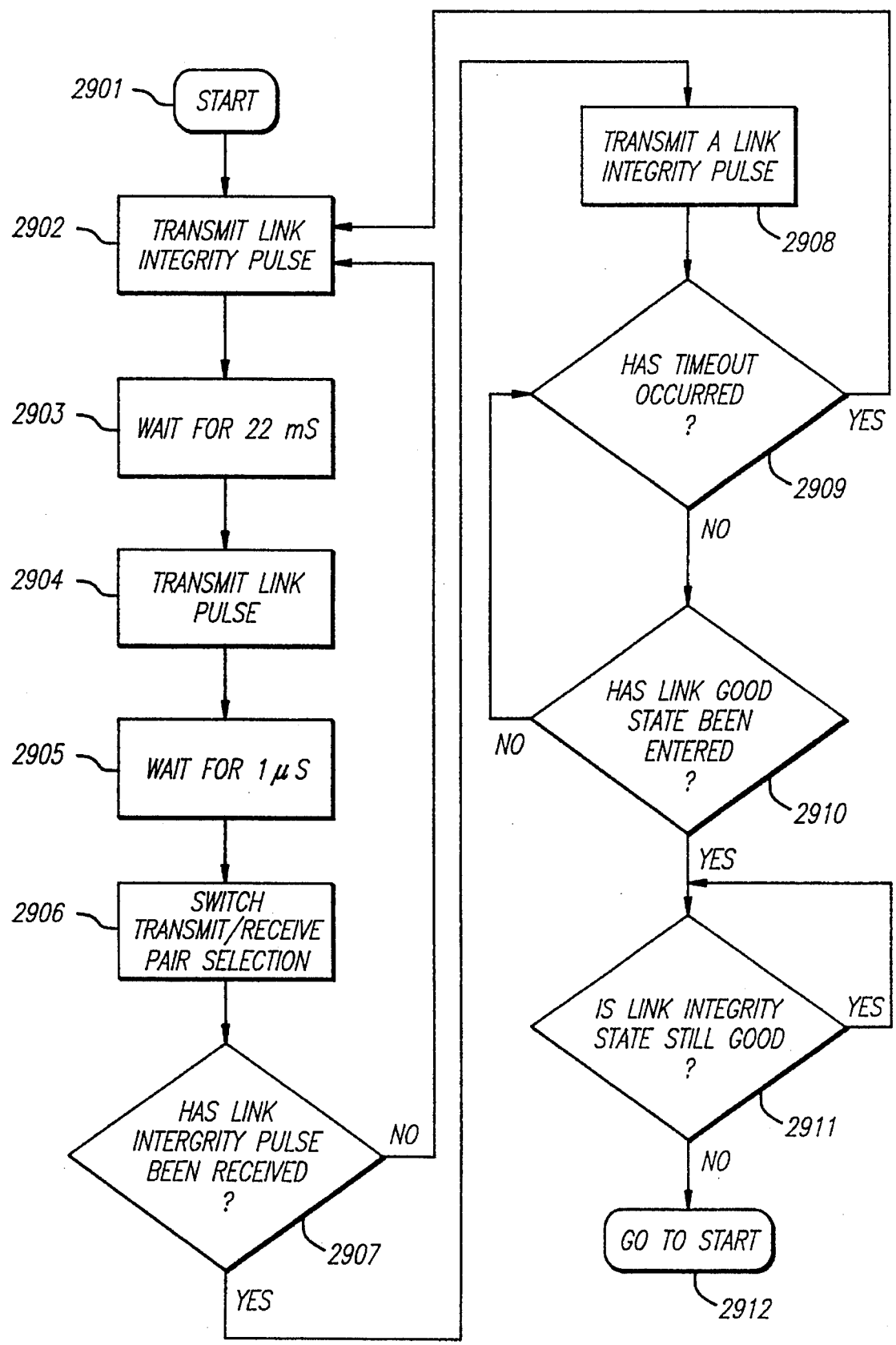
FIG. 29 is a flow chart illustrating one embodiment of the crossover method of the present invention.

FIG. 29 is a flow chart illustrating one embodiment of the crossover method of the present invention. The method begins at step 2901 and proceeds to step 2902, where a link integrity pulse is transmitted. After the link integrity pulse is transmitted in step 2902, a 22 millisecond delay occurs at step 2903. After the delay, a second link integrity pulse is transmitted in step 2904. After another delay of 1 µS in step 2905, the transmit/receive pair selection is switched in step 2906. What had been the transmit pair becomes the receive pair, and what had been the receive pair becomes the transmit pair. The next step is decision block 2907. If no link integrity pulse has yet been received, a return is made to step 2902, where another link integrity pulse is transmitted. If a link integrity pulse has been received, step 2908 occurs. In step 2908, a link integrity pulse is transmitted. Then, the decision of decision block 2909 is performed. If a timeout has occurred, a return is made to step 2902, where a link integrity pulse is transmitted and searching for the proper receive/transmit selection continues. If no timeout has occurred, the decision of block 2910 is performed. If the link good state has not been entered, a return is made to step 2909. If the link good state has been entered, decision block 2911 is entered and the decision of block 2911 is constantly repeated to monitor the status of the link integrity. When the link good state has been entered, successful network communication may occur. Should the link integrity state ever change to "fail", decision block 2911 is exited and step 2912 causes the process to start again at start 2901.

Figure 30:
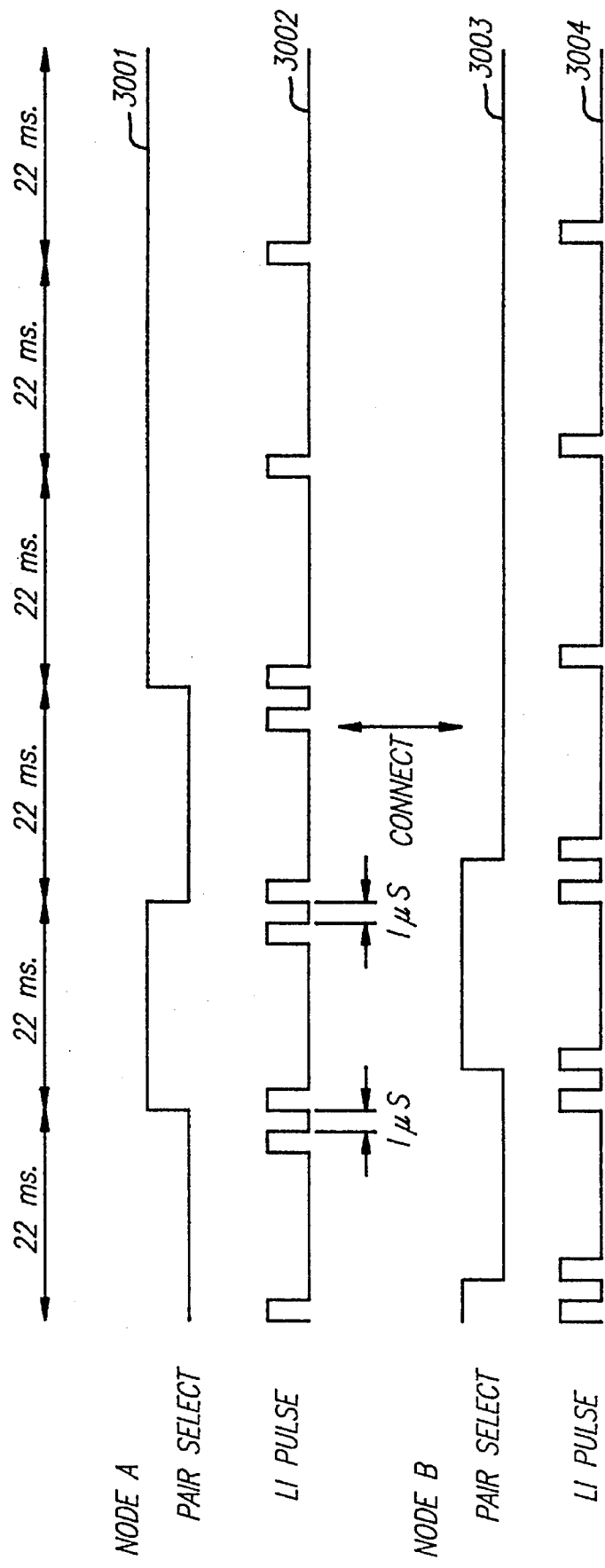
FIG. 30 is a timing diagram illustrating an example of the establishment of a network connection according to the present invention.

FIG. 30 is a timing diagram illustrating an example of the establishment of a network connection according to the present invention. A timing signal representing the pair selection states for each of nodes A and B is illustrated in FIG. 30. Timing signal 3001 represents the pair select state for node A and timing signal 3003 represents the pair select state for node B. A low level of timing signals 3001 or 3003 represents one configuration of T/R select circuit 1705 or T/R select circuit 1706, while a high level of timing signals 3001 or 3003 represents the opposite configuration of T/R select circuit 1705 or T/R select circuit 1706. In an attempt to establish a network connection, each network node equipped with the auto-crossover feature of the present invention will swap transmit and receive paths every 22 milliseconds in an attempt to determine which path will be used as the actual transmit path and which will be used as the actual receive path. Immediately after and 1 µS before swapping transmit and receive paths, each node will transmit a link integrity pulse, as illustrated by timing signals 3002 and 3004, for nodes A and B, respectively.

When one of the nodes switches to a transmit/receive pair configuration that is the opposite of the other node and transmits a link integrity pulse, the link integrity pulse will be received by the other node. The other node will then transmit a link integrity pulse that will be received by the first node. When the first node receives a valid link integrity pulse, it will suspend its transmit/receive pair selection switching and, after additional link integrity pulses are received, will establish a link good status.

Figure 31:
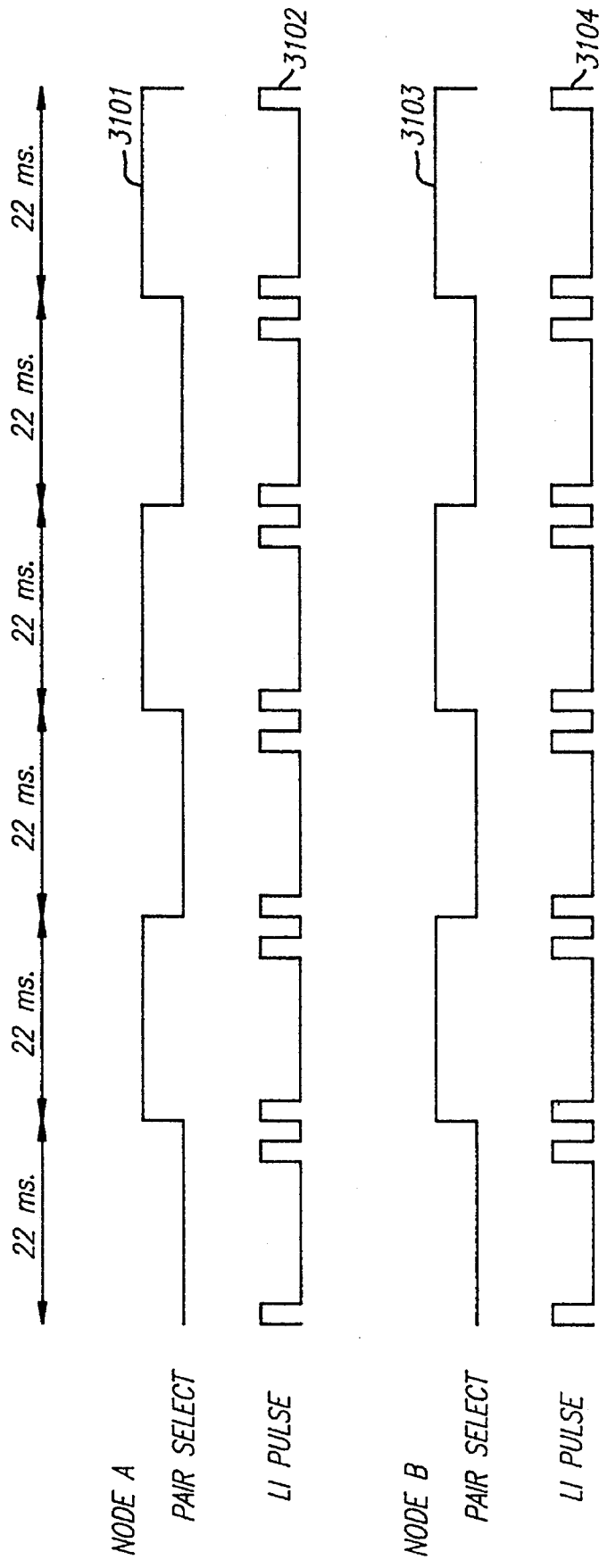
FIG. 31 is a timing diagram illustrating an example of a pathological case of identical switching patterns and timing between two network nodes, each using the auto-crossover method of the present invention.

FIG. 31 is a timing diagram illustrating an example of a pathological case of identical switching patterns and timing between two network nodes, each using the auto-crossover method of the present invention. Such a case can occur when nodes A and B are synchronized within approximately 100 nanoseconds of each other. Timing signal 3101 and timing signal 3103 represent the pair select states of node A and node B, respectively. A low level of timing signals 3101 and 3103 represents one configuration of T/R select circuits 1705 and 1706, while a high level of timing signals 3101 and 3103 represents the opposite transmit/receive path configuration of T/R select circuits 1705 and 1706. Timing signals 3102 and 3104 represent the link integrity pulses of node A and node B, respectively. The link integrity pulses are transmitted immediately subsequent to and 1 µS before the switching of transmit and receive path states.

If node A and node B switch from the same state to the same state within approximately 100 nanoseconds of each other, the link integrity pulses transmitted by the opposite node will not be received as valid pulses. Thus, one node will not recognize the presence and configuration of the other node and the auto-crossover method will continue. However, for this problem to occur, the two nodes must switch transmit and receive paths within 100 nanoseconds of each other over a 22 millisecond cycle, resulting in a 0.0000045 percent chance of a failure to establish a link good state. Thus, there is a 99.9995 percent chance that a valid network connection may be established. Even if the network nodes are unable to establish a valid connection because of close clock synchronization, the clock circuit of one network node will drift relative to the clock of the other network node, and eventually the difference will allow the establishment of a valid network connection rapidly and without difficulty.

Thus, an apparatus and a method for providing automatic configuration of the transmit and receive paths of a network connection has been described.

We claim:

1. Connecting means for connecting a first device to signal lines in a network, wherein said signal lines comprise a first signal line and a second signal line, said connecting means comprising:

first selecting means coupled to said signal lines for alternately selecting said second signal line and said first signal line as a receive path;

sensing means coupled to said first selecting means and to said first device for sensing link integrity pulses on said first signal line from a second device coupled to said signal lines in said network;

second selecting means coupled to said signal lines for alternately selecting said first signal line and said second signal line as a transmit path, said first signal line being selected as a transmit path when said second signal line is selected as a receive path and said second signal line being selected as a transmit path when said first signal line is selected as a receive path;

generating means coupled to said second selecting means and to said first device for generating link integrity pulses on said transmit path for transmission to said second device.

2. The connecting means of claim 1 further comprising:

first control means for controlling said first selecting means;

second control means for controlling said second selecting means.

3. The connecting means of claim 2 further comprising:

receiving means coupled to said first selecting means for receiving receive data over said first signal line;

transmitting means coupled to said second selecting means for transmitting transmit data over said second signal line;

interface means for interfacing said receiving means and said transmitting means to said first device.

4. The connecting means of claim 3 further comprising:

bypass means coupled to said signal lines for bypassing said first device and for ensuring continuity of said network when said connecting means is in an unpowered state.

5. The connecting means of claim 3 wherein said network comprises a 10Base-T network.

6. Apparatus comprising:

a first unidirectional communication path;

a second unidirectional communication path;

selecting means selectably coupled to said first unidirectional communication path and to said second unidirectional communication path for monitoring said first unidirectional communication path and said second unidirectional communication path for a received network status signal from a remote node and for selecting a receive path among said first unidirectional communication path and said second unidirectional communication path and a transmit path among said first unidirectional communication path and said second unidirectional communication path in response to said received network status signal.

7. The apparatus of claim 6 further comprising:

generating means for generating network status signals;

transmitting means for transmitting said network status signals to said remote node over said transmit path;

control means for controlling said generating means and for controlling said selecting means to periodically alternate between, during a first period of time, selecting said first unidirectional communication path as a receive path and said second unidirectional communication path as a transmit path and, during a second period of time, selecting said first unidirectional communication path as a transmit path and said second unidirectional communication path as a receive path.

8. The apparatus of claim 7 wherein said apparatus is for connecting to a 10Base-T network.

9. A method of configuring a network connection comprising the steps of:

transmitting a first transmitted network status signal over a first unidirectional communication path, said first transmitted network status signal for signalling a node;

monitoring a second unidirectional communication path for a received network status signal;

transmitting a second transmitted network status signal over said second unidirectional communication path, said second transmitted network status signal for signalling said node;

monitoring said first unidirectional communication path for said received network status signal;

transmitting a third transmitted network status signal over said second unidirectional communication path after receiving said received network status signal over said first unidirectional communication path, said third transmitted network signal indicating successful negotiation of directional orientation of said first unidirectional communication path and said second unidirectional communication path.

10. The method of claim 9 further comprising the steps of:

testing whether a timeout delay has been exceeded to determine which of said steps to perform next;

testing whether a link good state has been entered to determine whether successful network communication may occur.

11. The method of claim 10 further comprising the step of:

ignoring a receiver input for a period of time.

12. Apparatus comprising:

automatic selection means coupled to a first unidirectional path and a second unidirectional path, said automatic selection means for automatically identifying a directional orientation of said first unidirectional path and said second unidirectional path and for selecting said first unidirectional path for transmission and said second unidirectional path for reception in response to a signal received from a node on said second unidirectional path.

13. The apparatus of claim 12 wherein said apparatus is coupled to a Base-T network.

14. Apparatus comprising:

a first twisted pair communication line;

a second twisted pair communication line;

a first network node coupled to said first and second twisted pair communication lines; and a second network node coupled to said first and second twisted pair communication lines, said second network node comprising:

selecting means for alternately selecting said first twisted pair communication line as a transmit path and said second twisted pair communication line as a receive path during a first mode and said first twisted pair communication line as a receive path and said second twisted pair communication line as a transmit path during a second mode;

link integrity pulse generating means coupled to said selecting means for generating link integrity pulses and for transmitting said link integrity pulses over said transmit path to said first network node;

sensing means coupled to said selecting means for sensing incoming link integrity pulses from said first network node on said receive path and for stopping selecting means from alternating between said first and second modes after said incoming link integrity pulses are sensed on said receive path;

transmitting means coupled to said selecting means for transmitting data to said first network node over said transmit path; and receiving means coupled to said selecting means for receiving data from said first network node over said receive path.

15. Apparatus comprising:

a network;

a first communication path coupled to said network;

a second communication path coupled to said network;

a device;

a third communication path coupled to said device;

a fourth communication path coupled to said device;

selecting means selectably coupled to said first communication path, said second communication path, said third communication path, and said fourth communication path for monitoring said first communication path and said second communication path for a received network status signal received from said network and for coupling said first communication path to said third communication path and said second communication path to said fourth communication path when a network status signal is received by said selecting means from said network over said second communication path, and for coupling said first communication path to said fourth communication path and said second communication path to said third communication path when a network status signal is received by said selecting means from said network over said first communication path.

\* \* \* \* \*